(12) United States Patent
Sasaki

(10) Patent No.: US 9,027,914 B2
(45) Date of Patent: May 12, 2015

(54) OPTICAL FIBER FUSION SPLICER

(71) Applicant: Fujikura Ltd., Koto-ku, Tokyo (JP)

(72) Inventor: Katsumi Sasaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/091,535

(22) Filed: Nov. 27, 2013

(65) Prior Publication Data

US 2014/0075999 A1    Mar. 20, 2014

Related U.S. Application Data

(63) Continuation of application No. PCT/JP2013/053318, filed on Feb. 13, 2013.

(30) Foreign Application Priority Data

Mar. 29, 2012  (JP) .................... 2012-078259
Sep. 19, 2012  (JP) .................... 2012-206309

(51) Int. Cl.
*B23Q 3/08*  (2006.01)
*G02B 6/255*  (2006.01)

(52) U.S. Cl.
CPC .................... *G02B 6/2553* (2013.01)

(58) Field of Classification Search
USPC ............................ 269/20, 27, 32
See application file for complete search history.

(56) References Cited

U.S. PATENT DOCUMENTS

| 5,533,160 A * | 7/1996 | Watanabe et al. ........... 385/96 |
| 6,206,583 B1 * | 3/2001 | Hishikawa et al. ......... 385/96 |
| 7,070,342 B2 * | 7/2006 | Bush et al. ................ 385/96 |
| 2004/0179794 A1 | 9/2004 | Horino et al. |
| 2005/0163447 A1 | 7/2005 | Takahashi et al. |
| 2014/0075999 A1 | 3/2014 | Sasaki |

FOREIGN PATENT DOCUMENTS

| CN | 1530675 A | 9/2004 |
| CN | 1645175 A | 7/2005 |
| CN | 203241567 U | 10/2013 |
| DE | 102006057541 A1 | 6/2008 |

(Continued)

OTHER PUBLICATIONS

Notice of Allowance dated Oct. 14, 2014, issued by the Korean Intellectual Property Office in counterpart Korean application No. 10-2013-7031806.
Extended European Search Report dated Oct. 22, 2014, issued by the European Patent Office in counterpart European application No. 13769252.1.

(Continued)

*Primary Examiner* — Lee D Wilson
*Assistant Examiner* — Shantese McDonald
(74) *Attorney, Agent, or Firm* — Sughrue Mion, PLLC

(57) ABSTRACT

An optical fiber fusion splicer includes: a windshield cover having a rotating shaft and rotating around the rotating shaft so as to be openable and closable; a cable member wrapping unit coupled and fixed to the windshield cover on the same axis as the rotating shaft of the windshield cover or formed as a portion of the windshield cover, the cable member wrapping unit being rotatable in a normal direction or in a reverse direction around the rotating shaft; a first cable member winding unit that is a rotary pulley, a non-rotary pulley, or a rotary gear; and a closed-loop member including a deformable cable member wound around the cable member wrapping unit and the first cable member winding unit, the closed-loop member constituting a closed loop.

18 Claims, 43 Drawing Sheets

(56) References Cited

FOREIGN PATENT DOCUMENTS

| | | |
|---|---|---|
| JP | 2001-066456 A | 3/2001 |
| JP | 2003-167151 A | 6/2003 |
| JP | 2005-164792 A | 6/2005 |
| JP | 3761192 B | 3/2006 |
| JP | 2008-233228 A | 10/2008 |
| JP | 2009-300846 A | 12/2009 |
| JP | 4382694 B | 12/2009 |
| JP | 2011-090039 A | 5/2011 |
| KR | 10-2007-0020705 A | 2/2007 |
| KR | 20-2011-0005712 U | 6/2011 |

OTHER PUBLICATIONS

Communication dated Oct. 31, 2014, issued by the State Intellectual Property Office of P.R. China in counterpart Chinese application No. 201310102341.5.

International Search Report in International Application No. PCT/JP2013/053318 mailed May 7, 2013.

Office Action issued by the Japanese Patent Office in Japanese Application No. 2012-078259 mailed Nov. 27, 2012.

Office Action issued by the Japanese Patent Office in Japanese Application No. 2013-031453 mailed Sep. 24, 2013.

* cited by examiner

OPTICAL FIBER FUSION SPLICER

CROSS REFERENCE TO RELATED APPLICATIONS

This application is a continuation application based on a PCT Patent Application No. PCT/JP2013/053318, filed Feb. 13, 2013, whose priority is claimed on Japanese Patent Application No. 2012-78259, filed Mar. 29, 2012 and Japanese Patent Application No. 2012-206309, filed Sep. 19, 2012, the entire content of which are hereby incorporated by reference.

BACKGROUND OF THE INVENTION

1. Field of the Invention

The invention relates to an optical fiber fusion splicer, and particularly, to an optical fiber fusion splicer having an openable and closable windshield cover that covers a heating and fusing portion that heats and fusion-splices optical fibers to each other.

2. Description of the Related Art

As an optical fiber fusion splicer, an apparatus (single-core machine) which fusion-splices a pair of single-core optical fibers facing each other in the longitudinal direction by performing discharging and heating between a pair of electrode rods, or an apparatus (multi-core machine) which fusion-splices multi-core optical fibers (tape fibers) in a bundle by performing discharging and heating between a pair of electrode rods, is provided.

In addition, as a conventional optical fiber fusion splicer (hereinafter, simply referred to as a fusion splicer), an apparatus with the following function and configuration is widely available (Japanese Unexamined Patent Application, First Publication No. 2003-167151).

(1) An optical fiber is illuminated from two directions using two light sources, and two-axis imaging (two-axis observation) of the optical fiber from the two directions is performed using two lenses and two cameras.

(2) A pair of V grooves are provided on both sides of a heat fusion portion disposed between a pair of electrode rods.

The pair of V grooves are formed so that the fusion-spliced tips of optical fibers can be positioned between the pair of electrode rods.

In addition, the pair of V grooves are provided along the apparatus body top surface, on which a pair of electrode rods are disposed, with the heat fusion portion interposed therebetween, and are provided so as to be disposed in a direction (a left and right direction) perpendicular to a direction (front and rear direction) in which the pair of electrode rods face each other.

As the optical fiber, a coated optical fiber, such as an optical fiber core or an optical fiber stand, is used in many cases.

An optical fiber glass portion obtained by removing the coat of the tip of the optical fiber (coated optical fiber) is disposed on the V groove, and is held between the V groove and a fiber clamp member that presses the optical fiber glass portion against the V groove from above.

Corresponding to two optical fibers disposed in the left and right direction, two sets of V grooves and fiber clamp members are provided (3) In order to hold coated portions of left and right optical fibers, movable coating clamps are provided in the left and right direction of the apparatus body, or a fiber holder is disposed on each side in the left and right direction so as to move in the left and right direction of the apparatus body.

(4) Discharge that occurs between the electrode rods is sensitive to wind, and a fluctuation in discharge also occurs due to receiving a slight wind.

Thus, a configuration provided with an openable and closable windshield cover that covers the electrode rods, the V-grooves, the fiber clamp members, and the covering clamps or the fiber holders is adopted as the fusion splicers.

The windshield cover is configured to have a sealed structure, in which the wind does not reach a discharge portion between the pair of electrode rods, by covering the electrode rod and the like.

The operation of mounting an optical fiber in the general fusion splicer of the conventional art is as follows.

(a) Coating clamp system: close the lid, and hold a single-core optical fiber by pinching it with a coating clamp.

A large coating clamp can hold single-core optical fibers having various coat diameters.

In addition, since the coating clamp is fixed to the apparatus (fusion splicer), there is no risk of losing the coating clamp.

(b) Fiber holder system: place a fiber holder separate from the fusion splicer on the fusion splicer.

The fiber holder holds an optical fiber by pinching it between a base plate and a cover plate that is pivotally attached to the base plate so as to be openable and closable.

In addition, the fiber holder is placed in the fusion splicer in a state of holding the optical fiber.

The fiber holder allows the optical fiber to be easily mounted in each process of coat removal, cutting, and fusion.

In the fiber holder system, however, it is necessary to prepare various kinds of fiber holders corresponding to the coat diameter or the number of core wires.

A windshield cover of a conventional fusion splicer is generally formed by one or more cover members that can be manually opened and closed.

Therefore, when performing the work of fusion-splicing the optical fibers using a conventional fusion splicer, the windshield cover is manually opened and closed.

That is, in the work of fusion-splicing the optical fibers using a conventional fusion splicer, the optical fibers are first mounted in a state where the windshield cover is open.

In the case of a fusion splicer based on the coating clamp system, each optical fiber is pinched by the coating clamp.

In the case of a fusion splicer based on the fiber holder system, a fiber holder that pinches each optical fiber is mounted in the fusion splicer.

After the mounting of the optical fibers to the fusion splicer is completed, the windshield cover is closed and then a connection start switch of the fusion splicer is turned on.

Then, the optical fibers are moved forward to predetermined positions, and the left and right optical fibers are connected by discharge between electrode rods. As a result, the optical fibers are fusion-spliced.

After the discharge between the electrode rods is performed for a predetermined time, the discharge is automatically stopped, then a connection portion is inspected.

After the completion of fusion splice, the windshield cover is opened, and the optical fibers are taken out.

In the conventional fusion splicer described above, it is necessary to manually close the windshield cover securely after mounting the optical fibers to be fusion-spliced.

In addition, the work of fusion-splicing hundreds of optical fibers can be performed in a day.

For this reason, a fusion splicer with a reduction in working time of fusion splice of optical fibers and an improvement in workability has been sought.

In view of the above-described problems, it is an object of the present invention to provide a fusion splicer capable of shortening the working time of fusion splice of optical fibers and an improving workability.

SUMMARY

In order to solve the above problems, the invention provides the following configurations.

An optical fiber fusion splicer related to a first aspect of the invention is a fusion splicer including a windshield cover having a rotating shaft and rotating around the rotating shaft so as to be openable and closable; a cable member wrapping unit coupled and fixed to the windshield cover on the same axis as the rotating shaft of the windshield cover or formed as a portion of the windshield cover, the cable member wrapping unit being rotatable in a normal direction or in a reverse direction around the rotating shaft; a first cable member winding unit that is a rotary pulley, a non-rotary pulley, or a rotary gear; a closed-loop member comprising a deformable cable member wound around the cable member wrapping unit and the first cable member winding unit, the closed-loop member constituting a closed loop; and a detector which detects that the windshield cover is closed and which is configured so that, when the detector fails to detect that the windshield cover is closed even if an operation of closing the windshield cover has been performed, a warning display is performed without shifting to the subsequent fusion splicing operation. When a tensile force is applied to the cable member so that the cable member wrapping unit is rotated in the normal direction by a driving force of a drive mechanism, the windshield cover is opened, and when the tensile force is applied to the cable member so that the cable member wrapping unit is rotated in the reverse direction, the windshield cover is closed, and at least one of the following (i) to (iv) is satisfied.

(i) The closed-loop member has an elastic member that couples both ends of the cable member.

(ii) At least a portion of the cable member has elasticity.

(iii) The first cable member winding unit is movably provided, and is movably provided so that the cable member is capable of being elastically biased.

(iv) The fusion splicer further includes a second cable member winding unit around which the cable member is wound, and which is movably provided so that the cable member is capable of being elastically biased.

When the detector cannot detect that the windshield cover is closed even if the operation of closing the windshield cover has been performed, one or more cycles of cover closing auxiliary operations including an operation of opening the windshield cover and the operation of closing the windshield cover performed after the opening operation may be executed. When the detector detects that the windshield cover is closed when or before a preset number of times of the cover closing auxiliary operations are completed, a state where the fusion splicing operation is allowed without performing the operation of closing the cover after the detection may be brought about. When the detector cannot detect that the windshield cover is closed even after the execution of the preset number of times of the cover closing auxiliary operations is completed, a warning display may be performed without shifting to the subsequent fusion splicing operation.

The optical fiber fusion splicer may further include a thrust-up shaft that presses a position of the windshield cover apart from the cable member wrapping unit to push up the windshield cover.

The drive mechanism may push up the thrust-up shaft while applying a tensile force to the cable member by the driving force.

The optical fiber fusion splicer may further include a power transmission member moved or rotated by the driving force of the drive mechanism; a power receiving protrusion provided on the cable member or the rotatable first cable member winding unit; and a pushing protrusion provided so as to protrude from the power transmission member and pushing the power receiving protrusion to feed and move the cable member. One first member that is one of the power receiving protrusion and the pushing protrusion may be provided. Two second members that are the other of the power receiving protrusion and the pushing protrusion may be provided apart from each other. The first member may be arranged between the two second members. The two second members may be arranged so that the first member is capable of moving between the two second members.

The power transmission member may be moved or rotated by the driving force of the drive mechanism after the operation of opening the windshield cover or the operation of closing the windshield cover so as to arrange the first member at a position apart from both of the two second members, and enable the windshield cover to be manually opened and closed without moving the power transmission member.

According to the optical fiber fusion splicer related to the above aspect of the invention, the opening and closing operation of the windshield cover can be automatically performed.

For this reason, shortening the operation time of the fusion splicing of the optical fibers and improvement of operability can be realized.

Additionally, according to the optical fiber fusion splicer related to the aspect of the invention, since a configuration is provided in which the driving force of an electric drive source is transmitted to the windshield cover via the closed-loop member to open and close the windshield cover, the degree of freedom of the installation position of the electric drive source with respect to the windshield cover is high, and the degree of freedom in design of the whole fusion splicer can be improved.

Moreover, the optical fiber fusion splicer related to the aspect of the invention satisfies at least one of the following (i) to (iv).

(i) The closed-loop member has an elastic member that couples both ends of the cable member.

(ii) At least a portion of the cable member has elasticity.

(iii) The first cable member winding unit is movably provided, and is movably provided so that the cable member is capable of being elastically biased.

(iv) The fusion splicer further includes a second cable member winding unit around which the cable member is wound, and which is movably provided so that the cable member can be elastically biased.

Thanks to this configuration, when foreign matter is included during the operation of closing the windshield cover or an obstacle comes into contact with the windshield cover during the operation of opening the windshield cover, damage of the drive mechanism that feeds and moves the cable member using the driving force of the electric drive source (tension on the cable member) and that rotates the windshield cover can be prevented.

Additionally, in the optical fiber fusion splicer related to the invention, during the operation of opening the cover or the operation of closing the cover by the driving of the drive mechanism or when these operations are not performed, it is possible for an operator to directly touch the windshield cover with his/her hand and to manually open and close the windshield cover, without damaging the drive mechanism.

DETAILED DESCRIPTION OF THE PREFERRED EMBODIMENTS

Figure 1:
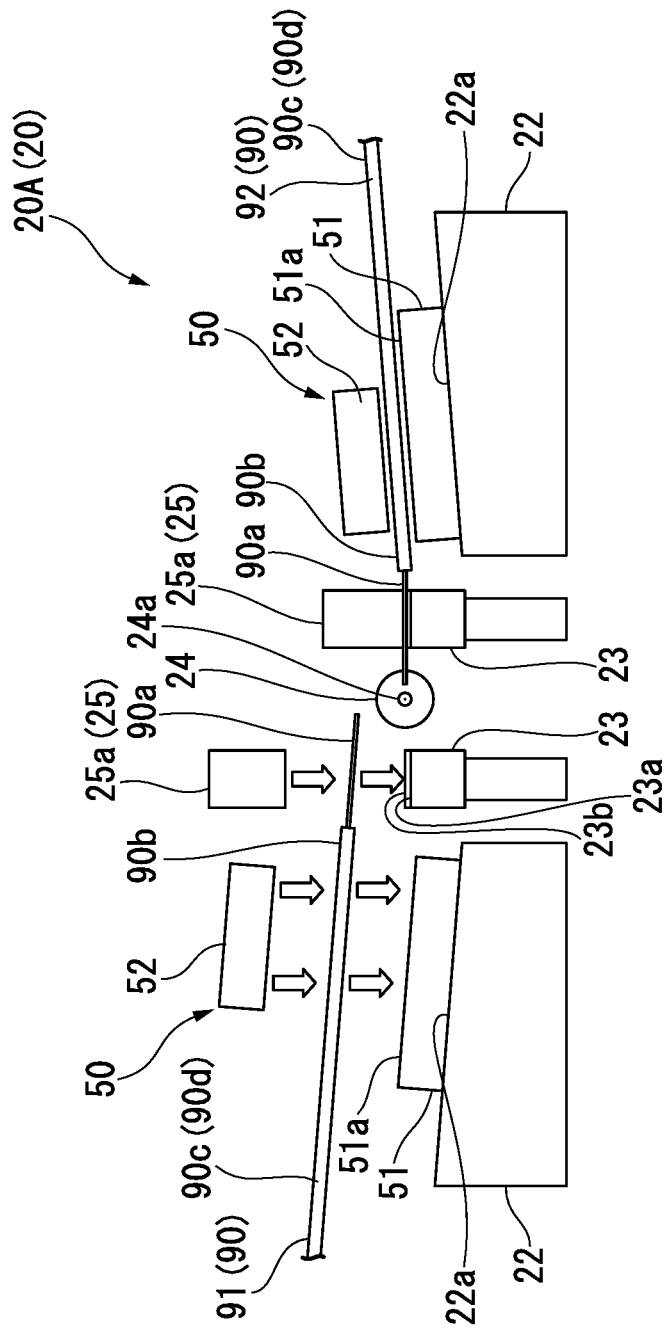
FIG. 1 is a front view schematically showing the configuration of an optical fiber fusion splicer related to an embodiment of the invention, and is a view showing the fusion splicer with a configuration in which covering clamps are arranged on both left and right sides of a heating and fusing portion.

An optical fiber fusion splicer (hereinafter, also simply referred to as a fusion splicer) related to the first embodiment of the invention will be described below with reference to the drawings.

FIGS. 1 to 6 are views illustrating the overall structure of the fusion splicer 20.

The fusion splicer 20 (reference numeral 20A is appended in the drawings) shown in FIG. 1 and FIGS. 3 to 6 is a covering clamp system fusion splicer.

Figure 2:
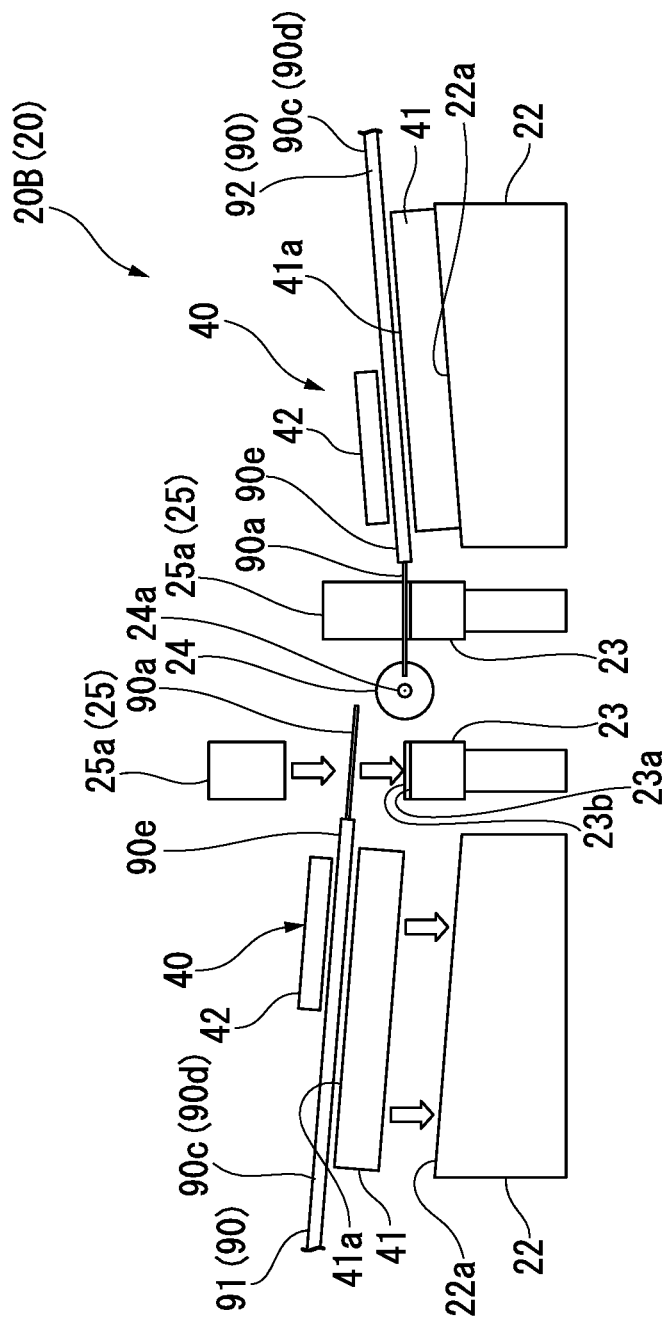
FIG. 2 is a front view schematically showing the configuration of the optical fiber fusion splicer related to the embodiment of the invention, and is a view showing the fusion splicer with a configuration in which fiber holders are detachably mounted on movable stages on both left and right sides of the heating and fusing portion.

A fusion splicer 20 (reference numeral 20B is appended in the drawing) shown in FIG. 2 is a fiber holder system fusion splicer.

The fusion splicer 20A shown in FIG. 1 and FIGS. 3 to 6 has a covering clamp 50 (to be described below) that is attached by fixing a lower clamp member 51 onto a movable stage 22 (to be described below).

The fusion splicer 20B shown in FIG. 2 is different from the covering clamp system fusion splicer 20A in that the covering clamp (fiber holder) is detachably mounted on the movable stage 22 (to be described below), and has other configurations in common with the covering clamp system fusion splicer 20A.

In FIG. 1, reference numeral 92 is appended to one optical fiber out of a pair of optical fibers 90 that are fusion-spliced by the fusion splicer 20A, and reference numeral 91 is appended to the other optical fiber.

As the optical fiber 90 illustrated here, there is used a covered optical fiber with a configuration in which a covering material 90c (coating covering) made of a synthetic resin is deposited on and integrated with an outer periphery of an optical fiber glass portion 90a (naked optical fiber) included in an optical fiber core or an optical fiber stand.

As shown in FIG. 1 and FIGS. 3 to 6, the fusion splicer 20A has an apparatus body 21 having a box-shaped appearance, and a pair of the movable stages 22 assembled into an upper portion of the apparatus body 21 and arranged apart from each other.

Additionally, the fusion splicer 20A has a pair of electrode rods 24, the covering clamps 50 attached onto one of the movable stages 22, a pair of grooved substrates 23, and a windshield cover 60, on the apparatus body 21.

The fusion splicer 20A can heat and fuse the tips of the optical fibers 91 and 92 to each other by the discharge between tapered tips of the pair of electrode rods 24 that are provided to face each other.

As shown in FIGS. 3 to 6, the pair of electrode rods 24 are provided apart from each other via a discharge portion 24a that is a region (space) between the tips that face each other.

As shown in FIG. 1, the pair of movable stages 22 are provided apart from each other in a direction orthogonal to a direction (a line segment including both the tips of the pair of electrode rods 24) in which the pair of electrode rods 24 face each other.

Figure 3:
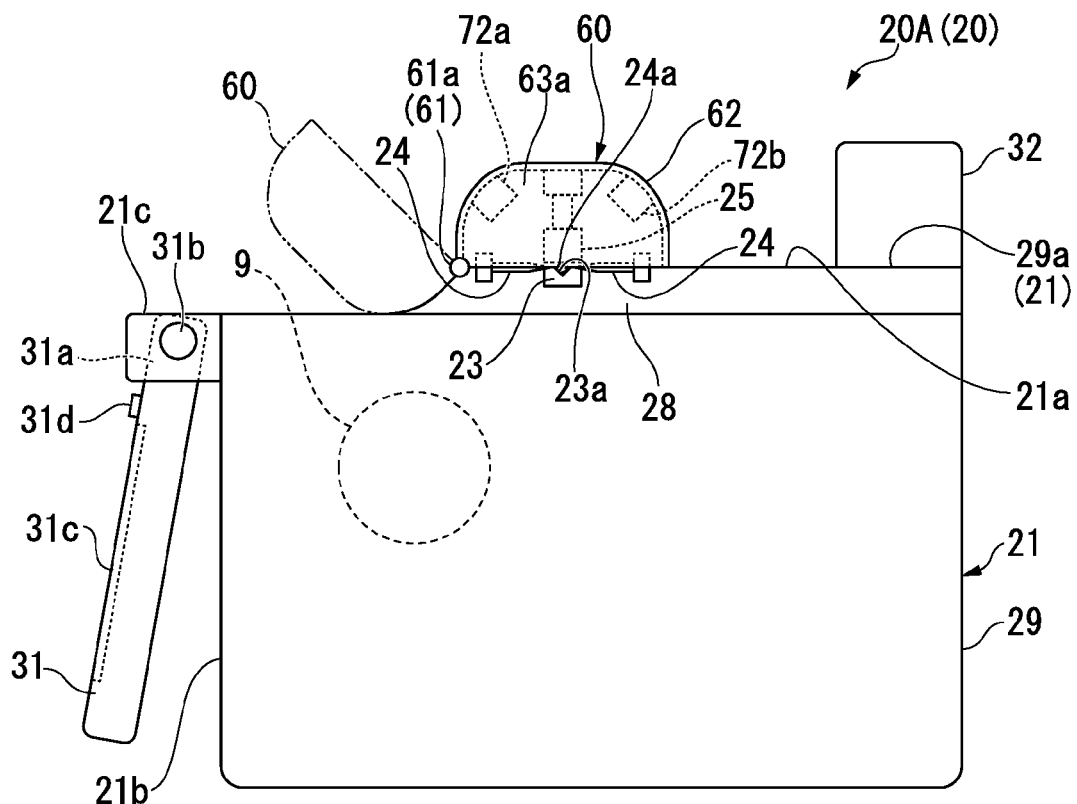
FIG. 3 is an overall side view (right side view) showing the optical fiber fusion splicer of FIG. 1, and is a view showing a state where a windshield cover is closed.

As shown in FIG. 3 and the like, the direction in which the pair of electrode rods 24 face each other and the direction in which the pair of movable stages 22 face each other are perpendicular to an apparatus up-and-down direction (up-and-down direction in FIGS. 1 to 4).

In addition, the "apparatus up-and-down direction" means a direction that coincides with the up-and-down direction (up-and-down direction in FIGS. 1 to 4) of the apparatus body 21 in which an upper surface 21a on which the electrode rods 24 are arranged is defined as an upper side, and a lower surface opposite to the upper surface 21a is defined as a lower side.

In the present specification, the fusion splicer 20 will be described with the direction (the left-and-right direction of FIGS. 1 and 2, the sheet depth direction of FIGS. 3 and 4, and the up-and-down direction of FIGS. 5 and 6) in which the pair of movable stages 22 face each other being defined as a left-and-right direction, and the direction (the sheet depth direction of FIGS. 1 and 2 and the left-and-right direction of FIGS. 3 to 6) in which the pair of electrode rods 24 face each other being defined as a front-and-rear direction.

Additionally, as shown in FIG. 3, the fusion splicer 20 has a monitor device 31 and a reinforcing sleeve heater 32 that are provided apart from each other in the front-and-rear direction of the apparatus body 21.

The fusion splicer 20 will be described with a monitor device 31 side (left side in FIGS. 3 and 4) being defined as the front and a reinforcing sleeve heater 32 side (right side in FIGS. 3 and 4) being defined as the rear.

Figure 5:
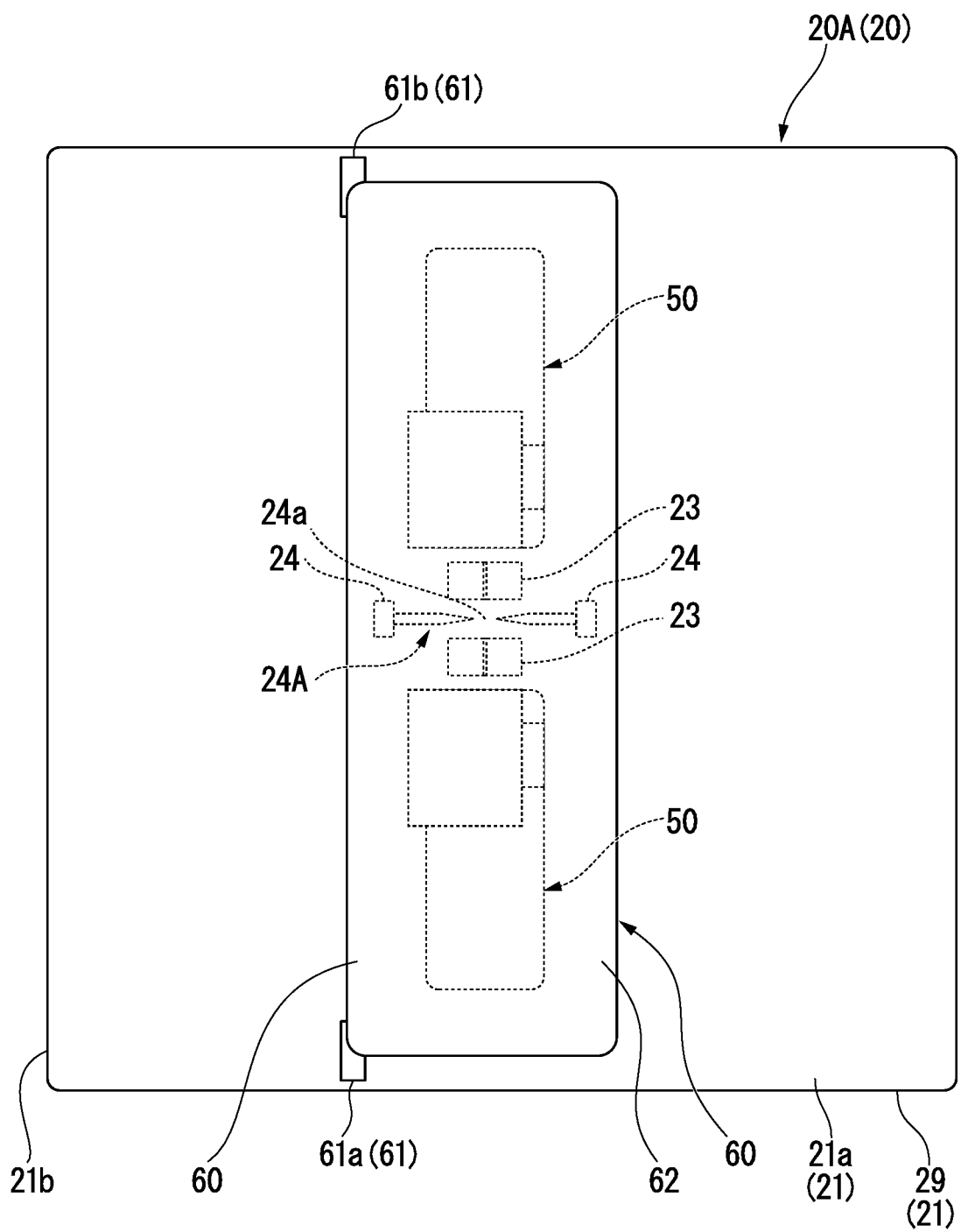
FIG. 5 is a plan view schematically showing the optical fiber fusion splicer of FIG. 1, and is a view showing a state where the windshield cover is closed.
Figure 6:
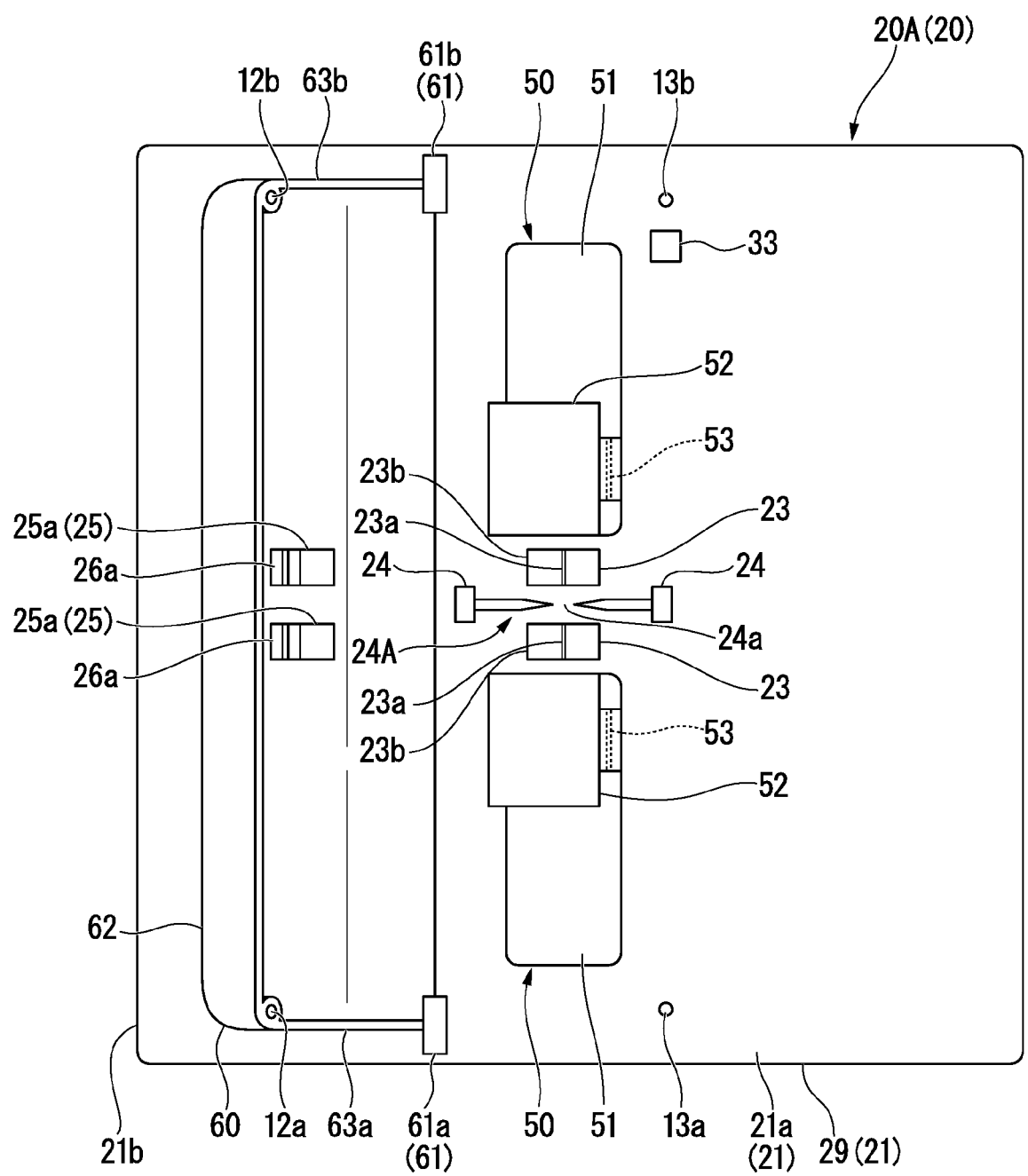
FIG. 6 is a plan view schematically showing the optical fiber fusion splicer of FIG. 1, and is a view showing a state where the windshield cover is opened.

In FIGS. 5 and 6, the left side is the front and the right side is the rear.

Additionally, in the present specification, a description will be provided with the upper side being defined as up and the lower side being defined as down, in FIGS. 1 to 4 and FIG. 7, and the sheet front side being defined as up and the sheet reverse side being defined as down, in FIGS. 5 and 6.

As shown in FIG. 3, the monitor device 31 is configured in the shape of a panel.

A hinge pin 31b for rotatably supporting the monitor device 31 with respect to the apparatus body 21 is attached to the upper front side of the apparatus body 21.

Specifically, the hinge pin 31b is supported by a protruding portion 21c that protrudes to the front side of the fusion splicer from an upper portion of a front surface 21b (front surface of a housing 29) of the apparatus body 21.

The monitor device 31 extends in a direction to the side opposite to where the hinge pin 31b is provided, from a base end portion 31a attached to the apparatus body 21 via the hinge pin 31b.

The monitor device 31 can be changed in orientation with respect to the apparatus body 21 around the axis of the hinge pin 31b in the left-and-right direction of the fusion splicer by its rotation around the hinge pin 31b.

The rotational resistance of the monitor device 31 with respect to the apparatus body 21 is adjusted to such strength (magnitude) that the monitor device is directly touched by an operator's hand and is manually rotatable with respect to the apparatus body 21 and that, when a rotative force is not applied, the monitor device can be stopped in a desired orientation with respect to the apparatus body 21.

Figure 4:
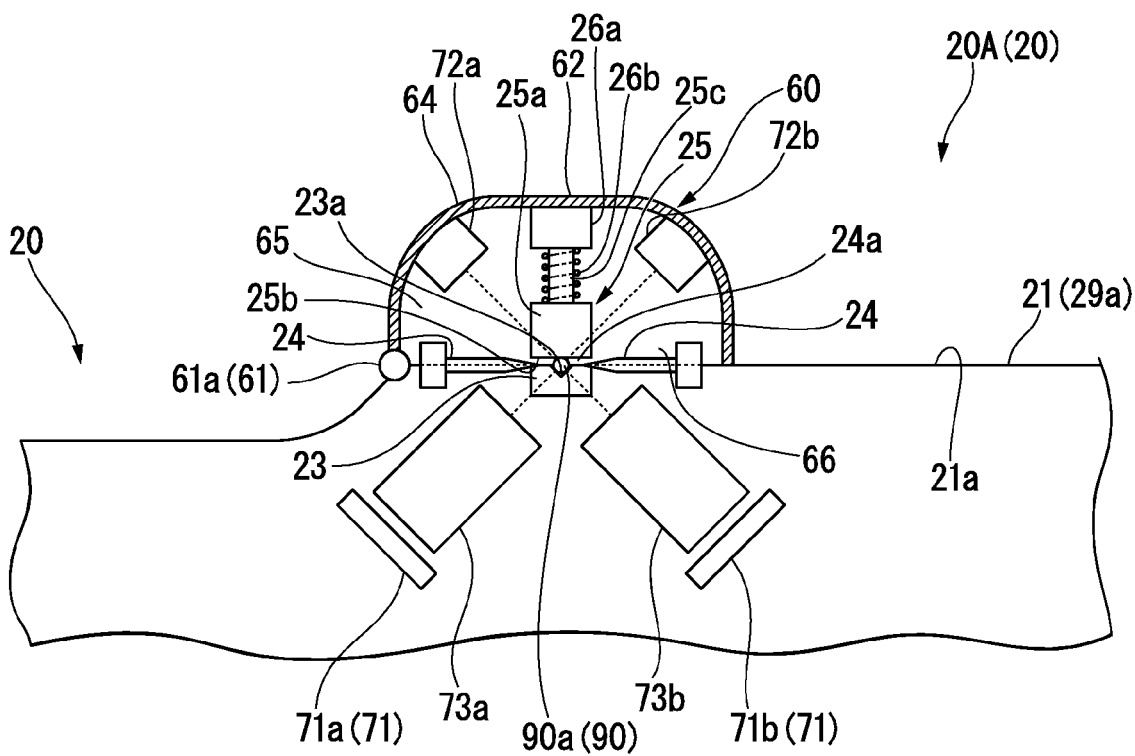
FIG. 4 is a side cross-sectional view (right side cross-sectional view) schematically showing a structure in the vicinity of the windshield cover of the optical fiber fusion splicer of FIG. 1, and is a view showing a state where the windshield cover is closed.

As shown in FIG. 4, a camera 71 for imaging the optical fibers arranged in the discharge portion 24a (or a position near the discharge portion 24a) is assembled into the apparatus body 21 of the fusion splicer 20 related to the invention.

The fusion splicer 20 can cause an image captured by the camera 71 to be displayed on a display surface 31c provided in the monitor device 31 (refer to FIG. 3).

As shown in FIG. 4, cameras 71 are assembled in two places within the apparatus body 21 such that the positions of the cameras are displaced from each other in the front-and-rear direction.

Out of the cameras 71 in two places, reference numeral 71a in the drawing is appended to a first camera located on the front side, and reference numeral 71b in the drawing is appended to a second camera located on the rear side.

Additionally, lenses 73a and 73b arranged on the discharge portion 24a side are assembled into the cameras 71a and 71b, respectively.

The respective cameras 71a and 71b image the optical fibers 90 arranged in the discharge portion 24a or at positions near the discharge portion 24a via the lenses 73a and 73b provided in the apparatus body 21.

Imaging light sources 72a and 72b for irradiating light to the discharge portion 24a and at positions near the discharge portion 24a when imaging is performed using the cameras 71 are arranged inside the windshield cover 60.

The fusion splicer 20 realizes biaxial observations in which the optical fibers 90 are irradiated from two directions by the two imaging light sources 72a and 72b and the optical fibers 90 are biaxially imaged by the two lenses 73a and 73b and the two cameras 71a and 71b.

In the fusion splicer 20, as shown in FIG. 4, when the windshield cover 60 is closed, the imaging light source 72a and the second camera 71b are arranged to face each other via the discharge portion 24a, and the imaging light source 72b and the first camera 71a are arranged to face each other via the discharge portion 24a.

As the imaging light sources 72a and 72b, for example, light emitting diodes or the like can be suitably used.

In addition, the imaging light sources 72a and 72b may be turned on at least when the optical fibers are imaged by the cameras 71.

For this reason, the imaging light sources 72a and 72b, for example, may be turned on only when the optical fibers are imaged by the cameras 71 and may be turned off when not imaging.

As shown in FIG. 3, the reinforcing sleeve heater 32 is fixed onto a front end portion on the upper surface 21a of the apparatus body.

The reinforcing sleeve heater 32 is a device that covers a fusion-spliced portion between the optical fibers 91 and 92 with a heat-shrinkable reinforcing sleeve that is shrunk when heated after the completion of fusion splicing and spliced portion inspection of the optical fibers 91 and 92, and thereby reinforcing the fusion-spliced portion between the optical fibers 91 and 92.

When an operator performs a fusion splicing operation between the optical fibers 90 using the fusion splicer 20, it is preferable to use the fusion splicer 20 in an orientation where the front surface side (front side) of the fusion splicer becomes an operator side.

It is preferable that the monitor device 31 be arranged along the front surface 21b of the apparatus body 21.

When the monitor device 31 is arranged along the front surface 21b of the apparatus body 21, the rear surface of the monitor device opposite to the display surface 31c is arranged to face the front surface 21b of the apparatus body.

The monitor device 31 is arranged along the front surface 21b with respect to the apparatus body 21, thereby it becomes easy for an operator to view the display surface 31c from the front side of the fusion splicer 20.

As shown in FIG. 1, the movable stage 22 functions as a clamp mounting base for attaching the covering clamp 50 (specifically, a lower clamp member 51 to be described below).

The movable stage 22 is movable in the left-and-right direction with respect to the apparatus body 21 by the driving force of a power source (power source for a stage) (not shown) assembled into the housing 29 of the apparatus body 21.

That is, the movable stage 22 advances and retreats toward the discharge portion 24a by the driving of the power source for a stage.

In addition, as the power source for a stage, a power source that is driven with an electromagnetic force to generate power is preferable, for example, an electric motor, an electromagnet, a solenoid, or the like is suitable.

The covering clamp 50 has a plate-shaped lower clamp member 51 fixed onto the movable stage 22, and a plate-shaped upper clamp member 52 that is pivotally attached to the lower clamp member 51 and is openably and closably provided with respect to an upper surface 51a of the lower clamp member 51.

As shown in FIG. 6, the upper clamp member 52 is rotatably attached to the lower clamp member 51 via a pivot 53 provided at the end portion of the lower clamp member 51 on an apparatus rear side (fusion splicer rear side).

As shown in FIG. 1, the covering clamp 50 is able to grip and fix the optical fiber 90 between the lower clamp member 51 and the upper clamp member 52.

Specifically, the covering clamp 50 grips and fixes a covered portion 90d, which is the portion of an outer periphery of the optical fiber glass portion 90a in the optical fiber 90 covered with the covering material 90c, between the lower clamp member 51 and the upper clamp member 52.

Additionally, the covering clamp 50 is able to switch between gripping and grip release of the optical fiber 90 by the opening and closing of the upper clamp member 52 with respect to the lower clamp member upper surface 51a.

The covering clamp 50 has an upper member holding portion (not shown) that maintains a state (closed state) where the upper clamp member 52 closed with respect to the lower clamp member 51 is held.

The upper member holding portion may include a permanent magnet that magnetically attracts a metal portion of the upper clamp member 52 assembled into the lower clamp member 51.

However, a configuration in which the upper clamp member 52 can be held simply by manually closing the upper clamp member 52 with respect to the lower clamp member 51 and the holding thereof can be manually released is adopted as the upper member holding portion.

When the covering clamp 50 of the fusion splicer 20A is used, an operator is able to directly operate the upper clamp member 52 with his/her fingers to manually perform the opening and closing of the upper clamp member 52 with respect to the lower clamp member 51.

In addition, the upper member holding portion is not limited to the permanent magnet that magnetically attracts the metal portion of the upper clamp member 52 but, for example, an engaging claw capable of being manually operating for engagement and disengagement may be used.

As the upper member holding portion, one that is widely known in the conventional art with respect to the covering clamp of the fusion splicer may be adopted.

The optical fiber 90 is gripped and fixed by the covering clamp 50 and thereby mounted on the fusion splicer 20A.

That is, the covering clamp 50 functions as a fiber mounting portion for mounting the optical fiber 90 on the fusion splicer 20A.

In the operation of fusion-splicing the optical fibers 91 and 92 using the fusion splicer 20A, as shown by a virtual line of FIG. 3, and FIG. 6, the optical fiber 90 (covered portion 90d) is pinched between the lower clamp member 51 and the upper clamp member 52 by manually operating the upper clamp member 52 of the covering clamp 50 in an opening and closing manner in a state where the windshield cover 60 is opened.

As shown in FIG. 1, an optical fiber of which the optical fiber glass portion 90a is exposed by removing the covering material 90c of the tip portion of the optical fiber in advance is used as the optical fiber 90 gripped and fixed by the covering clamp 50.

Additionally, the optical fiber 90 is gripped and fixed by the covering clamp 50 so that the optical fiber glass portion 90a is placed on the positioning groove 23a formed in the grooved substrate 23 and the tip side of the optical fiber glass portion 90a protrudes to the discharge portion 24a side from the covering clamp 50.

Hereinafter, the portion of the optical fiber 90 that protrudes to the discharge portion 24a side from the covering clamp 50 (specifically, the lower clamp member 51) is also referred to as a protruding portion 90b.

As shown in FIGS. 1 and 6, (a pair of) the grooved substrates 23 are provided between the discharge portion 24a and the movable stages 22 on both left and right sides of the discharge portion, respectively.

The pair of grooved substrates 23 function to align the tips (specifically, the tip of the optical fiber glass portions 90a) of the pair of optical fibers 91 and 92 that are gripped and fixed by the covering clamps 50 and mounted on the fusion splicer 20A, on the same straight line (virtual straight line) in the left-and-right direction of the fusion splicer with high precision by the positioning grooves 23a.

The positioning groove 23a of the grooved substrate 23 is formed to extend in the left-and-right direction of the fusion splicer on an upper surface 23b (substrate upper surface) of the grooved substrate 23 fixedly provided on the apparatus body 21.

As shown in FIG. 4, the positioning groove 23a of the grooved substrate 23 of the fusion splicer 20A is a V-groove.

However, the positioning groove 23a has only to be capable of positioning the optical fiber glass portion 90a exposed to the tip portion of the optical fiber 90 with high precision, and is not limited to the V-groove.

As the positioning groove 23a, for example, a round groove (groove with a semicircular cross-section), a U groove, a trapezoidal groove, or the like may be used.

In addition, as the material of the grooved substrate 23, ceramic can be suitably used in order to withstand the heat of discharge heating.

In an apparatus (fusion splicer) having an axial alignment mechanism for an optical fiber, the pair of grooved substrates 23 are each fixed onto a pair of optical fiber axial alignment mechanisms.

On the other hand, in the case of a fusion splicer with no axial alignment mechanism for an optical fiber, the grooved substrate 23 may be directly fixed onto the upper surface 21a of the apparatus body 21.

As shown in FIGS. 3 to 6, the windshield cover 60 is rotatably attached to the apparatus body 21 via a rotating shaft 61 supported on the apparatus body 21, with a rotation axis in the left-and-right direction of the fusion splicer as a starting point.

The windshield cover 60 can be rotated about the rotating shaft 61 and thereby opened and closed with respect to the apparatus body 21 using the driving force of an electric drive source 9 (refer to FIG. 3; a power source used to open and close a windshield) assembled into the housing 29 of the apparatus body 21.

The electric drive source 9 of the illustrated example is specifically an electric motor.

Additionally, in the drawings, reference numeral 61a is appended to a rotating shaft 61 on the right side of the fusion splicer (the front side when viewed from the fusion splicer right side) in the left-and-right direction, and reference numeral 61b is appended to the rotating shaft 61 on the left side.

As shown in FIG. 4 and FIGS. 8 to 20B, the windshield cover 60 has a cover body 62 (refer to FIG. 8, FIG. 19A, and the like) that has a U-shaped cross-section and has an elongated structure that extends in the left-and-right direction of the fusion splicer, and end plate portions 63a and 63b (refer to FIG. 9 and FIG. 13) provided at both ends thereof in the longitudinal direction substantially perpendicularly to the longitudinal direction of the cover body 62, and is configured in the shape of an elongated container.

The end plate portions 63a and 63b are provided so as to block both ends in an extending direction of a grooved space inside the cover body 62.

Figure 8:
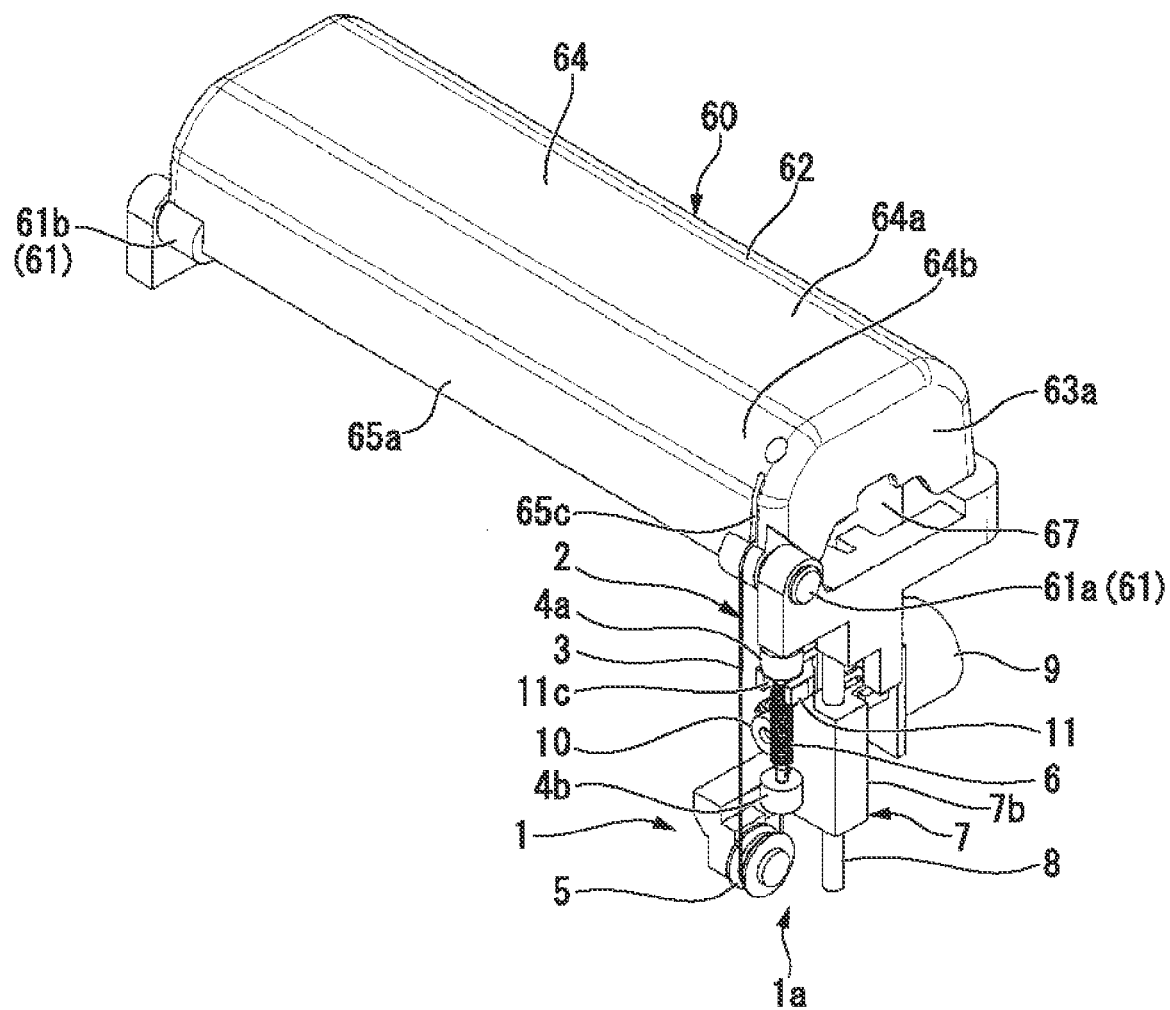
FIG. 8 is a view illustrating the windshield cover and its opening and closing mechanism (a first example of a cover opening and closing mechanism) of the optical fiber fusion splicer of FIG. 1, and is a perspective view showing a state where the windshield cover is closed when viewed from the diagonally front an upper right side of the splicer.
Figure 9:
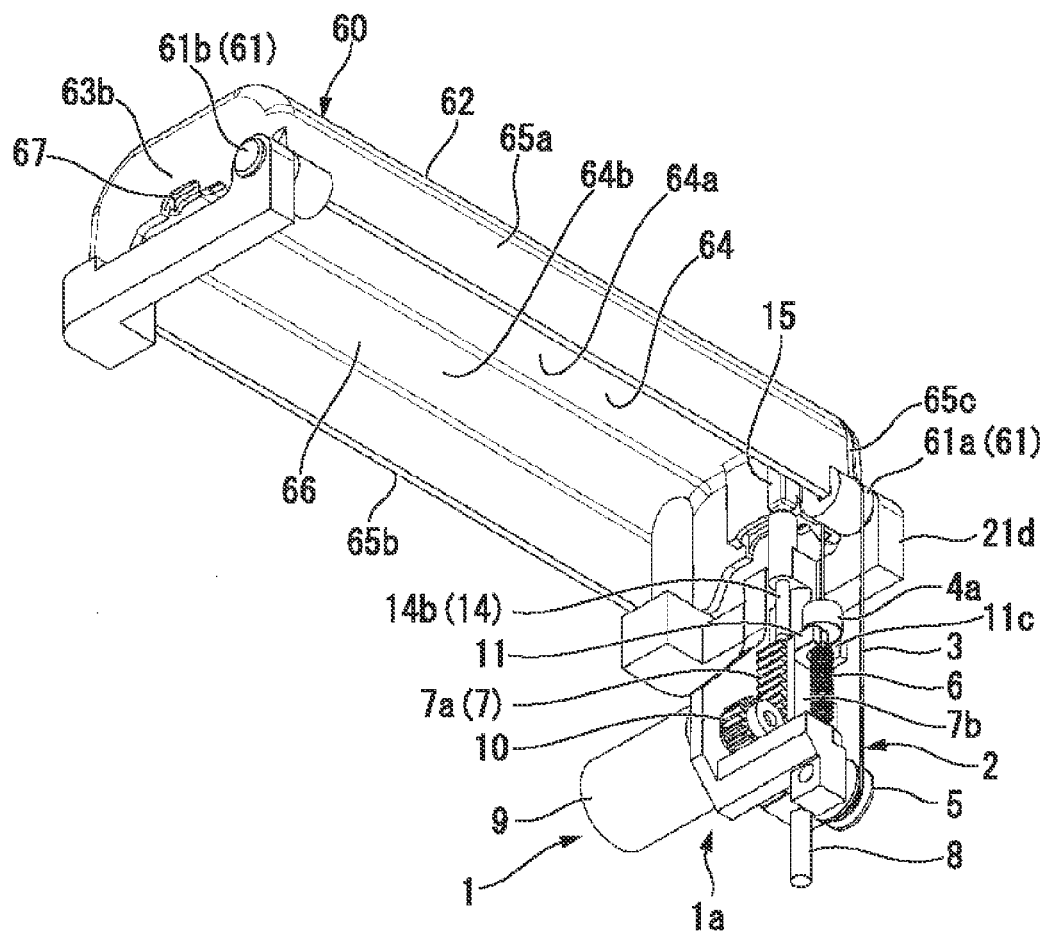
FIG. 9 is a view illustrating the windshield cover and its opening and closing mechanism of FIG. 1, and is a perspective view showing a state where the windshield cover is closed when viewed diagonally from the front lower left side of the splicer.
Figure 10:
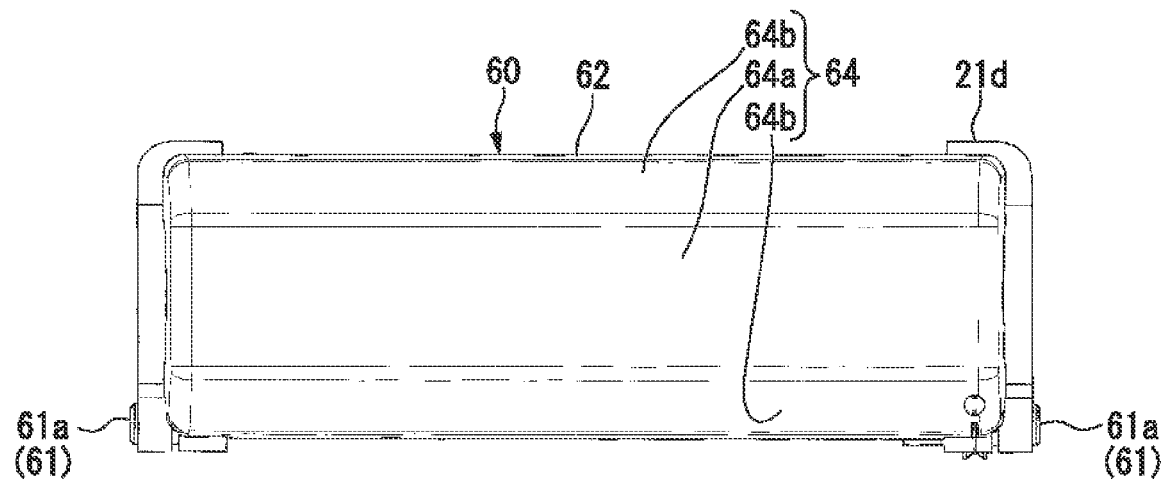
FIG. 10 is a view illustrating the windshield cover and its opening and closing mechanism of FIG. 1, and is a plan view showing a state where the windshield cover is closed.
Figure 11:
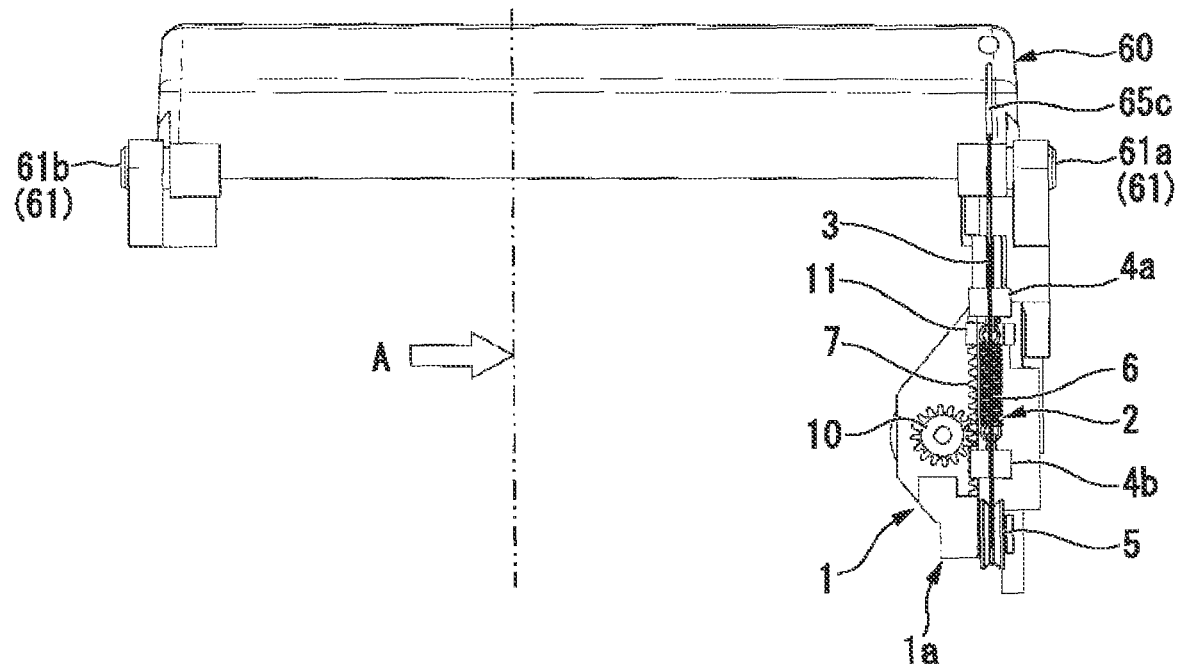
FIG. 11 is a view illustrating the windshield cover and its opening and closing mechanism of FIG. 1, and is a front view showing a state where the windshield cover is closed when viewed from the front side of the splicer.
Figure 12:
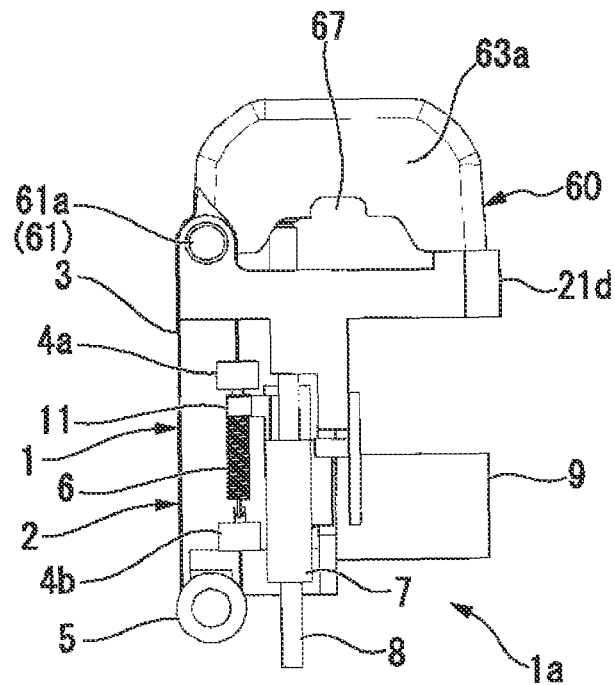
FIG. 12 is a view illustrating the windshield cover and its opening and closing mechanism of FIG. 1, and is a view (right side view) showing a state where the windshield cover is closed when viewed from the right side of the splicer.
Figure 18A:
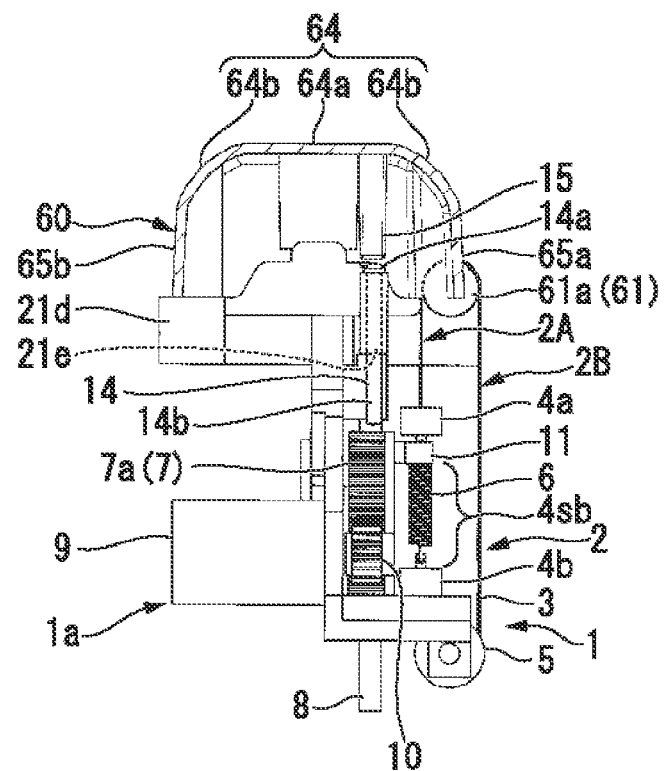
FIG. 18A is a view illustrating a state where the windshield cover is closed, regarding the windshield cover and its opening and closing mechanism of the optical fiber fusion splicer of FIG. 1, and is a cross-sectional view taken along line A-A of FIG. 11 when viewed in the direction of arrow.

As shown in FIG. 8, FIG. 9, FIG. 18A, and the like, the cover body 62 of the windshield cover 60 has an elongated plate-shaped top plate portion 64, and a pair of side plate portions 65a and 65b that protrude in the shape of a rib over the total length of the top plate portion 64 in the longitudinal direction.

The pair of side plate portions 65a and 65b protrudes from both ends of the top plate portion 64 in the width direction.

Additionally, the pair of side plate portions 65a and 65b are formed parallel to each other.

The top plate portion 64 of the cover body 62 of the illustrated example has a long plate-shaped flat plate portion 64a and inclination plate portions 64b that overhang from both ends of this flat plate portion 64a in the width direction obliquely with respect to the flat plate portion 64a.

The inclination plate portions 64b on both sides of the top plate portion 64 are formed obliquely with respect to the flat plate portion 64a in the shape of a fan whose mutual separation distance increases further apart from the flat plate portion 64a.

Each inclination plate portion 64b is formed over the total length of the flat plate portion 64a in the longitudinal direction.

Additionally, the pair of side plate portions 65a and 65b of the cover body 62 are formed in directions perpendicular to the flat plate portion 64a from the end portions of the inclination plate portions 64b opposite to the flat plate portion 64a.

As shown in FIG. 8, FIG. 9, FIG. 18A, and the like, in an inner space 66 (hereinafter also referred to as a cover inner space 66) surrounded by the cover body 62, and the end plate portions 63a and 63b on both sides of the cover body in the longitudinal direction, the side of the cover body 62 opposite to the top plate portion 64 is configured so as to open over the total length of the cover body 62 in the longitudinal direction.

Additionally, one of both ends (both ends of a cross-section) on the opening side 62 (lower side in FIGS. 8 and 18A) of the cross-section of the cover body is attached to the apparatus body 21 via the rotating shaft 61.

Accordingly, the windshield cover 60 is rotatable with respect to the apparatus body 21.

Additionally, the windshield cover 60 is provided on the apparatus body 21 so that the longitudinal direction thereof coincides with the left-and-right direction of the fusion splicer.

As shown in FIG. 3, the rotating shafts 61 of the windshield cover 60, the pair of electrode rods 24, the covering clamps 50 on the respective movable stages 22, and the pair of grooved substrates 23 are provided between the hinge pin 31b on the front side and the reinforcing sleeve heater 32 on the rear side, in the front-and-rear direction of the fusion splicer.

Additionally, the movable stages 22 are also provided between the hinge pin 31b and the reinforcing sleeve heater 32, in the front-and-rear direction of the fusion splicer.

As shown in FIGS. 8, 9, and 18A, the windshield cover 60 comes into contact with the apparatus body in a state where the end portions of the cover body 62 and the end plate portions 63a and 63b on the opening portion side of the cover inner space 66 butts against the upper surface 21a of the apparatus body, when the windshield cover is closed with respect to the apparatus body 21.

As shown in FIG. 5, the windshield cover 60 has the pair of electrode rods 24 located on the apparatus body 21, the pair of covering clamps 50 on the respective movable stages 22, and the pair of grooved substrates 23 accommodated therein, when the windshield cover is closed with respect to the apparatus body 21.

Additionally, when the windshield cover 60 is closed with respect to the apparatus body 21, the whole upper sides of the movable stages 22 are covered with the windshield cover 60.

The fusion splicing between the optical fibers 90 using the fusion splicer 20 is performed in a state where the windshield cover 60 is closed with respect to the apparatus body 21.

The windshield cover 60 closed with respect to the apparatus body 21 covers the electrode rods 24 and the discharge portion 24a between the electrode rods 24, and prevents air currents outside the windshield cover 60 from affecting the fusion splicing between the optical fibers 90.

As shown in FIGS. 8, 9, and 18A, the end plate portions 63a and 63b on both sides of the windshield cover 60 in the longitudinal direction are formed with cutout portions 67 (fiber insertion cutout portions) that are recessed from the end faces of the cover inner space 66 on the opening portion side.

The windshield cover 60 can accommodate portions of the optical fibers 90, which are gripped and fixed by the covering clamps 50 and arranged on the upper surface 21a of the apparatus body, in the fiber insertion cutout portions 67, when being closed with respect to the apparatus body 21.

The windshield cover 60 can accommodate portions of the optical fibers 90 in the fiber insertion cutout portions 67 and avoid strongly pinching and damaging the optical fibers 90 between the end plate portions 63a and 63b and the upper surface 21a of the apparatus body.

As shown in FIG. 4, FIG. 6, and the like, the rotating shafts 61a and 61b of the windshield cover 60 are provided further toward the front side of the fusion splicer than the electrode rods 24, the covering clamps 50, and the grooved substrates 23 of the fusion splicer 20.

Additionally, the rotating shafts 61a and 61b are provided further toward the front side of the fusion splicer than the movable stages 22 of the fusion splicer 20.

When the windshield cover 60 is closed with respect to the apparatus body 21, the pair of side plate portions 65a and 65b are arranged on both sides of the fusion splicer in the front-and-rear direction via the electrode rods 24, the covering clamps 50, the grooved substrates 23, and the movable stages 22 (not shown).

When a power switch (not shown) is turned off from ON, the fusion splicer 20 is brought into a state (hereinafter also referred to as an operation standby initial state) where the movable stages 22 are arranged at positions at the time of fiber mounting in directions further away from the discharge portion 24a than the advance limit positions thereof with respect to the discharge portion 24a and the windshield cover 60 is closed.

By turning on the power switch from OFF, the fusion splicer 20 in the operation standby initial state is brought into a fiber set standby state where the movable stages 22 are arranged at the positions of fiber mounting and the windshield cover 60 is opened.

In the operation of fusion-splicing the optical fibers 91 and 92 using the fusion splicer 20A, first, the optical fibers 91 and 92 (covered portions 90d) are gripped and fixed between the lower clamp members 51 and the upper clamp member 52 of the covering clamps 50 (refer to FIG. 1), in the fiber set standby state already described.

When the optical fibers are gripped and fixed by the covering clamps 50 on both left and right sides of the discharge portion 24a, the lengths of the protruding portions 90b from the covering clamps 50 are adjusted so that the tips of the optical fiber glass portions 90a of the respective optical fibers 91 and 92 are arranged to face each other via a slight gap.

Additionally, the optical fibers 91 and 92 are adjusted so as to be arranged on both left and right sides via a virtual straight line connecting the tips of the optical fiber glass portions 90a of the respective optical fibers 90, that is, the tips of the pair of electrode rods 24, by adjusting the lengths of the protruding portions 90b.

As shown in FIG. 3, the fusion splicer 20A has a cover closing switch 31d provided at an outer peripheral portion of the monitor device 31 on the display surface 31c side.

In the fusion splicer 20A, the cover closing operation (windshield cover closing operation) of closing the windshield cover 60 in an opened state with respect to the apparatus body 21 is performed by operating the cover closing switch 31d to thereby drive the electric drive source 9 (refer to FIG. 3, FIG. 8, FIG. 9, and the like) after the gripping and fixing of the optical fibers 91 and 92 with the covering clamps 50 are completed.

Then, when a cover-closing detector 33 (refer to FIG. 6) detects that the windshield cover 60 is closed with respect to the apparatus body 21, a fusion splicing operation is automatically started.

In addition, the cover closing switch 31d is not particularly limited. For example, a touch panel may be used as the monitor device 31, and a display button that causes a touch panel to perform display may be used as the cover closing switch.

Additionally, the installation position of the cover closing switch 31d in the fusion splicer is not particularly limited. For example, a configuration in which the cover closing switch 31d is provided in the apparatus body 21 may be used.

As shown in FIG. 4, when the cover closing operation is completed, a fiber clamp member 25 provided inside the windshield cover 60 pushes in the optical fiber 90 (optical fiber glass portion 90a) arranged on the positioning groove 23a of the grooved substrate 23 toward the bottom of the positioning groove 23a.

This allows the optical fiber glass portion 90a of the optical fiber 90 to be positioned with high precision by the positioning groove 23a.

As shown in FIG. 6, the fiber clamp members 25 are provided in two places in the longitudinal direction of the windshield cover 60 so as to correspond to the grooved substrates 23 provided on both left and right sides of the discharge portion 24a.

In addition, illustration of the fiber clamp members 25 is omitted in drawings other than FIGS. 3, 4, and 6.

The fiber clamp member 25 illustrated in FIG. 4 has a pressing piece 25a that presses the optical fiber glass portion 90a of the optical fiber 90 placed in the positioning groove 23a, and a shaft portion 25c that has the pressing piece 25a integrally provided at the tip thereof.

The shaft portion 25c is provided to protrude from the surface of the pressing piece 25a opposite to a fiber pressing surface 25b that is a tip that comes into contact with the optical fiber glass portion 90a.

The end portion (rear end portion) of the shaft portion 25c opposite to the side thereof to which the pressing piece 25a is attached is supported by a clamp supporting member 26a fixed to the inner surface of the top plate portion 64 (specifically, the flat plate portion 64a) of the windshield cover 60.

The shaft portion 25c is provided to protrude toward the opening portion side of the windshield cover 60 from the clamp supporting member 26a.

Additionally, the shaft portion 25c is provided in the clamp supporting member 26a so as to have a predetermined movable range in the length direction toward the opening portion side of the windshield cover 60.

Additionally, the fiber clamp member 25 elastically biases the pressing piece 25a in a direction away from the clamp supporting member 26a to the opening portion side of the windshield cover 60, by a spring 26b interposed between the pressing piece 25a and the clamp supporting member 26a.

The spring 26b of the illustrated example is specifically a coil spring, and the shaft portion 25c of the fiber clamp member 25 is inserted into the spring.

As shown in FIG. 1, the fusion splicer 20A can advance and retreat the movable stage 22 by the driving of the power source for a stage toward the discharge portion 24a from the position at the time of fiber mounting.

By advancing the movable stage 22 from the position at the time of fiber mounting after the completion of the cover closing operation, the tip (the tip of the optical fiber glass portion 90a) of the optical fiber 90 advances to a predetermined position.

The fusion splicer 20A joins together and fusion-splices the pair of optical fibers by the discharge between the electrode rods 24 while performing discharge.

The discharge between the pair of electrode rods 24 stops automatically after being performed for a predetermined period of time.

The fusion splicer 20A performs inspection of the spliced portion after the discharge between the pair of electrode rods 24 is stopped.

The fusion splicer 20A drives the electric drive source 9 to automatically perform the cover opening operation (windshield cover opening operation) of opening the windshield cover 60, after the completion of the fusion splicing.

The windshield cover 60 is brought into a closed state until the execution of the cover opening operation after the cover closing switch 31d is turned on.

In addition, the force with which the fiber clamp member 25 pushes the optical fiber glass portion 90a into the positioning groove 23a is adjusted to such magnitude that the optical fiber glass portion 90a can smoothly slide on the grooved substrate 23 with the advance of the movable stage 22.

This allows the optical fiber glass portion 90a to advance integrally with the movable stage 22 when the fusion splicer 20 advances the movable stage 22.

If the cover opening operation is completed, an operator opens the respective upper clamp members 52 of the pair of covering clamps 50 to manually take out the optical fibers 91 and 92.

In addition, the fusion splicer 20A automatically returns the movable stage 22 to the position at the time of fiber mounting after the completion of the spliced portion inspection.

In the spliced portion inspection (spliced portion inspection operation), as shown in FIG. 4, a fusion-spliced portion is imaged by the cameras 71 assembled into the apparatus body 21, the captured images are analyzed by an image processor, the splicing loss of the spliced optical fibers 91 and 92 are automatically measured, and the abnormality of a spliced state is automatically determined.

When there is an abnormality in measurement results, the fusion splicer emits an alarm to the operator, but when the measurement results are normal, an alarm is not emitted, and the operator automatically proceeds to the following step without performing the operation of inspection completion.

However, when the operator visually inspects the spliced portion, the captured images are displayed on the monitor device 31 (refer to FIG. 3).

Then, the operator observes the state of the fusion-spliced portion between the optical fibers 91 and 92 from the captured images displayed on the monitor device 31.

In the spliced portion inspection operation, the monitor device 31 continues displaying the images captured by the cameras 71 until the subsequent operation (spliced portion tension inspection or take-out of the optical fibers from the fusion splicer) is performed.

As shown in FIG. 2, in the fiber holder system fusion splicer 20B, the cover closing switch 31*d* is turned on after the fiber holder 40 that grips and fixes the optical fiber 91 or 92 is placed on the movable stage 22.

Figure 7:
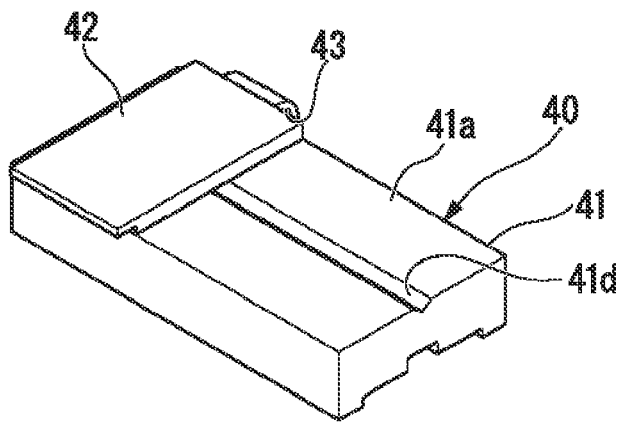
FIG. 7 is a perspective view showing an example of the fiber holders detachably mounted on the movable stages on both sides of the optical fiber fusion splicer of FIG. 2.

As shown in FIG. 7, the fiber holder 40 pinches, grips, and fixes the optical fiber 90 between a base plate 41 and a lid plate 42 that is pivotally attached to the base plate 41 and is openably and closably provided.

The lid plate 42 is openable and closable with respect to a base plate upper surface 41*a* that is one surface of the base plate 41 in the thickness direction.

The lid plate 42 is pivotally attached to the base plate 41 via a pivot 43 provided in the longitudinal direction of the base plate 41 at one end of the oblong plate-shaped base plate 41 in the width direction.

As shown in FIG. 2, the optical fiber 90 is fixed to the fiber holder 40 by securing a protruding portion 90*e* whose tip side is made to protrude from the fiber holder 40.

Additionally, in the optical fiber 90 gripped by and fixed to the fiber holder 40, the covering of a tip portion of the protruding portion 90*e* is removed to expose the optical fiber glass portion 90*a* (naked optical fiber).

The fiber holder 40 is provided on the movable stage 22 by positioning and placing the base plate 41 at a predetermined position on the movable stage 22 by a holder positioning portion (not shown) provided in the movable stage 22.

The fiber holder 40 can be attached and detached by ascending and descending with respect to the movable stage 22.

When the fiber holders 40 that grip and fix the optical fibers 90 are respectively installed on the movable stages 22 on both left and right sides of the discharge portion 24*a*, the lengths of the protruding portions 90*e* of the optical fibers 91 and 92 are adjusted so that the tips of the optical fiber glass portions 90*a* of the respective optical fibers 90 are arranged to face each other via a slight gap.

Additionally, in the optical fibers 91 and 92, the tips of the optical fiber glass portions 90*a* of the respective optical fibers 90 are arranged on both left and right sides via a virtual straight line connecting the tips of the pair of electrode rods 24, by adjustment of the lengths of the protruding portions 90*e*.

The fiber holder 40 pinches, grips, and fixes the covered portion 90*d* of the optical fiber 90 between the base plate 41 and the lid plate 42.

As shown in FIG. 7, the upper surface 41*a* of the base plate 41 of the fiber holder 40 is formed with a fiber accommodation groove 41*d* used to position the single-core optical fiber 90 (covered portion 90*d*).

The fiber holder 40 of the illustrated example grips and fixes the single core optical fiber 90 arranged in the fiber accommodation groove 41*d* between the base plate 41 and the lid plate 42.

In the fusion splicing between the optical fibers 91 and 92 using the fusion splicer 20B shown in FIG. 2, the pair of fiber holders 40 that grip and fix the optical fibers 90 are installed on the respective movable stages 22, the optical fiber glass portions 90*a* exposing the tip portions of the optical fibers 90 are placed on the positioning grooves 23*a* of the grooved substrates 23, and then the cover closing switch 31*d* is turned on.

Since the operation of the fusion splicer 20 after the cover closing switch 31*d* is turned on is the same as that of the covering clamp system fusion splicer 20A, a description thereof is omitted here.

Next, the mechanism (cover opening and closing mechanism 1) that opens and closes the windshield cover 60 of the fusion splicer 20 by the driving force of the electric drive source 9 will be described.

The fusion splicer 20 may be either the covering clamp system or the fiber holder system.

FIGS. 8 to 12 and FIGS. 18A and 18B show a state (closed state) where the windshield cover 60 is closed, and FIGS. 13 to 17 and FIGS. 20A and 20B show a state (fully opened state) where the windshield cover 60 is opened.

As shown in FIG. 8, FIG. 18A, FIG. 18B, FIG. 20A, FIG. 20B, and the like, the cover opening and closing mechanism 1 (a first example of the cover opening and closing mechanism) has the electric drive source 9, a power transmission member 7 that is lifted and lowered by the driving force of the electric drive source 9, and a closed-loop member 2 that transmits the driving force of the electric drive source 9 from the power transmission member 7 to the windshield cover 60.

As shown in FIG. 8, FIGS. 18A to 20B, and the like, the closed-loop member 2 couples power receiving members 4*a* and 4*b*, which are respectively fixed to both ends of a flexible cable member 3, to both ends of a tension coil spring 6, thereby forming a closed loop.

Both ends of the cable member 3 are coupled to each other via the power receiving members 4*a* and 4*b* and the tension coil spring 6.

As the cable member 3 (a wound body), for example, a wire rod, such as a metal wire, yarn constituted of a synthetic fiber, and/or a natural fiber, or a cord, can be adopted.

Additionally, the cable member 3 is not limited to the wire rod, and a belt-like member, such as a belt, may be used.

In addition, the tension coil spring 6 functions as a stretchable elastic member (stretchable member) so that the circumferential length of the closed-loop member 2 can be changed (the closed-loop member 2 is stretchable).

The elastic member is not limited to the tension coil spring 6 but, for example, it is also possible to adopt a member that is largely stretchable, such as a member made of rubber.

As shown in FIG. 8, FIGS. 18A to 20B, and the like, the cable member 3 of the closed-loop member 2 is provided in a state where the cable member is wound in a stretched state around the rotating shaft 61*a* of the windshield cover 60 and a pulley 5 (cable member winding unit, first winding portion, or wound body winding portion) is supported below the rotating shaft 61*a* within the housing 29 of the apparatus body 21.

Here, the rotating shaft 61*a* functions as a cable member wrapping unit (wound body wrapping portion) that wraps the cable member 3.

In addition, the cable member wrapping unit may be a pulley coaxially fixed to the rotating shaft 61*a*.

The pulley 5 is pivotally supported with respect to the housing 29 of the apparatus body 21 by a supporting member (not shown) with a rotation axis substantially parallel to the rotating shaft 61*a* of the windshield cover 60 as a starting point.

The closed-loop member 2 has a pair of inter-member tensioning portions 2A and 2B that extend between the rotating shaft 61a of the windshield cover 60 and the pulley 5 provided below the rotating shaft.

In FIG. 8, FIGS. 18A to 20B, and the like, the pair of inter-member tensioning portions 2A and 2B of the closed-loop member 2 extend in the up-and-down direction.

Out of the pair of inter-member tensioning portions 2A and 2B, one tensioning portion in which the power receiving members 4a and 4b and the tension coil spring 6 are arranged is referred to as an engagement-side tensioning portion 2A.

A non-engagement-side tensioning portion 213 that is the other tensioning portion of the pair of inter-member tensioning portions 2A and 2B is constituted of the cable member 3 as a whole.

Only the cable member 3 of the closed-loop member 2 is wound around the rotating shaft 61a of the windshield cover 60 and the pulley 5.

Additionally, both ends of the cable member 3 are arranged at the engagement-side tensioning portion 2A.

The portion of the cable member 3 wound around an outer periphery of the rotating shaft 61a of the windshield cover 60 is partially fixed to the rotating shaft 61a.

The place where the cable member 3 is fixed to the rotating shaft 61a of the windshield cover 60 is hereinafter referred to as a cable member fixed portion 60a (refer to FIG. 49).

The cable member fixed portion 60a of the illustrated example is the place where the cable member 3 is fixed to the rotating shaft 61a using a cable member fixing member 60b.

However, the cable member fixed portion 60a is not limited to this, but for example, may be a place where the cable member 3 is fixed to the rotating shaft 61a using the cable member fixing member 60b by welding or the like.

Figure 49:
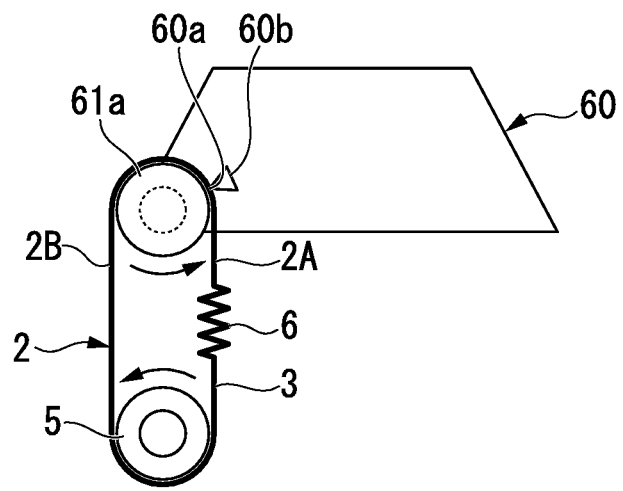
FIG. 49 is a view schematically illustrating the relationship between the closed-loop member of the cover opening and closing mechanism of FIGS. 18A and 18B, and a rotating shaft of the windshield cover and a pulley therebelow.

FIG. 49 shows the position of the cable member fixed portion 60a in a state (a cover closed standby state to be described below) shown in FIGS. 18A and 18B.

Figure 18B:
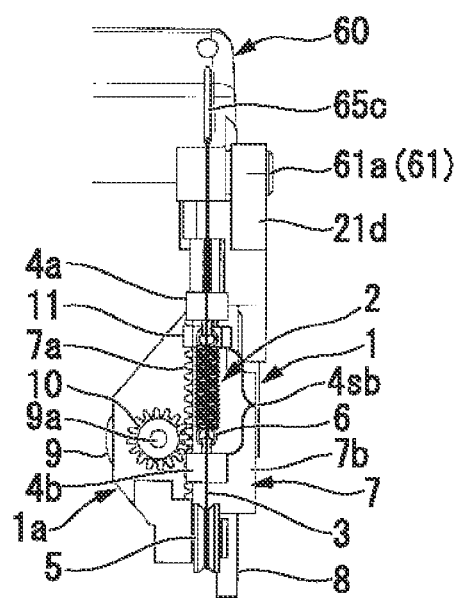
FIG. 18B is a view illustrating a state where the windshield cover is closed, regarding the windshield cover and its opening and closing mechanism of the optical fiber fusion splicer of FIG. 1, and is a partial front view showing the vicinity of the cover opening and closing mechanism of FIG. 11 when viewed from the front side of the splicer.

In the state shown in FIGS. 18A and 18B, as shown in FIG. 49, the cable member fixed portion 60a of the cable member 3 constitutes the end portion of the engagement-side tensioning portion 2A of the portion of the cable member 3 wound around the outer periphery of the rotating shaft 61a of the windshield cover 60.

In FIG. 8, FIGS. 18A to 20B, and the like, the rotating shaft 61a of the windshield cover 60 is fixed to and integrated with the windshield cover 60.

The rotating shaft 61a rotates integrally with the windshield cover 60 with respect to the apparatus body 21.

Therefore, for example, if the rotating shaft 61a is rotated by the rotation of the closed-loop member 2, the windshield cover 60 also rotates integrally with the rotating shaft 61a.

As already described, when the windshield cover 60 is closed with respect to the apparatus body 21, the pair of side plate portions 65a and 65b of the windshield cover 60 are formed apart from each other in the front-and-rear direction of the fusion splicer.

Out of the side plate portions 65a and 65b arranged apart from each other in the front-and-rear direction when the windshield cover 60 is closed with respect to the apparatus body 21, the side plate portion 65a on the front side is hereinafter also referred to as a front side plate portion, and the side plate portion 65b on the rear side is hereinafter also referred to as a rear side plate portion.

As shown in FIG. 8, FIG. 9, and the like, specifically, the rotating shafts 61a and 61b are integrated with the end portion of the front side plate portion 65a opposite to the side where the top plate portion 64 is provided, and are formed so as to extend in the left-and-right direction of the fusion splicer.

Additionally, the rotating shafts 61a and 61b are integrated with both ends of the front side plate portion 65a of the windshield cover 60 in the longitudinal direction (in the left-and-right direction of the fusion splicer).

The end of the rear side plate portion 65a of the windshield cover 60 opposite to the top plate portion 64 is brought into contact with or separated from the upper surface 21a of the apparatus body by the rotation of the windshield cover 60 centered on the rotating shafts 61a and 61b.

As shown in FIG. 8, FIG. 11, FIG. 18A, FIG. 18B, and the like, the cable member 3 of the closed-loop member 2 is wound around the rotating shaft 61a through a cable member insertion hole 65c formed in the front side plate portion 65a of the windshield cover 60.

The cable member insertion hole 65c of the windshield cover 60 is formed to pass through the front side plate portion 65a in the thickness direction, at the position of the front side plate portion 65 near the peripheral surface of the rotating shaft 61a.

The cable member insertion hole 65c of the illustrated example also functions to regulate any positional deviation in the direction of the central axis (in the left-and-right direction of the fusion splicer) with respect to (of) the cable member 3 and the rotating shaft 61a as well as passing the cable member 3 therethrough.

However, a design change is appropriately possible regarding the shape and size of the cable member insertion hole 65c.

For example, when a rotating shaft that has a groove (cable member accommodation groove) accommodating the cable member 3 circumferentially provided in the peripheral surface thereof is adopted as the rotating shaft 61a, the position of the cable member 3 in the direction of the axis of the rotating shaft 61a can be stabilized by the cable member accommodation groove.

For this reason, the cable member insertion hole 65c does not need to have a size such that the positional deviation of the cable member 3 in the left-and-right direction of the fusion splicer is regulated.

In addition, even if the closed-loop member 2 is rotated by the driving force of the drive mechanism 1a of the cover opening and closing mechanism 1, or the manual opening and closing operation of the windshield cover 60, the power receiving members 4a and 4b and the tension coil spring 6 are not arranged at the non-engagement-side tensioning portion 2B, but are always arranged at the engagement-side tensioning portion 2A.

Specifically, the power transmission member 7 illustrated in FIG. 9, FIGS. 18A to 20B, and the like has a rack gear 7b that meshes with a gear 10 fixed to an output shaft 9a (refer to FIG. 18B, FIG. 19B, and the like) of the electric motor 9 (electric drive source), and a pushing protrusion 11 that protrudes from the rack gear 7b.

The power transmission member 7 is able to ascend and descend by the rotational driving of the electric motor 9.

The power transmission member 7 ascends and descends by a linear movement along a guide shaft 8 that is fixed within the housing 29 of the apparatus body 21 and is arranged to extend in the up-and-down direction.

The drive mechanism 1a of the cover opening and closing mechanism 1 has the electric motor 9, the power transmission member 7 that is lifted and lowered by the rotational driving of the electric motor 9, and the pushing protrusion 11 (to be described below) that protrudes from the power transmission member 7.

The output shaft 9a of the electric motor 9 is provided perpendicularly to an extending direction of the guide shaft 8.

The gear 10 (pinion gear) fixed to the output shaft 9a meshes with a toothed portions 7a that are aligned in a plurality of places in an extending direction of the guide shaft 8 arranged on a side surface of the power transmission member 7.

Figure 19A:
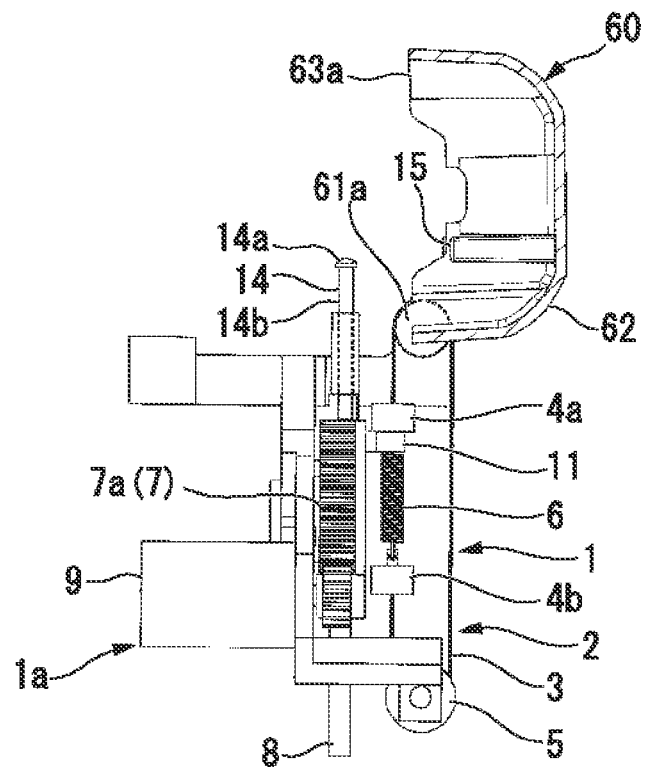
FIG. 19A is a view showing a state when viewed from the same viewpoint as FIG. 18A when the windshield cover is rotated and half-opened from a state shown in FIGS. 18A and 18B by the driving force of the electric drive source regarding the windshield cover and its opening and closing mechanism.
Figure 19B:
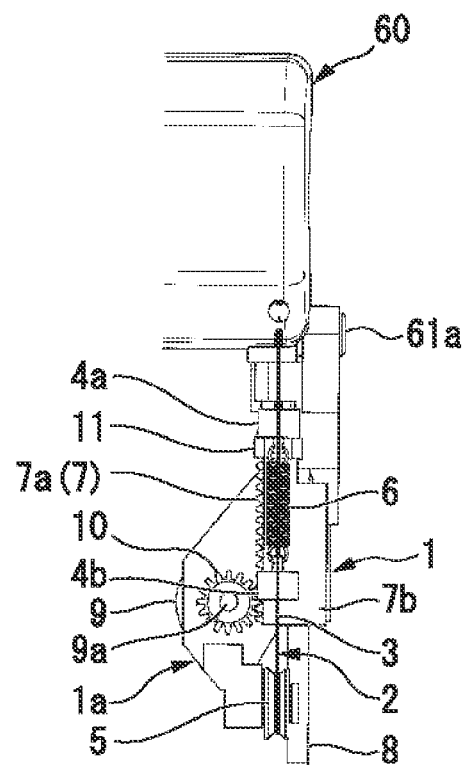
FIG. 19B is a view showing a state when viewed from the same viewpoint as FIG. 18B when the windshield cover is rotated and half-opened from the state shown in FIGS. 18A and 18B by the driving force of the electric drive source regarding the windshield cover and its opening and closing mechanism.

Hereinafter, as for the rotational driving (rotational driving of the output shaft 9a) of the electric motor 9, the rotation of the output shaft 9a that lifts the power transmission member 7, that is, the counterclockwise rotation in FIGS. 18B and 19B, is defined as a normal rotation. Also, the rotation of the output shaft 9a that lowers the power transmission member 7, that is, the clockwise rotation in FIGS. 18B and 19B is defined as a reverse rotation.

As already described, the power transmission member 7 ascends and descends so as to move linearly along the guide shaft 8.

The pair of inter-member tensioning members 2A and 2B of the closed-loop member 2 extend along the guide shaft 8.

The movement direction of the power transmission member 7 by the rotational driving of the electric motor 9 coincides with the extending direction of the inter-member tensioning portions 2A and 2B.

As shown in FIG. 9 or the like, in the rack gear 7b of the power transmission member 7, the toothed portions 7a formed in the side surface of the rack gear mesh with the gear 10 fixed to the output shaft 9a of the electric motor 9 (electric drive source).

The pushing protrusion 11 of the power transmission member 7 accommodates a portion of the tension coil spring 6 (elastic member) in its axis direction, in a cutout recess 11c that is recessed to the side where the rack gear 7b is provided from a protruding end thereof, and is arranged between the pair of power receiving members 4a and 4b of the engagement-side tensioning portion 2A (refer to FIGS. 18A and 18B).

The power transmission member 7 in an extending direction (downward direction) of the power transmission member 7 moves relative to the engagement-side tensioning portion 2A, and thereby, the pushing protrusion 11 moves along an outer periphery of the tension coil spring 6 arranged inside the cutout recess 11c.

Additionally, the pushing protrusion 11 is provided so as not to be directly fixed to the cable member or the cable member winding unit.

The size of the power receiving members 4a and 4b in a direction perpendicular to an extending direction of the engagement-side tensioning portion 2A (refer to FIGS. 18A and 18B) is made larger than the external diameter of the tension coil spring 6.

As shown in FIGS. 18A to 20B, the windshield cover 60 is opened by lifting the power transmission member 7 by the normal rotational driving of the electric motor 9 (the cover opening operation).

The cover opening operation is the operation in which the power transmission member 7 is lifted by the normal rotational driving of the electric motor 9, and thereby, the power receiving member 4a (hereinafter also referred to as an upper receiving member) arranged on the upper side of the tension coil spring 6 is pushed up by the pushing protrusion 11 that comes into contact with the power receiving member in a butting state from therebelow, and the engagement-side tensioning portion 2A is fed and moved up together with the upper receiving member 4a.

A tensile force applied to the cable member 3 and the cable member fixed portion 60a (refer to FIG. 49) via the tension coil spring 6 by the feed movement of the engagement-side tensioning portion 2A acts on the rotating shaft 61a as a driving force that rotates the windshield cover 60 in an opening direction.

Here, the direction of the tensile force applied to the cable member 3, which rotates the windshield cover 60 in the opening direction, is referred to as a normal direction.

The tensile force is transmitted from the upper receiving member 4a via the tension coil spring 6 and the power receiving member 4b (hereinafter also referred to as a lower receiving member) therebelow to the cable member fixed portion 60a, in the closed-loop member 2. (Hereinafter, the interval from the upper receiving member 4a to the cable member fixed portion 60a is also referred to as a pulling interval at the time of cover opening.)

The tension (tensile force) applied to the pulling interval at the time of cover opening by the feed movement acts on the rotating shaft 61a as a driving force that rotates the windshield cover 60 in the opening direction.

Figure 20A:
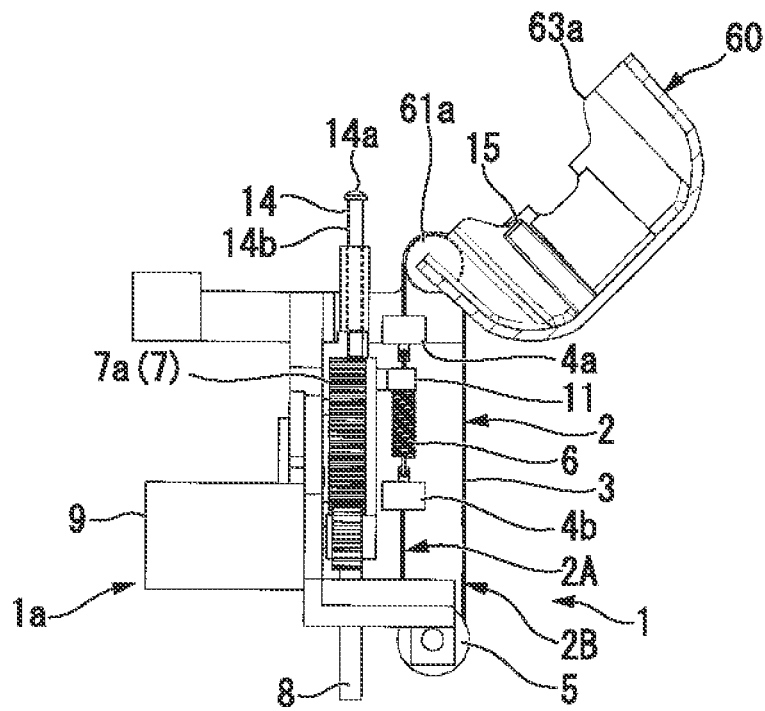
FIG. 20A is a view showing a state when viewed from the same viewpoint as FIG. 18A when the windshield cover is further rotated and fully opened from a state shown in FIGS. 19 and 19B regarding the windshield cover and its opening and closing mechanism.
Figure 20B:
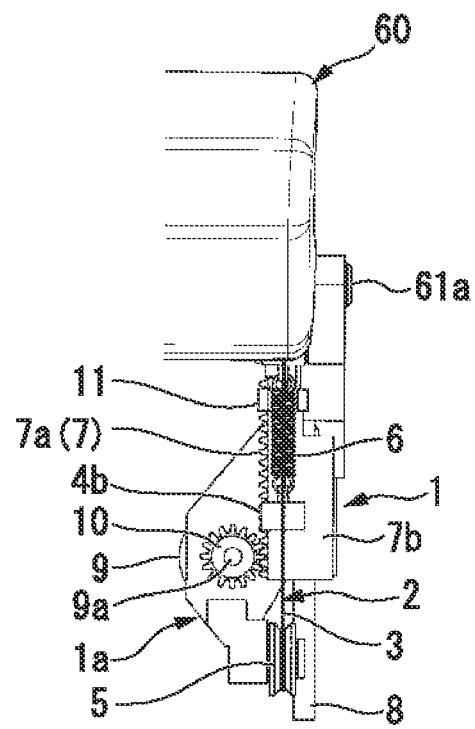
FIG. 20B is a view showing a state when viewed from the same viewpoint as FIG. 18B when the windshield cover is further rotated and fully opened from a state shown in FIGS. 19A and 19B regarding the windshield cover and its opening and closing mechanism.

As a result, with the rotation of the whole closed-loop member 2, the windshield cover 60 rotates together with the rotating shaft 61a to which the cable member 3 is fixed, and the windshield cover 60 is brought into a state (opened state) where the windshield cover is opened with respect to the apparatus body 21 as shown in FIGS. 20A and 20B.

In FIGS. 18A to 20B, the windshield cover 60 in the closed state is rotated by approximately 135 degrees and is fully opened.

In FIG. 49, the cable member fixed portion 60a is moved in a direction to the side opposite to where engagement-side tensioning portion 2A is provided, by the rotation of the rotating shaft 61a of the windshield cover 60 accompanying the progress of the cover opening operation, and is provided on the side where the non-engagement-side tensioning portion 2B is provided, when the cover opening operation is completed.

Figure 15:
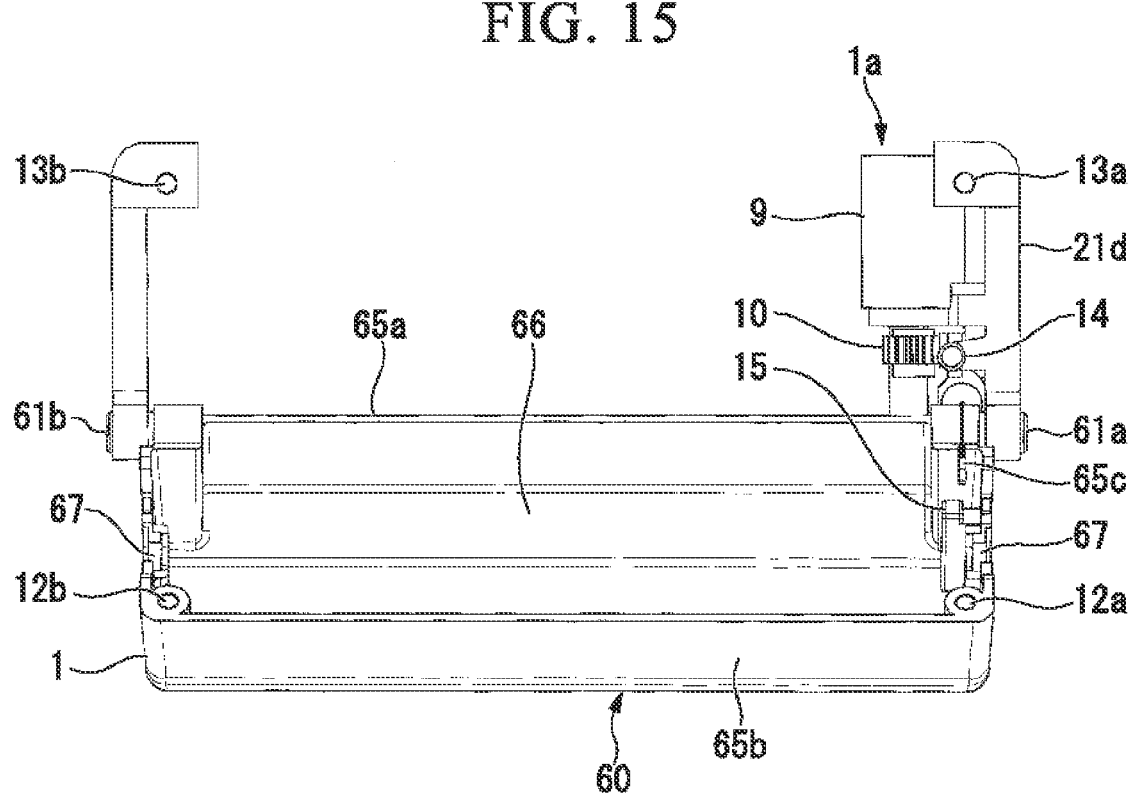
FIG. 15 is a plan view showing a state where the windshield cover and its opening and closing mechanism of FIG. 13 are viewed from the upper side of the splicer.
Figure 16:
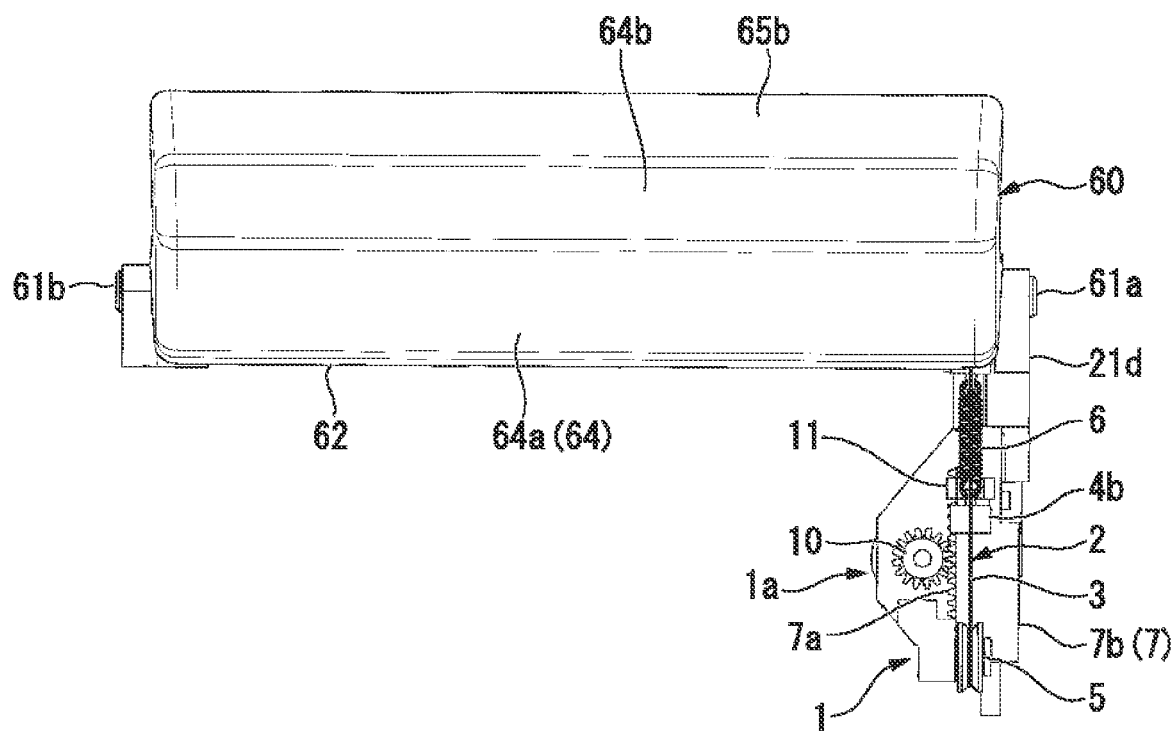
FIG. 16 is a front view showing a state where the windshield cover and its opening and closing mechanism of FIG. 13 are viewed from the front side of the splicer.
Figure 17:
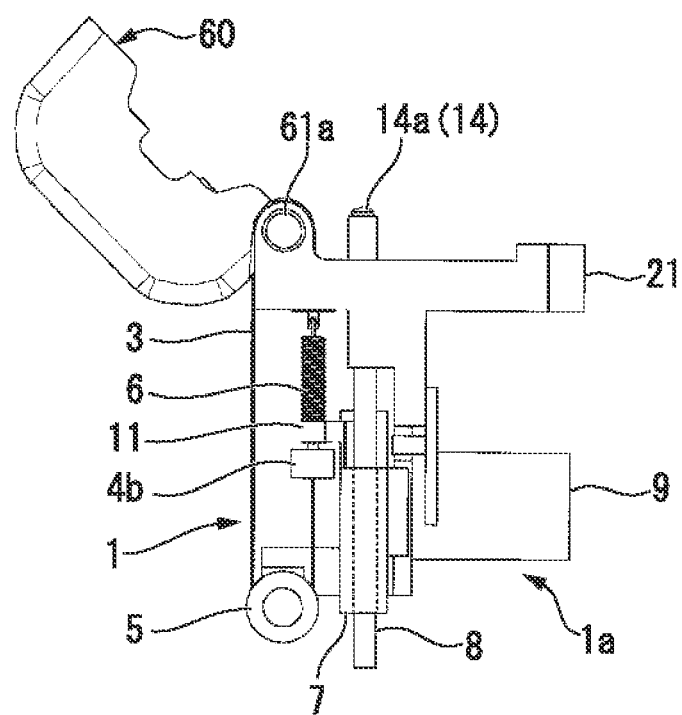
FIG. 17 is a view (right side view) showing a state where the windshield cover and its opening and closing mechanism of FIG. 13 are viewed from the right side of the splicer.

As shown in FIG. 15, magnets 12a and 12b are attached to the opening portion side of the windshield cover 60.

Figure 13:
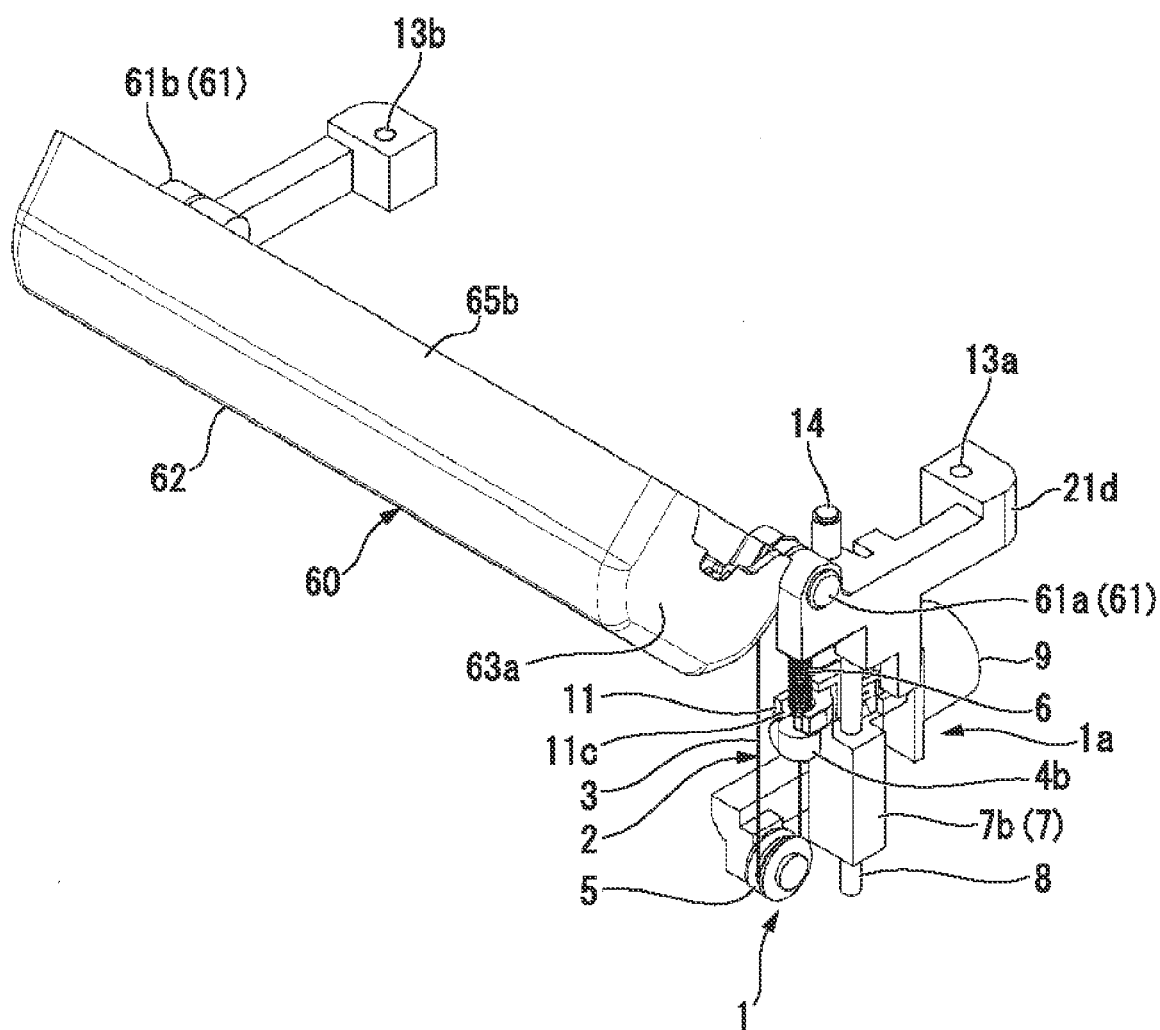
FIG. 13 is a view illustrating the windshield cover and its opening and closing mechanism of FIG. 1, and is a perspective view showing a state where the windshield cover is opened by a cover opening operation performed by driving an electric drive source from the state of FIG. 8 when viewed from the diagonally front upper right side of the splicer.
Figure 14:
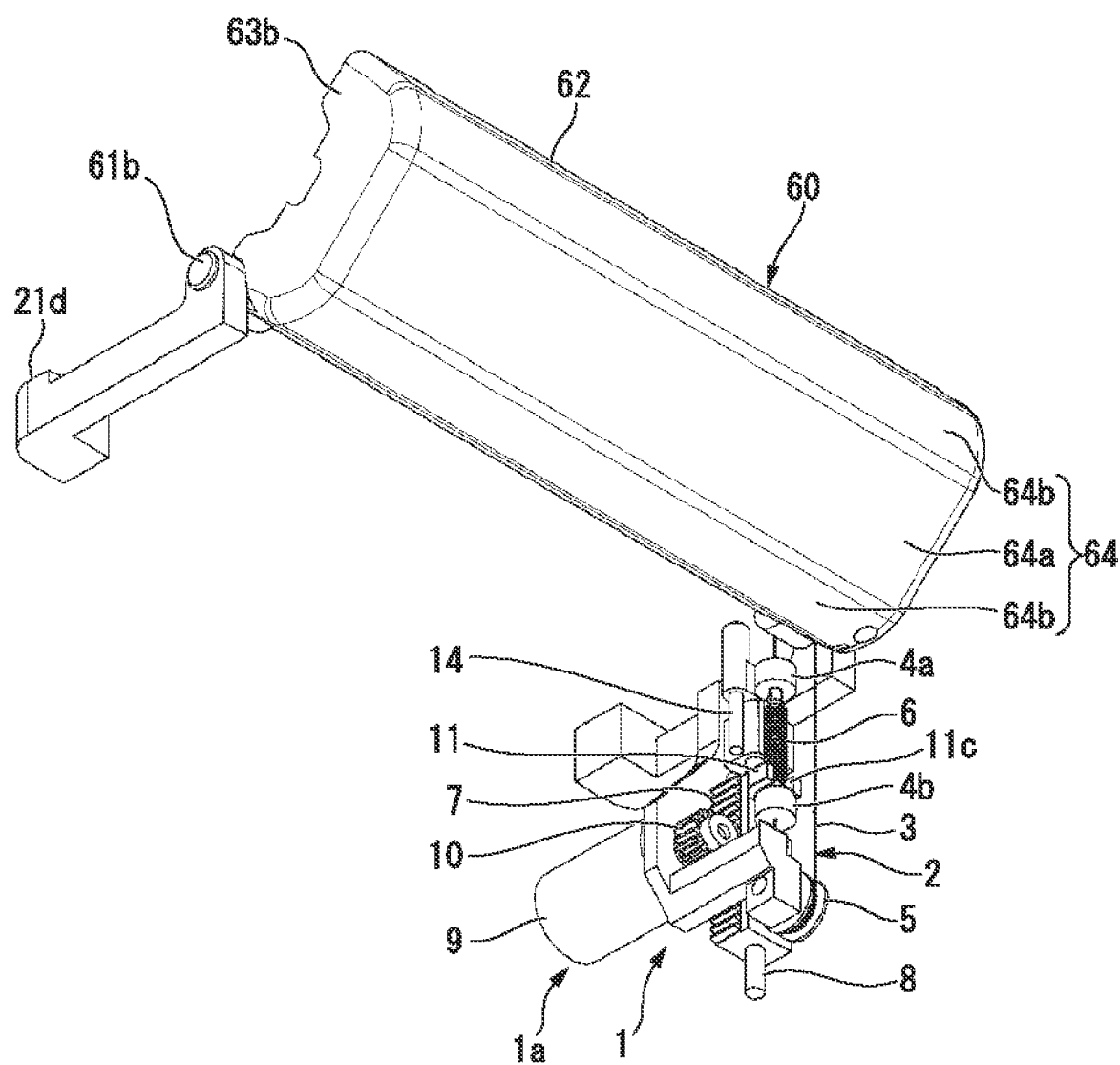
FIG. 14 is a perspective view showing a state where the windshield cover and its opening and closing mechanism of FIG. 13 are viewed diagonally from the front lower left side of the splicer.

As shown in FIGS. 6, 13, and 15, magnet catches 13a and 13b formed of a magnetic material, such as iron, are attached to the upper portion of the apparatus body 21.

The magnet catches 13a and 13b are provided at positions corresponding to the magnets 12a and 12b of the windshield cover 60 when the windshield cover 60 is brought into the closed state.

The windshield cover 60 brought into the closed state is not inadvertently opened due to vibration or the like because the magnets 12a and 12b attract the magnet catches 13a and 13b.

As shown in FIGS. 18A to 20B, the cover opening and closing mechanism 1 has the thrust-up shaft 14 that pushes up the windshield cover 60 in the closed state toward the upside from below the windshield cover in the cover opening operation.

The thrust-up shaft 14 has a head portion 14a and a shaft portion 14b that extends from the head portion 14a.

The thrust-up shaft 14 is elevatably supported by an upper supporting member 21d that is fixed to the housing 29 and is assembled into the upper portion of the apparatus body 21.

In the thrust-up shaft 14, the shaft portion 14b is elevatably inserted into a shaft accommodation hole 21e that passes through the upper supporting member 21d in the up-and-down direction, and the head portion 14a is arranged on the upper supporting member 21d.

The orientation of the shaft portion 14b of the thrust-up shaft 14 that extends in the up-and-down direction with respect to the apparatus body 21 is maintained by the inner surface of the shaft accommodation hole 21e of the upper supporting member 21d.

Since the size of the head portion 14a of the thrust-up shaft 14 in a direction perpendicular to the longitudinal direction of the shaft portion 14b is larger compared to the cross-section of the shaft accommodation hole 21e, the head portion does not enter the shaft accommodation hole 21e.

The position where the head portion 14a of the thrust-up shaft 14 comes into contact with the upper supporting member 21d from above the upper supporting member is a descent limit position thereof with respect to the upper supporting member 21d.

As shown in FIGS. 18A and 18B, the dimension of the shaft portion 14b of the thrust-up shaft 14 in the length direction is larger than the dimension of the shaft accommodation hole 21e in the axis direction.

Accordingly, the shaft portion 14b of the thrust-up shaft 14 protrudes downward from the shaft accommodation hole 21e when the thrust-up shaft 14 is at the descent limit position thereof with respect to the upper supporting member 21d.

FIGS. 18A and 18B show a state where the windshield cover 60 is closed, and the pushing protrusion 11 of the power transmission member 7 is arranged in proximity to the upper receiving member 4a via a slight gap.

In addition, the cover opening and closing mechanism 1 is brought into a state shown in FIGS. 18A and 18B after the completion of the cover closing operation shown in FIGS. 22A, 22B, 23A, and 23B.

The state shown in FIGS. 18A and 18B regarding the windshield cover 60 and the cover opening and closing mechanism 1 is hereinafter also referred to as a cover closed standby state.

The windshield cover 60 and the cover opening and closing mechanism 1 are also brought into the cover closed standby state even when the power switch of the fusion splicer 20 is turned off from ON and the fusion splicer 20 is brought into the operation standby initial state.

When the cover opening and closing mechanism 1 is in the cover closed standby state, the power transmission member 7 is at a position apart downward from a lower end of the shaft portion 14b of the thrust-up shaft 14 at the descent limit position.

As shown in FIGS. 18A to 20B, when the cover opening and closing mechanism 1 executes the cover opening operation from the cover closed standby state, the power transmission member 7 that ascends by the driving force of the electric drive source 9 comes into contact with the lower end of the shaft portion 14b of the thrust-up shaft 14 in a butting state, and pushes the thrust-up shaft 14 upward.

As a result, the windshield cover 60 is thrust up and opened by the thrust-up shaft 14.

The fusion splicer 20 realizes both the rotation of the closed-loop member 2 accompanying the ascent of the power transmission member 7 and the thrust-up of the windshield cover 60 by the thrust-up shaft 14 by the normal rotational driving of the electric motor 9, thereby performing the cover opening operation of opening the windshield cover 60 in the closed state.

As shown in FIGS. 9, 18A, 18B, 19A, and 19B, a shaft butting portion 15, with which the thrust-up shaft 14 (specifically, the head portion 14a) pushed up by the power transmission member 7 comes into contact in a butting state, is provided so as to protrude from the inner side of the windshield cover 60.

Specifically, the shaft butting portion 15 protrudes toward the opening portion side of the windshield cover 60 from the top plate portion 64 (specifically, the flat plate portion 64a) of the windshield cover 60.

The thrust-up shaft 14 pushed up by the power transmission member 7 comes into contact with the shaft butting portion 15 in a state where the head portion 14a of the upper end of the thrust-up shaft butts against the shaft butting portion, and pushes up the windshield cover 60.

As shown in FIG. 19A, FIG. 19B, and the like, the thrust-up of the windshield cover 60 by the thrust-up shaft 14 is ended as the shaft butting portion 15 moves to a position where the shaft butting portion is not able to come into contact with the upper end of the thrust-up shaft 14 with the rotation of the windshield cover 60.

The rotation of the closed-loop member 2 accompanying the ascent of the power transmission member 7 proceeds in parallel with the thrust-up of the windshield cover 60 by the thrust-up shaft 14, and continues proceeding even after the end of the thrust-up by the thrust-up shaft 14.

In the cover opening operation, the windshield cover 60 is rotated only by the driving force of the electric drive source 9 after the end of the thrust-up by the thrust-up shaft 14 until the operation (cover opening driving operation to be described below) of opening the windshield cover 60 by the normal rotational driving of the electric motor 9 is completed.

In the configuration in which the power transmission member 7 thrusts up the windshield cover 60 by the thrust-up shaft 14 that is pushed-up by the power transmission member, the windshield cover 60 is reliably pushed up and opened against an attractive force with which the magnets 12a and 12b (refer to FIG. 15 and the like) of the windshield cover 60 in the closed state attract the magnet catches 13a and 13b.

The attractive force that acts between the magnets 12a and 12b and the magnet catches 13a and 13b becomes rapidly weak if the distance between the magnets 12a and 12b and the magnet catches 13a and 13b increases.

In the fusion splicer 20, in the cover opening operation, the thrust-up shaft 14 pushes up (thrusts up) the windshield cover 60 in the closed state from the apparatus body 21, thereby increasing the distance between the magnets 12a and 12b and the magnet catches 13a and 13b.

In the cover opening operation, when the push-up (thrust-up) of the windshield cover 60 by the thrust-up shaft 14 is completed, the attractive force of the magnets 12a and 12b does not act on the windshield cover 60 almost or completely compared to when the rotation of the windshield cover 60 in the closed state is started.

After the completion of the thrust-up of the windshield cover 60 by the thrust-up shaft 14, the rotational resistance (rotational resistance in the opening direction) of the windshield cover 60 by the attractive force of the magnets 12a and 12b decreases compared to when the rotation of the windshield cover 60 in the closed state is started.

Accordingly, after the thrust-up of the windshield cover 60 by the thrust-up shaft 14 is completed, the driving force of the electric drive source 9 for rotating the windshield cover 60 in the opening direction is small compared to when the rotation of the windshield cover 60 in the closed state is started.

FIGS. 19A and 19B show a state (half-opened state) where the windshield cover 60 is rotated 90 degrees from the closed state.

The operation (hereinafter also referred to as a cover opening driving operation) of opening the windshield cover 60 by the normal rotational driving of the electric motor 9 is completed by rotating the windshield cover 60 up to an angle that exceeds 90 degrees from the closed state.

The cover opening operation of the fusion splicer 20 includes an operation (self-weight opening operation) in which the windshield cover 60 is further opened with its own weight after the completion of the cover opening driving operation.

The fusion splicer 20 reaches the fully opened state shown in FIGS. 20A and 20B as the windshield cover 60 is further opened due to its self-weight after the completion of the cover opening driving operation.

This completes the cover opening operation.

The upper receiving member 4a abuts against the pushing protrusion 11 of the power transmission member 7 when the cover opening driving operation is completed.

As shown in FIGS. 20A and 20B, the upper receiving member 4a ascends and is separated upward from the pushing protrusion 11 of the power transmission member 7 as the windshield cover 60 is opened by the self-weight opening operation after the completion of the cover opening driving operation.

As a result, when the cover opening operation is completed, a slight gap is secured between the pushing protrusion 11 and the upper receiving member 4a.

In the illustrated example, the ascent amount of the upper receiving member 4a by the self-weight opening operation of the windshield cover 60 is set to be markedly small compared to the separation distance between the upper and lower power receiving members 4a and 4b.

In addition, the dimension of the pushing protrusion 11 of the illustrated example in the direction (up-and-down direction) in which the upper and lower power receiving members 4a and 4b face each other is markedly small compared to the separation distance between the power receiving members 4a and 4b.

Figure 21A:
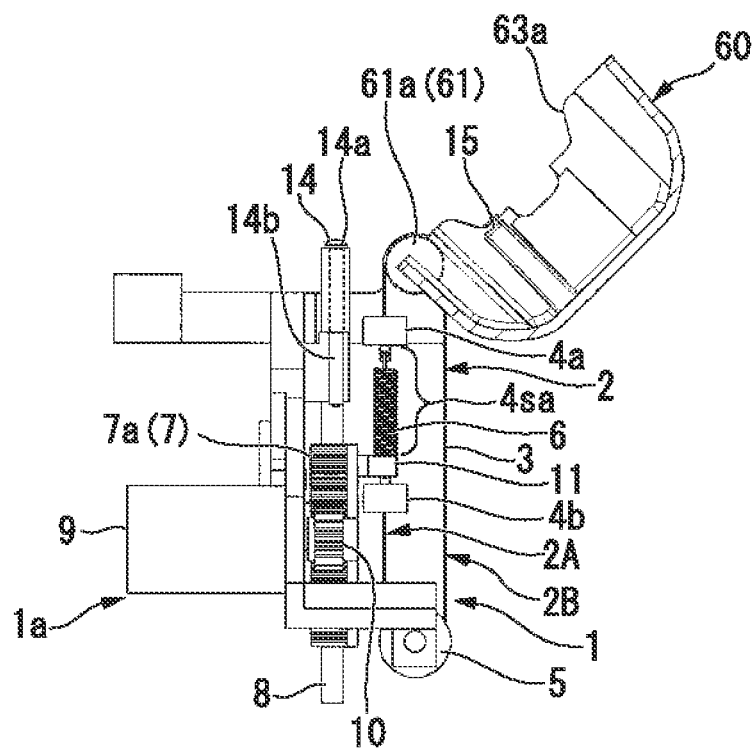
FIG. 21A is a view showing a state when viewed from the same viewpoint as FIG. 18A when a pushing protrusion of the cover opening and closing mechanism is lowered from a state shown in FIGS. 20A and 20B by the driving of the electric drive source and is arranged in proximity to a lower power receiving member of a closed-loop member regarding the windshield cover and its opening and closing mechanism.
Figure 21B:
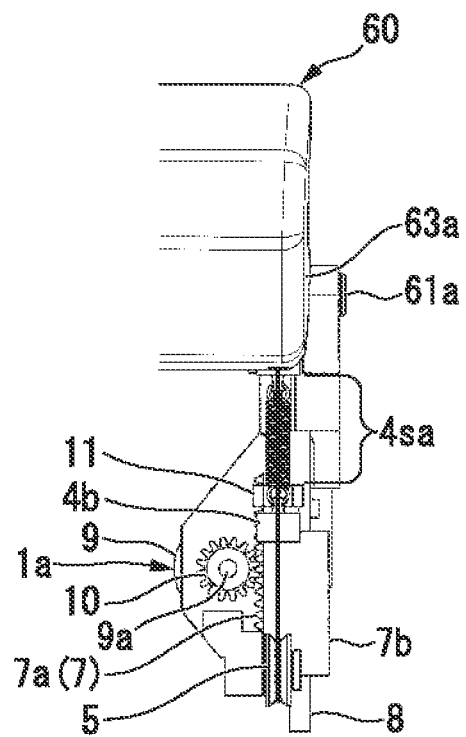
FIG. 21B is a view showing a state when viewed from the same viewpoint as FIG. 18B when the pushing protrusion of the cover opening and closing mechanism is lowered from the state shown in FIGS. 20A and 20B using the driving of the electric drive source and is arranged in proximity to the lower power receiving member of the closed-loop member regarding the windshield cover and its opening and closing mechanism.
Figure 22A:
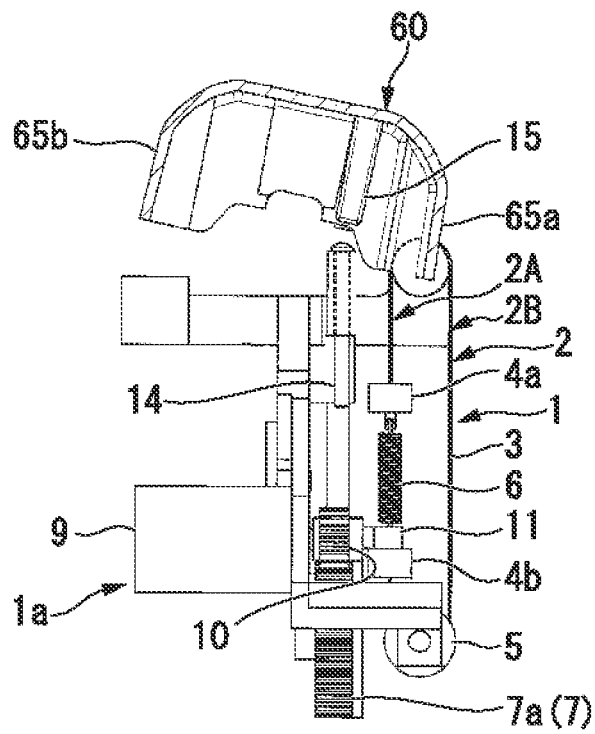
FIG. 22A is a view showing a state when viewed from the same viewpoint as FIG. 18A when the windshield cover is rotated and half-opened from a state shown in FIGS. 21A and 21B by the driving of the electric drive source regarding the windshield cover and its opening and closing mechanism.
Figure 22B:
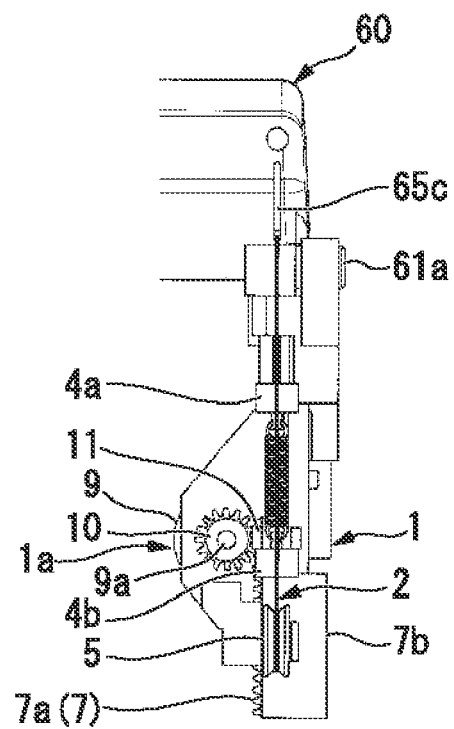
FIG. 22B is a view showing a state when viewed from the same viewpoint as FIG. 18B when the windshield cover is rotated and half-opened from a state shown in FIGS. 21A and 21B using the driving of the electric drive source regarding the windshield cover and its opening and closing mechanism.

If the cover opening operation is completed, then, as shown in FIGS. 21A and 21B, the fusion splicer 20 performs the operation of reversely rotationally driving the electric motor 9, lowering the power transmission member 7, and arranging the pushing protrusion 11 at a position near the lower receiving member 4b.

This operation is hereinafter also referred to as a protrusion shift operation after opening of a cover.

The pushing protrusion 11 is arranged in proximity to the lower receiving member 4b via a slight gap at a position near the lower receiving member 4b by the protrusion shift operation after opening of the cover.

It is advantageous to move the pushing protrusion 11 and arrange the pushing protrusion in the vicinity of the lower receiving member 4b by the protrusion shift operation after opening of the cover following the completion of the cover opening operation in that the rotation of the windshield cover 60 is more rapidly started when the driving of the electric drive source 9 is started in the subsequent cover closing operation.

The windshield cover 60 and the cover opening and closing mechanism 1 are brought into a state (hereinafter also referred to as a cover opened standby state) shown in FIGS. 21A and 21B, when the fusion splicer 20 is in the fiber set standby state.

In addition, the thrust-up shaft 14 of the cover opening and closing mechanism 1 is arranged at the descent limit position thereof with respect to the upper supporting member 21d when the cover opening and closing mechanism 1 is brought into the cover opened standby state.

The cover closing operation of the fusion splicer 20 that brings the windshield cover 60 in the opened state shown in FIGS. 21A and 21B into the closed state is realized by the reverse rotating driving of the electric motor 9.

This cover closing operation lowers the power transmission member 7 by the reverse rotational driving of the electric motor 9 from the state shown in FIGS. 21A and 21B (refer to FIGS. 22A and 22B), and pushes down the lower receiving member 4b of the closed-loop member 2 by the pushing protrusion 11 that comes into contact with the lower receiving member 4b in a butting state from thereabove.

This allows the rotating shaft 61a of the windshield cover 60 to be rotated with a tension (tensile force) that acts on the cable member 3 via the tension coil spring 6 from the lower receiving member 4b.

As a result, the windshield cover 60 in the opened state is rotated in the closing direction.

Here, the direction of a tensile force applied to the cable member 3 that rotates the windshield cover 60 in the closing direction is referred to as a reverse direction.

The operation (hereinafter also referred to as a cover closing driving operation) of closing the windshield cover 60 by the reverse rotational driving of the electric motor 9 is completed by rotating the windshield cover 60 in the opened state until the windshield covers 60 reaches a downward rotatable angle due to its self-weight, such as an angle equal to or less than 45 degrees from the closed state.

Figure 23A:
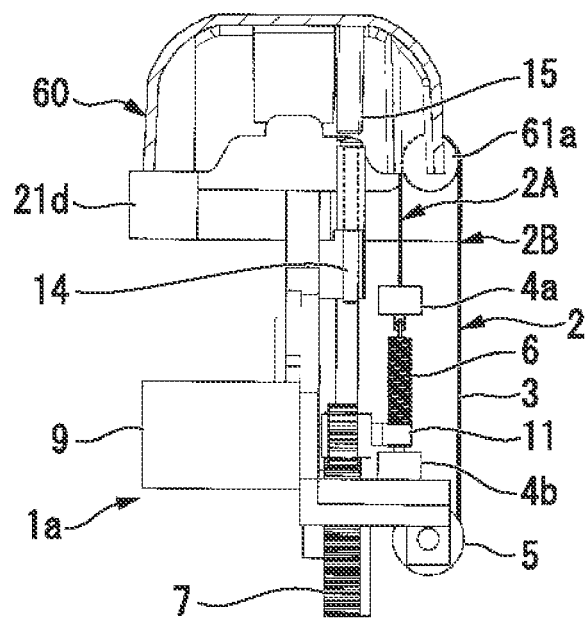
FIG. 23A is a view showing a state when viewed from the same viewpoint as FIG. 18A when the operation of closing the windshield cover from a state shown in FIGS. 22A and 22B is completed regarding the windshield cover and its opening and closing mechanism.
Figure 23B:
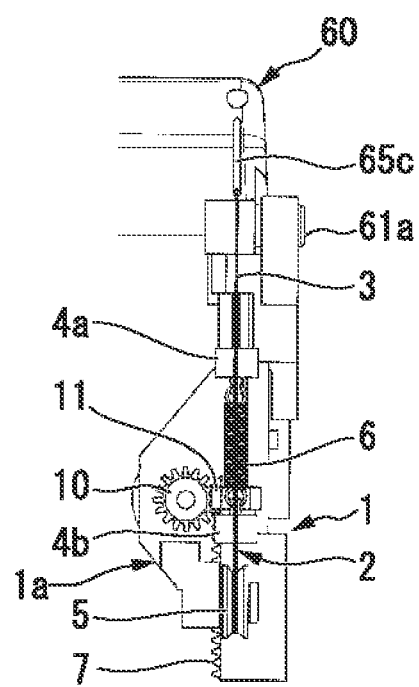
FIG. 23B is a view showing a state when viewed from the same viewpoint as FIG. 18B when the operation of closing the windshield cover from the state shown in FIGS. 22A and 22B is completed regarding the windshield cover and its opening and closing mechanism.

The fusion splicer 20 reaches the closed state shown in FIGS. 23A and 23B as the windshield cover 60 rotates downward due to its self-weight (self-weight closing operation) after the completion of the cover closing driving operation.

This completes the cover opening operation.

The cover closing operation of the fusion splicer 20 includes a self-weight closing operation after the completion of the cover closing driving operation.

The lower receiving member 4b abuts against the pushing protrusion 11 of the power transmission member 7 when the cover closing driving operation is completed.

As shown in FIGS. 23A and 23B, the lower receiving member 4b separates downward from the pushing protrusion 11 of the power transmission member 7 as the windshield cover 60 is closed by the self-weight closing operation after the completion of the cover closing driving operation.

As a result, when the cover closing operation is completed, a slight gap is secured between the pushing protrusion 11 and the lower receiving member 4b.

If the cover closing operation is completed, then the fusion splicer 20 performs the operation (hereinafter also referred to as a protrusion shift operation after cover closing) of arranging the pushing protrusion 11 at a position near the upper receiving member 4a by the normal rotational driving of the electric motor 9.

As a result, the cover opening and closing mechanism 1 is brought into the cover closed standby state shown in FIGS. 18A and 18B.

The pushing protrusion 11 is arranged in proximity to the upper receiving member 4a via a slight gap from the upper receiving member 4a by the protrusion shift operation after cover closing.

It is advantageous to move the pushing protrusion 11 and arrange the pushing protrusion in the vicinity of the upper receiving member 4a by the protrusion shift operation after cover closing after the completion of the cover closing operation in that the rotation of the windshield cover 60 is more rapidly started when the driving of the electric drive source 9 is started in the subsequent cover opening operation.

In addition, the electric drive source is not limited to the electric motor 9. For example, a solenoid or the like may be used.

In the case of the solenoid, a configuration in which the power transmission member 7 is lifted and lowered by the movement of a plunger that is internally inserted into an external cylinder member such that the protruding amount of the plunger is variable can be adopted as the drive mechanism 1a of the cover opening and closing mechanism 1.

(Manual Opening and Closing Operation)

In the fusion splicer 20, when the windshield cover 60 is closed as shown in FIGS. 18A and 18B, an operator can directly touch the windshield cover 60 with his/her fingers, and manually operate opening and closing the windshield cover 60 without displacing the power transmission member 7.

Additionally, in the fusion splicer 20, when the windshield cover 60 is closed (brought into the fully opened state) as shown in FIGS. 21A and 21B, the operator can directly touch the windshield cover 60 with his/her fingers, and manually operate opening and closing the windshield cover 60 without displacing the power transmission member 7.

Figure 24A:
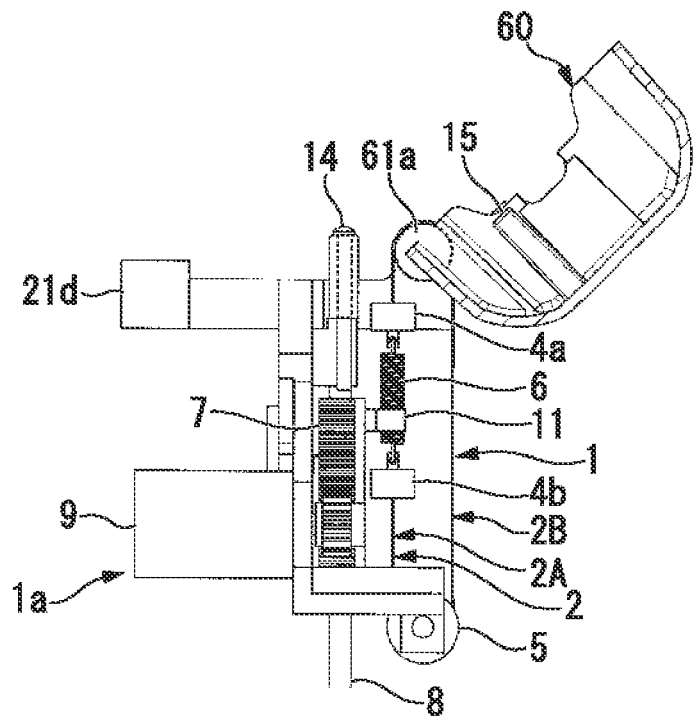
FIG. 24A is a view showing a state when viewed from the same viewpoint as FIG. 18A when the windshield cover is manually opened from the state shown in FIGS. 18A and 18B regarding the windshield cover and its opening and closing mechanism.
Figure 24B:
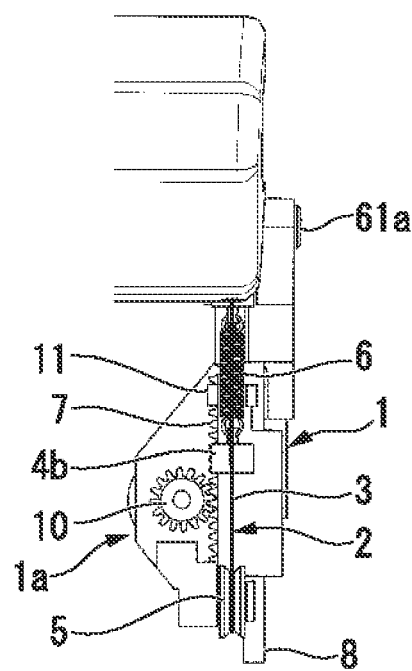
FIG. 24B is a view showing a state when viewed from the same viewpoint as FIG. 18B when the windshield cover is manually opened from the state shown in FIGS. 18A and 18B regarding the windshield cover and its opening and closing mechanism.

In the fusion splicer 20, if the windshield cover 60 in the closed state is manually opened from the state shown in FIGS. 18A and 18B, the upper and lower power receiving members 4a and 4b of the closed-loop member 2 ascend by the rotation of the windshield cover 60 and the closed-loop member 2 accompanying the rotation of the rotating shaft 61a of the windshield cover, and thereby, a state shown in FIGS. 24A and 24B is brought about.

Here, the upper and lower power receiving members 4a and 4b ascend until the windshield cover 60 reaches an opening limit position (in the present embodiment, a position as shown by a virtual line in FIG. 3 where the windshield cover 60 come into contact with the upper surface 21a of the apparatus body in a butting state; a position when being fully opened) thereof with respect to the apparatus body 21.

As shown in FIGS. 24A and 24B, when the windshield cover 60 reaches the opening limit position thereof with respect to the apparatus body 21, the lower receiving member 4b does not come into contact with the pushing protrusion 11, and is arranged at a position apart downward from the pushing protrusion 11.

Accordingly, in the fusion splicer 20, the windshield cover 60 can be manually opened to the fully opened state from the state shown in FIGS. 18A and 18B without displacing the power transmission member 7.

Additionally, the fusion splicer 20 returns to the state shown in FIGS. 18A and 18B if the windshield cover 60 is manually closed from the state shown in FIGS. 24A and 24B.

The lower receiving member 4b descends from the position shown in FIGS. 24A and 24B to the position shown in FIGS. 18A and 18B.

Accordingly, in the fusion splicer 20, the windshield cover 60 can be manually opened and closed from the state shown in FIGS. 18A and 18B without displacing the power transmission member 7.

In the fusion splicer 20, even if the windshield cover 60 is manually opened and closed from the state shown in FIGS. 18A and 18B, the power transmission member 7 is not displaced. Therefore, the output shaft 9a of the electric motor 9 is not rotated, and the electric drive source 9 is not affected.

Accordingly, in the fusion splicer 20, the drive mechanism 1a constituted of the electric motor 9, the gear 10, and the power transmission member 7 is not damaged, for example, due to excessive movement of the power transmission member 7.

Additionally, even if it the windshield cover 60 is manually opened and closed, the power transmission member 7 is not displaced. Therefore, for example, when a stepping motor is used as the electric motor 9 in order to control the opening and closing operation of the windshield cover 60, an opening and closing operation control of the windshield cover 60 is not affected.

As shown in FIGS. 18A and 18B, the separation distance between the pushing protrusion 11 and the lower receiving member 4b when the cover opening and closing mechanism 1 is in the cover closed standby state is larger than the movement distance of the lower receiving member 4b when the windshield cover 60 is manually opened to the fully opened state.

Accordingly, by providing a space 4sb secured between the pushing protrusion 11 and the lower receiving member 4b, the lower receiving member 4b is enabled to ascend and descend without coming into contact with the pushing protrusion 11 when manual opening and closing of the windshield cover 60 are performed.

Figure 25A:
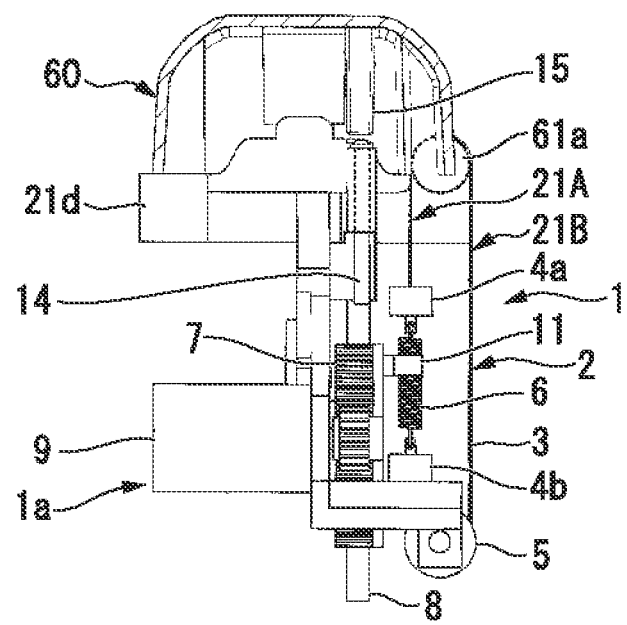
FIG. 25A is a view showing a state when viewed from the same viewpoint as FIG. 18A when the windshield cover is manually closed from the state shown in FIGS. 21A and 21B regarding the windshield cover and its opening and closing mechanism.
Figure 25B:
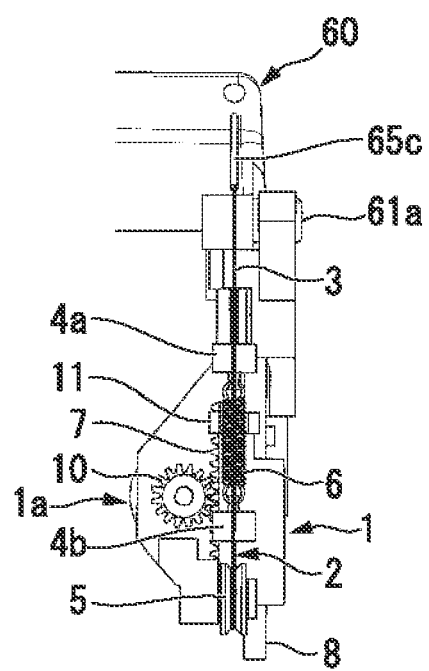
FIG. 25B is a view showing a state when viewed from the same viewpoint as FIG. 18B when the windshield cover is manually closed from the state shown in FIGS. 21A and 21B regarding the windshield cover and its opening and closing mechanism.

In the fusion splicer 20 related to the invention, if the windshield cover 60 in the opened state is manually closed from the state shown in FIGS. 21A and 21B, the upper and lower power receiving members 4a and 4b of the closed-loop member 2 descend by the rotation of the windshield cover 60 and the closed-loop member 2 accompanying the rotation of the rotating shaft 61a of the windshield cover, and thereby, a state shown in FIGS. 25A and 25B is brought about.

Additionally, as shown in FIGS. 25A and 25B, the upper receiving member 4b does not come into contact with the pushing protrusion 11, and is arranged at a position where the separation distance from the pushing protrusion 11 to the upper side is secured.

Accordingly, in the fusion splicer 20, the windshield cover 60 can be manually closed from the state shown in FIGS. 21A and 21B without displacing the power transmission member 7.

Additionally, the fusion splicer 20 returns to the state shown in FIGS. 21A and 21B if the windshield cover 60 is manually opened from the state shown in FIGS. 25A and 25B.

The upper receiving member 4a ascends from the position shown in FIGS. 25A and 25B to the position shown in FIGS. 21A and 21B.

Accordingly, in the fusion splicer 20, the windshield cover 60 can be manually opened and closed from the state shown in FIGS. 21A and 21B without displacing the power transmission member 7.

When the power transmission member 7 is not displaced even if the windshield cover 60 is manually opened and closed from the state shown in FIGS. 21A and 21B, the output shaft 9a of the electric motor 9 is not rotated, and the electric drive source 9 is not affected.

Accordingly, in the fusion splicer 20, for example, the drive mechanism 1a that rotationally drives the closed-loop member 2 is not damaged, for example, due to excessive movement of the power transmission member 7.

Additionally, this configuration keeps an opening and closing operation control of the windshield cover 60 from being affected, for example, when a stepping motor is used as the electric motor 9 in order to control the opening and closing operation of the windshield cover 60.

As shown in FIGS. 21A and 21B, the separation distance between the pushing protrusion 11 and the upper receiving member 4a when the cover opening and closing mechanism 1 is in the cover opened standby state is larger than the movement distance of the upper receiving member 4a when the windshield cover 60 in the fully opened state is manually closed.

Accordingly, by providing a space 4sa secured between the pushing protrusion 11 and the upper receiving member 4a, the upper receiving member 4a is enabled to ascend and descend without coming into contact with the pushing protrusion 11 when manual opening and closing of the windshield cover 60 are performed.

(When Obstacle in Opening and Closing of Windshield Cover)

Figure 26A:
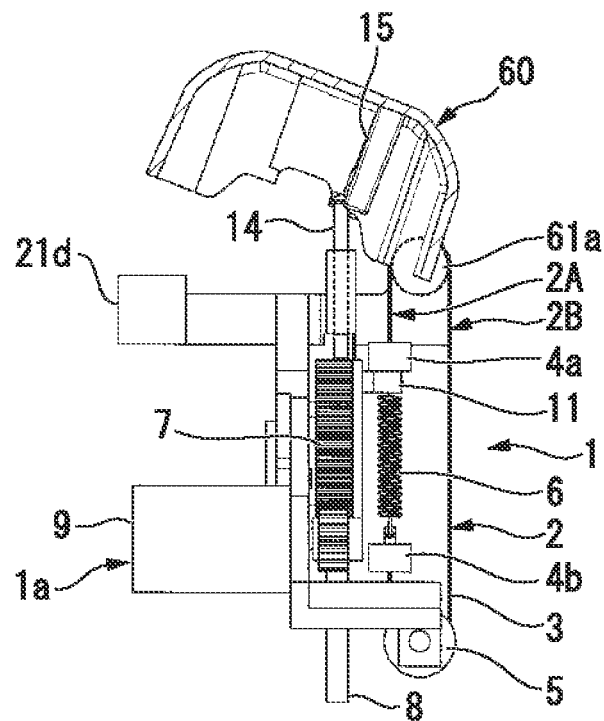
FIG. 26A is a view showing a state when viewed from the same viewpoint as FIG. 18A when an elastic member of the closed-loop member is stretched due to an obstacle during the operation of opening the windshield cover from the state shown in FIGS. 18A and 18B using the driving force of the electric drive source regarding the windshield cover and its opening and closing mechanism.
Figure 26B:
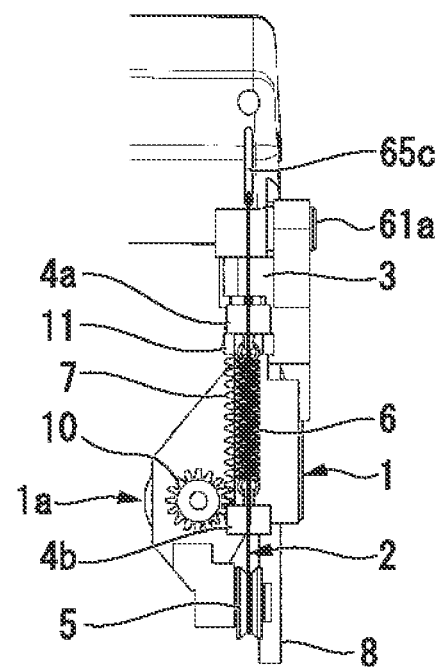
FIG. 26B is a view showing a state when viewed from the same viewpoint as FIG. 18B when the elastic member of the closed-loop member is stretched due to an obstacle during the operation of opening the windshield cover from the state shown in FIGS. 18A and 18B using the driving force of the electric drive source regarding the windshield cover and its opening and closing mechanism.

In the fusion splicer 20 related to the invention, in a case where the windshield cover 60 is not opened due to a certain obstacle (for example, in a case where an operator holds down the windshield cover with his/her hand) when the cover opening operation is performed from the state shown in FIGS. 18A and 18B, as shown in FIGS. 26A and 26B, the tension coil spring 6 elongates, and thereby, the electric drive source 9 continues driving (in this embodiment, the normal rotational driving of the electric motor).

In this embodiment, as an example of the cover opening and closing mechanism 1, there is provided a configuration in which a stepping motor is adopted as the electric motor 9, and the tension coil spring 6 is capable of being stretched until the rotational amount of the stepping motor reaches the completion of the cover opening driving operation.

In the fusion splicer 20, the driving of the stepping motor (electric motor 9) is stopped when the rotational amount of the stepping motor reaches the completion of the cover opening driving operation.

Additionally, in the fusion splicer 20, the electric motor 9 is driven to perform the protrusion shift operation after the opening of the cover, after the elapse of a predetermined period of time after the rotational amount of the stepping motor reaches the completion of the cover opening driving operation.

In addition, as the fusion splicer 20, there may be adopted a configuration in which a cover opening detector (cover opening sensor) that detects that the windshield cover is arranged in a fully opened position is provided, and when the cover opening detector has detected the windshield cover, the protrusion shift operation after opening of the cover is started.

In the fusion splicer 20, in a case where a certain obstacle is removed before the start of the protrusion shift operation after opening of the cover after the rotation (opening operation) of the windshield cover 60 is hindered due to the obstacle when the cover opening operation is performed from the state shown in FIGS. 18A and 18B, the windshield cover 60 is rotated to an angle equal to or more than that of the cover opening driving operation by the elastic force of the tension coil spring 6, and eventually brought into the fully opened state.

Additionally, when the opening operation of the windshield cover 60 is hindered due to a certain obstacle, for example, from the start of the cover opening driving operation of the fusion splicer 20 to the completion of the protrusion shift operation after cover opening, and this obstacle is removed after the completion of the protrusion shift operation after cover opening, the windshield cover 60 is not opened but remains closed.

As the tension coil spring 6, in consideration of a driving force transmitted from the pushing protrusion 11 of the power transmission member 7 of the drive mechanism 1*a* to the closed-loop member 2, a member that is stretchable with this driving force is used.

As shown in FIGS. 26A and 26B, the cover opening and closing mechanism 1 of this embodiment has the thrust-up shaft 14 already described.

However, a configuration that does not have the thrust-up shaft 14 may be used as the fusion splicer of the embodiment related to the invention.

In the configuration having the thrust-up shaft 14, the spring constant of the tension coil spring 6 of the closed-loop member 2 can be suppressed even if the magnets 12*a* and 12*b* (refer to FIG. 15) of the windshield cover 60 strongly set the attractive force that attracts the magnet catches 13*a* and 13*b* of the apparatus body 21 (however, a range in which an operator can manually open the windshield cover 60 is allowed).

For this reason, the configuration having the thrust-up shaft 14 enables manual opening (manual opening operation) of the windshield cover 60 in the closed state to be comfortably performed.

Additionally, inadvertent opening of the windshield cover 60 by a certain cause can be more reliably prevented by strongly setting the attractive force with which the magnets 12*a* and 12*b* attract the magnet catches 13*a* and 13*b* of the apparatus body 21.

Here, a case where a configuration in which the thrust-up shaft 14 is omitted from the cover opening and closing mechanism 1 already described is adopted as the cover opening and closing mechanism will be described.

Hereinafter, the fusion splicer that adopts the cover opening and closing mechanism that does not have the thrust-up shaft 14 is also referred to as a fusion splicer with no thrust-up.

As the tension coil spring 6 of the closed-loop member 2 of the fusion splicer with no thrust-up, a member that has a spring constant of a magnitude that is not overcome by the attractive force of the magnets 12*a* and 12*b* during the cover opening driving operation can be suitably adopted.

If the attractive force of the magnets 12*a* and 12*b* of the fusion splicer with no thrust-up is quite strong compared to the elastic force of the tension coil spring 6, this become an obstacle that hinders the cover opening driving operation.

For this reason, as the tension coil spring 6 of the closed-loop member 2 of the fusion splicer with no thrust-up, a member is suitable that is not greatly stretched by the attractive force of the magnets 12*a* and 12*b* during the cover opening driving operation, and exerts the elastic force of a magnitude such that the rotation of the windshield cover 60 in the closed state can be realized.

The manual opening of the windshield cover 60 in the closed state in the fusion splicer is performed against both the attractive force of the magnets 12*a* and 12*b* and the elasticity of the tension coil spring 6.

This is common to both the fusion splicer with no thrust-up and the fusion splicer 20 having the thrust-up shaft 14.

In the fusion splicer with no thrust-up, in a case where the attractive force of the magnets 12*a* and 12*b* is made strong, if a member having a larger spring constant is also adopted correspondingly as the tension coil spring 6, a strong force is required for the manual opening of the windshield cover 60 in the closed state.

In contrast, the fusion splicer 20 that adopts the cover opening and closing mechanism 1 having the thrust-up shaft 14, as already described, has the configuration in which the thrust-up shaft 14 pushed up by the power transmission member 7 of the drive mechanism 1*a* thrusts up the windshield cover 60 and lifts the windshield cover from the apparatus body 21 during the cover opening driving operation.

In the fusion splicer 20, there is almost or completely no influence of the attractive force of the magnets 12*a* and 12*b* in the rotation of the windshield cover 60 in the opening direction accompanying the rotational driving of the closed-loop member 2 by the drive mechanism 1*a*.

For this reason, in the fusion splicer 20, the spring constant of the tension coil spring 6 of the closed-loop member 2 can be suppressed even if the attractive force of the magnets 12*a* and 12*b* (however, a range in which an operator can manually open the windshield cover 60 is allowed) is strongly set.

As a result, in the fusion splicer 20, the manual opening of the windshield cover 60 in the closed state can be comfortably performed with a small force compared to the fusion splicer with no thrust-up.

When the thrust-up shaft 14 pushed by the power transmission member 7 of the drive mechanism 1a thrusts up the windshield cover 60 to lift the windshield cover from the apparatus body 21, and thereby magnetization of the magnets 12a and 12b to the magnet catches 13a and 13b is released, the driving force of the electric drive source 9 can be effectively utilized for the rotation of the windshield cover 60, compared to the configuration that adopts the cover opening and closing mechanism that does not have the thrust-up shaft 14.

Additionally, as shown in FIG. 18A and the like, the shaft butting portion 15 of the windshield cover 60 of the fusion splicer 20 is provided at a position apart in the radial direction of the rotating shaft 61a from the rotating shaft 61a of the windshield cover 60.

Accordingly, the thrust-up force of the shaft butting portion 15 by the thrust-up shaft 14 can easily rotate the windshield cover 60 compared to a case where the thrust-up force is transmitted from the closed-loop member 2 to the rotating shaft 61a of the windshield cover 60.

For this reason, in the fusion splicer 20, a small-sized member with small output can be used as the electric drive source 9.

Downsizing of the electric drive source 9 is also effective in downsizing the apparatus body 21 and the whole splicer.

Additionally, since the cover opening and closing mechanism 1 of the fusion splicer 20 has a configuration in which the driving force of the electric drive source 9 is transmitted to the windshield cover 60 via the closed-loop member 2 to open and close the windshield cover 60, the degrees of freedom of the installation position of the electric drive source 9 with respect to the windshield cover 60 is high, and the degrees of freedom in design of the whole fusion splicer can be improved.

In the cover opening and closing mechanism 1, reduction of the installation space in the fusion splicer is easy, for example, compared to a gear system mechanism that transmits the driving force of the electric drive source to the windshield cover 60 using only a plurality of gears.

For this reason, in the fusion splicer 20, downsizing of the whole apparatus can be easily realized.

Additionally, in the cover opening and closing mechanism 1, for example, compared to the above-described gear system mechanism, it is easy to minimize the number of parts, and assembly is also easy compared to the gear system.

As shown in FIG. 6, the fusion splicer 20 has the cover-closing detector 33 (cover-closing sensor) that detects that the windshield cover 60 is closed with respect to the apparatus body 21.

By including the cover-closing detector 33, a fusion splicing operation is automatically started with a detection signal obtained from the cover-closing detector 33 as a trigger when the cover closing switch 31d (refer to FIG. 3) is turned on, and the cover-closing detector 33 detects that the windshield cover 60 is closed with respect to the apparatus body 21.

The fusion splicer 20 has a control device that controls the driving of the entire fusion splicer.

By including the control device, shift to the fusion splicing operation is performed by the control of the control device when the control device acquires a detection signal from the cover-closing detector 33.

As the cover-closing detector 33, a well-known detector used in order to detect that the windshield cover is brought into the closed state may be used for the fusion splicer.

Here, a magnetic sensor that detects magnetic bodies (for example, magnets 12a and 12b) attached to the windshield cover 60 is used as the cover-closing detector 33.

This magnetic sensor detects (is brought into a detection state) that the windshield cover 60 is closed, in non-contact, and is brought into a non-detection state where the magnetic bodies attached to the windshield cover 60 are not detected when the windshield cover 60 is displaced in the opening direction from the closed position and the windshield cover 60 is not brought into the closed state.

The cover-closing detector 33 is not limited to the above-described magnetic sensor.

As the cover-closing detector 33, for example, a non-contact sensor, such as a photosensor, or a touch sensor that detects the opening and closing of the windshield cover depending on the contact or separation of the windshield cover may be used.

Additionally, as the cover-closing detector 33, an encoder, an angle sensor, or the like, which measures the rotation angle of a portion (rotating portion for detection) formed on the extension of the rotating shaft of the windshield cover or around the rotating shaft, may be used.

When the rotation angle measurement sensor, such as an encoder or an angle sensor is used, it is possible to detect that the windshield cover is arranged at the fully opened position besides detecting that the windshield cover is arranged at the closed position, and it is also possible to detect that the windshield cover is between the fully opened position and the closed position.

In the cover closing operation of closing the windshield cover 60 in the opened state (fully opened state) shown in FIGS. 21A and 21B, as already described, the electric motor 9 is reversely rotationally driven, the power transmission member 7 is lowered, and the lower receiving member 4b is pushed down by the pushing protrusion 11.

By pushing down the lower receiving member 4b, the windshield cover 60 is rotated in the closing direction together with the rotating shaft 61a by a tensile force exerted on the cable member 3 via the tension coil spring 6 from the lower receiving member 4b.

Figure 27A:
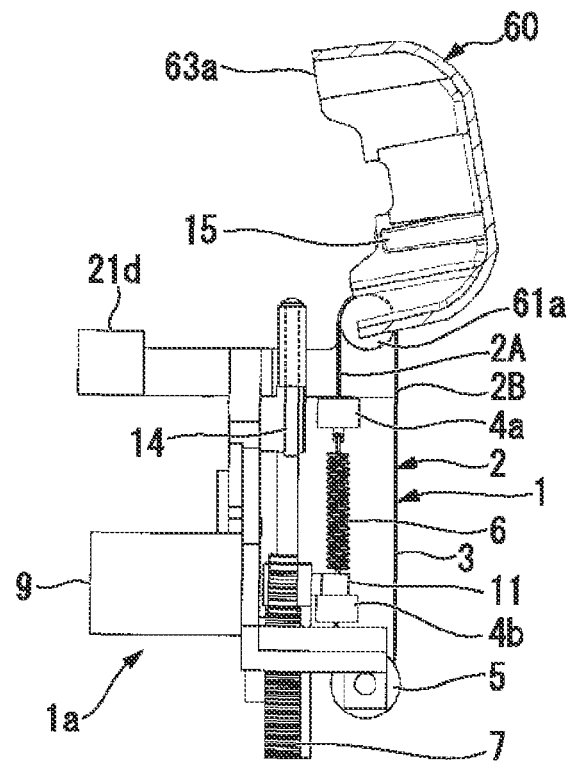
FIG. 27A is a view showing a state when viewed from the same viewpoint as FIG. 18A when the elastic member of the closed-loop member is stretched due to an obstacle during the operation of closing the windshield cover from the state shown in FIGS. 21A and 21B using the driving force of the electric drive source regarding the windshield cover and its opening and closing mechanism.
Figure 27B:
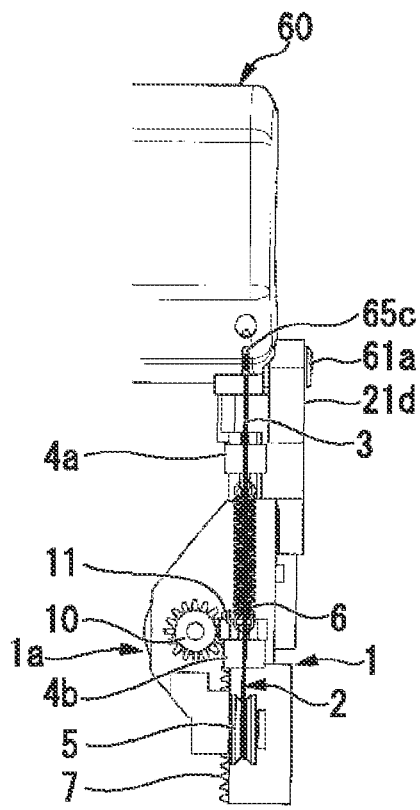
FIG. 27B is a view showing a state when viewed from the same viewpoint as FIG. 18B when the elastic member of the closed-loop member is stretched due to an obstacle during the operation of closing the windshield cover from the state shown in FIGS. 21A and 21B using the driving force of the electric drive source regarding the windshield cover and its opening and closing mechanism.

In this cover closing operation, when the windshield cover 60 that has rotated from the opened state does not reach the position where the cover closing driving operation is completed, due to a certain obstacle, for example, a case where foreign matter is included, a case where the operator holds down the windshield cover 60 with his/her hand, or the like, as shown in FIG. 27A and FIG. 27B, the electric drive source 9 continues driving (in this embodiment, the reverse rotational driving of the electric motor) as the tension coil spring 6 elongates.

The pushing protrusion 11 and the lower receiving member 4b of the power transmission member 7 descend while stretching the tension coil spring 6.

Accordingly, an excessive load is not applied to the electric drive source 9, and damage of the drive mechanism 1a of the cover opening and closing mechanism 1 can also be prevented.

The tension coil spring 6 is stretchable until the rotational amount of the electric motor 9 (here, the stepping motor) reaches the completion of the cover opening driving operation.

When a certain obstacle is removed before the start of the protrusion shift operation after cover closing after the rotation (closing operation) of the windshield cover 60 by the cover closing driving operation is hindered by the obstacle, the windshield cover 60 is rotated from the fully opened position to an angle equal to or more than that of the cover closing driving operation by the elastic force of the tension coil spring 6, and the windshield cover 60 is eventually brought into the closed state.

Additionally, when the closing operation of the windshield cover 60 is hindered due to a certain obstacle, for example, from the start of the cover closing driving operation of the windshield cover 60 to the completion of the protrusion shift operation after cover closing, and this obstacle is removed after the completion of the protrusion shift operation after cover closing, the windshield cover 60 is not closed but remains opened.

Additionally, in the fusion splicer 20, even if the rotational amount of the electric motor 9 (here, the stepping motor) reaches the completion of the cover opening driving operation after the start of the cover closing operation from the state shown in FIGS. 21A and 21B, when it is not detected by the cover-closing detector 33 that the windshield cover 60 is brought into the closed state (arranged at the closed position), the subsequent fusion splicing operation is not started.

Even if the rotational amount of the electric motor 9 (stepping motor) reaches the completion of the cover opening driving operation, when it is not detected by the cover-closing detector 33 that the windshield cover 60 is brought into the closed state, it is determined that an abnormality (closed operation is abnormal) has occurred and the fusion splicing operation is not started.

Additionally, the fusion splicer 20 performs a cover closing repetition operation of driving the electric drive source 9 to automatically execute one or more cycles of cover closing auxiliary operations constituted of the cover opening operation and the cover closing operation performed after the cover opening operation, when occurrence of a closing operation abnormality is detected.

The cover closing repetition operation is ended if it is detected by the cover-closing detector 33 that the windshield cover 60 reaches the closed position in the cover-closing detector 33.

In that case, the fusion splicing operation is performed without performing the cover closing auxiliary operations after the end of the cover closing repetition operation.

As for the cover closing repetition operation, if it is not detected by the cover-closing detector 33 that the windshield cover 60 reaches the closed position at the time of the completion of the cover closing auxiliary operations, one cycle of cover closing auxiliary operations is additionally executed.

Even if the fusion splicer 20 executes the cover closing auxiliary operations to a preset upper limit number of times, when it is not detected by the cover-closing detector 33 that the windshield cover 60 is closed, the fusion splicing operation is not started.

Additionally, in this case, the fusion splicer 20, for example, projects (outputs) a warning display from the monitor device 31 (refer to FIG. 3) as warning information notification.

At this time, the monitor device 31 functions as an information notification output unit that outputs warning information notification.

It may be difficult for an operator to recognize inclusion of foreign matter when the windshield cover 60 is manually closed depending on the size or the like of the foreign matter. A configuration in which the information notification output unit outputs warning information notification when the cover-closing detector 33 does not detect the windshield cover 60 even if the cover closing auxiliary operations are executed to a preset upper limit of number of times is effective for the opening and closing situation of the windshield cover 60 being grasped by an operator who uses the fusion splicer.

The information notification output unit that outputs warning information notification is not limited to the monitor device 31.

As the information notification output unit, for example, a lamp turned on when occurrence of a closing operation abnormality is detected, a loudspeaker that outputs a warning sound as the warning information notification, or the like, may be used.

In addition, when the cover-closing detector 33 detects that the windshield cover 60 is closed, the fusion splicer may use a configuration having a cover closing completion notification portion that notifies the direction.

The configuration in which information notification (cover closing notification information) is output from the cover closing completion notification unit when the cover-closing detector 33 detects that the windshield cover 60 is closed is effective for the opening and closing situation of the windshield cover 60 being known by an operator who uses the fusion splicer.

(First Modification Example of Cover Opening and Closing Mechanism)

Next, a first modification example (a second example of the cover opening and closing mechanism) of the cover opening and closing mechanism of the fusion splicer of the embodiment related to the invention will be described.

In addition, the same components in FIGS. 28 to 37 as those of the fusion splicer 20 described with reference to FIGS. 1 to 27B will be designated by common reference numerals, and a description thereof will be omitted or simplified here.

As shown in FIGS. 28 to 37, in the first modification example of the cover opening and closing mechanism, a cover opening and closing mechanism 210 is provided instead of the cover opening and closing mechanism 1 provided in the fusion splicer 20 described with reference to FIGS. 1 to 27B.

In the cover opening and closing mechanism 210, a closed-loop member 220 formed in the shape of a closed loop by coupling both ends of the cable member 3 via one power receiving member 4 and two tension coil springs 6a and 6b is used instead of the closed-loop member 2 of the cover opening and closing mechanism 1 already described.

Additionally, in the cover opening and closing mechanism 210, a power transmission member 217 (refer to FIG. 29) with a configuration in which pushing protrusions 11a and 11b are provided in two places of the rack gear 7b apart from each other so as to protrude is used instead of the power transmission member 7 of the cover opening and closing mechanism 1 already described.

The power transmission member 7 of the cover opening and closing mechanism 1 already described has one pushing protrusion 11.

In contrast, the power transmission member 217 of the cover opening and closing mechanism 210 has the two pushing protrusions.

A drive mechanism 211 of the cover opening and closing mechanism 210 is different from the drive mechanism 1a of the cover opening and closing mechanism 1 already described only in that the power transmission member 217 having two pushing protrusions 11a and 11b is adopted.

The configuration other than the power transmission member 217 of the cover opening and closing mechanism 210 is the same as that of the cover opening and closing mechanism 1 already described.

Figure 28:
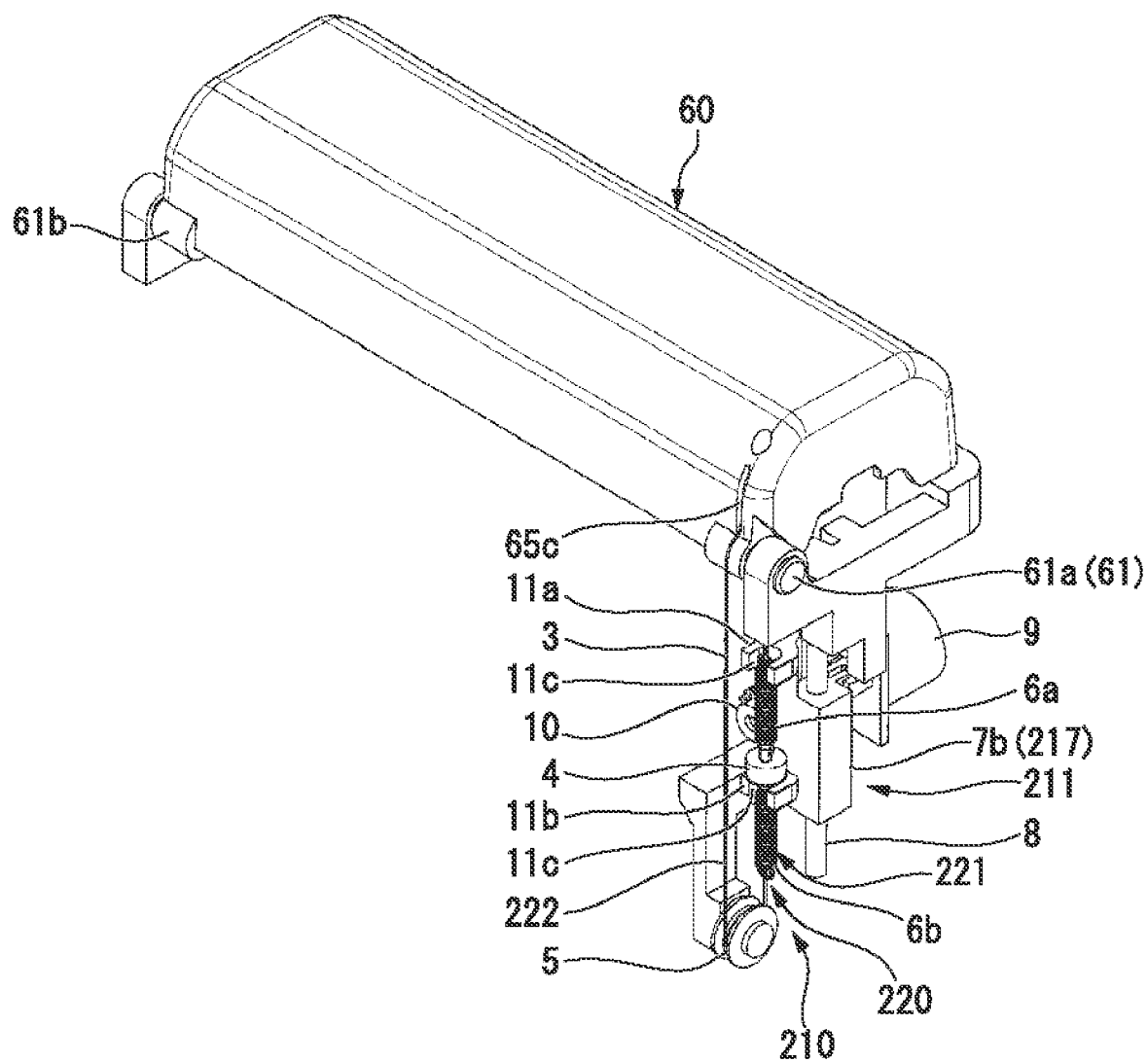
FIG. 28 is a view illustrating a first modification example of the cover opening and closing mechanism of the optical fiber fusion splicer related to the embodiment of the invention (a second example of the cover opening and closing mechanism), and is a perspective view showing a state where the windshield cover is closed when viewed diagonally from the front upper right side of the fusion splicer.
Figure 32:
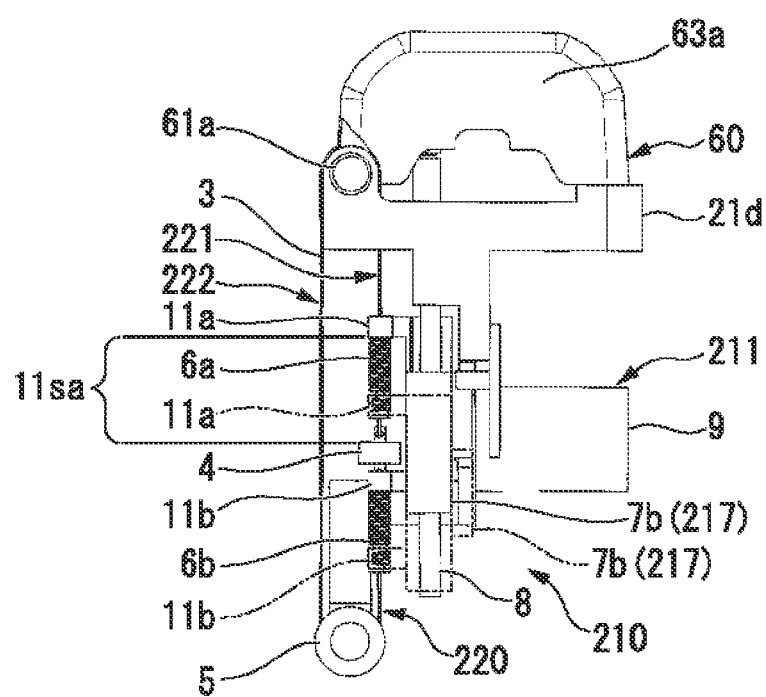
FIG. 32 is a view illustrating the windshield cover and its opening and closing mechanism of FIG. 28, and is a view (right side view) showing a state where the windshield cover is closed when viewed from the right side of the fusion splicer.

As shown in FIG. 28, FIG. 32, and the like, the two tension coil springs 6a and 6b of the closed-loop member 220 have one-side ends in the axis direction coupled to the power receiving member 4, and are coupled to each other via the power receiving member 4.

The end portions of the respective tension coil springs 6a and 6b opposite to the power receiving member 4 are coupled to both ends of the cable member 3.

That is, in the closed-loop member 220, the one power receiving member 4 and the two tension coil springs 6a and 6b instead of the two power receiving members 4a and 4b and the one tension coil spring 6 are provided between both ends of the cable member 3 of the closed-loop member 2 of the cover opening and closing mechanism 1 already described.

The fusion splicer in which the cover opening and closing mechanism 210 is provided is brought into a state (operation standby initial state) where the movable stages 22 on both left and right sides of the discharge portion 24a are arranged at the positions at the time of fiber mounting and the windshield cover 60 is closed as shown in FIGS. 28 to 32, when the power switch (not shown) is turned off from an ON state.

In the fusion splicer in the operation standby initial state, as the turned-off power switch is turned on, the respective movable stages 22 are arranged at the positions at the time of fiber mounting and the windshield cover 60 is opened as shown in FIGS. 33 to 37 (fiber set standby state).

The state of the windshield cover 60 and the cover opening and closing mechanism 210 when the fusion splicer is in the operation standby initial state, that is, the state of the windshield cover 60 and the cover opening and closing mechanism 210 shown in FIGS. 28 to 32, is hereinafter also referred to as a cover opened standby state.

Figure 33:
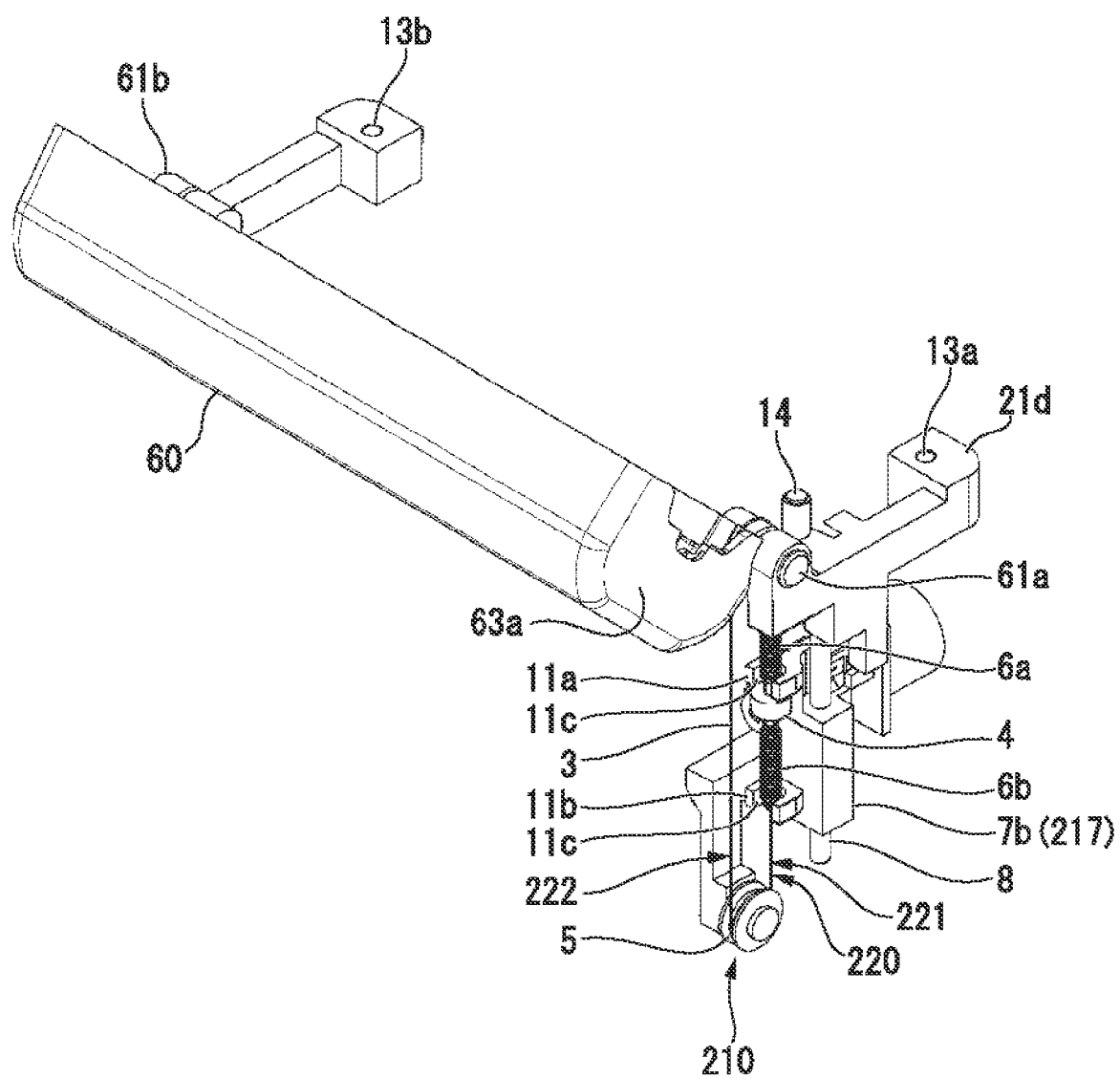
FIG. 33 is a perspective view showing a state when viewed diagonally from the front upper right side of the fusion splicer when the windshield cover and its opening and closing mechanism of FIG. 28 are opened from a state shown in FIG. 28 using the driving force of the electric drive source.
Figure 34:
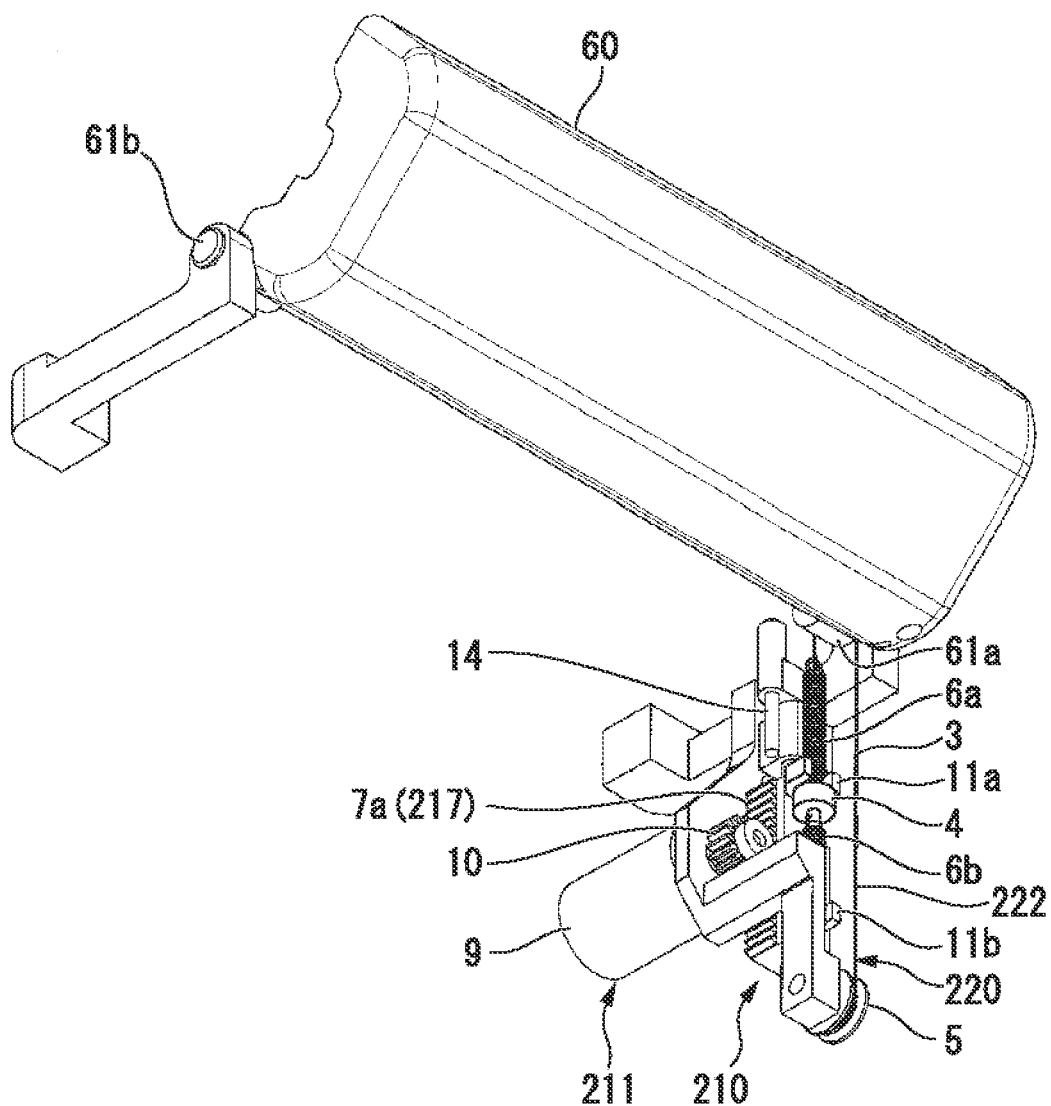
FIG. 34 is a perspective view showing a state when viewed from the diagonally front lower left side of the fusion splicer when the windshield cover and its opening and closing mechanism of FIG. 28 are opened from the state shown in FIG. 28 using the driving force of the electric drive source.
Figure 35:
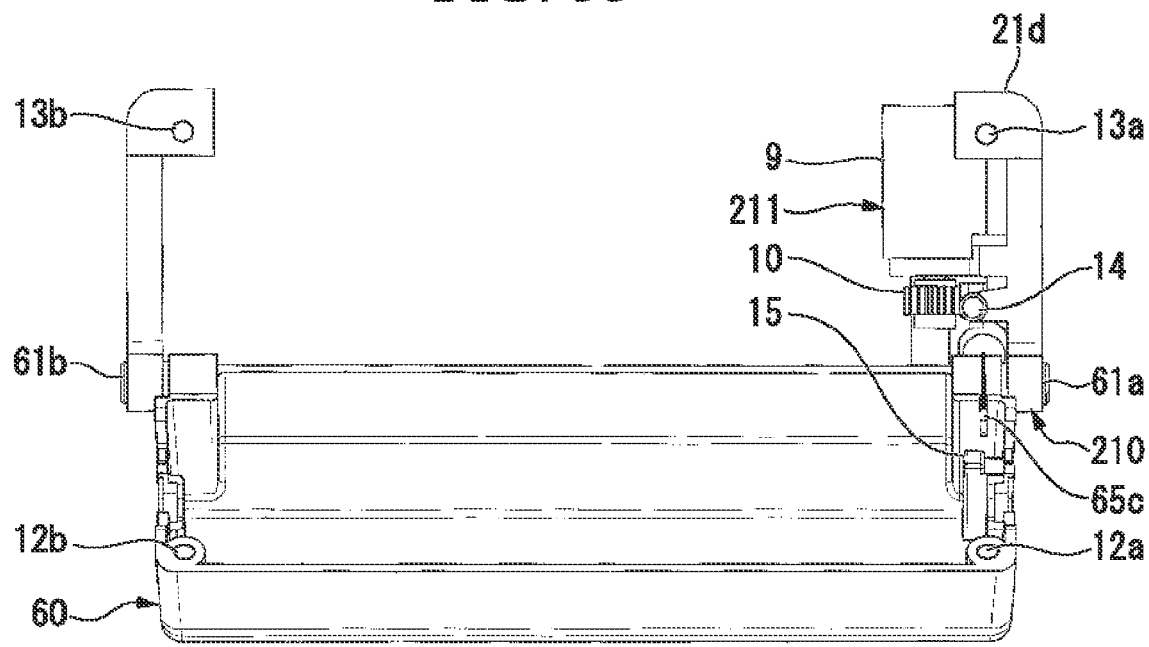
FIG. 35 is a plan view showing a state when viewed from the upper side of the fusion splicer when the windshield cover and its opening and closing mechanism of FIG. 28 are opened from the state shown in FIG. 28 using the driving force of the electric drive source.
Figure 36:
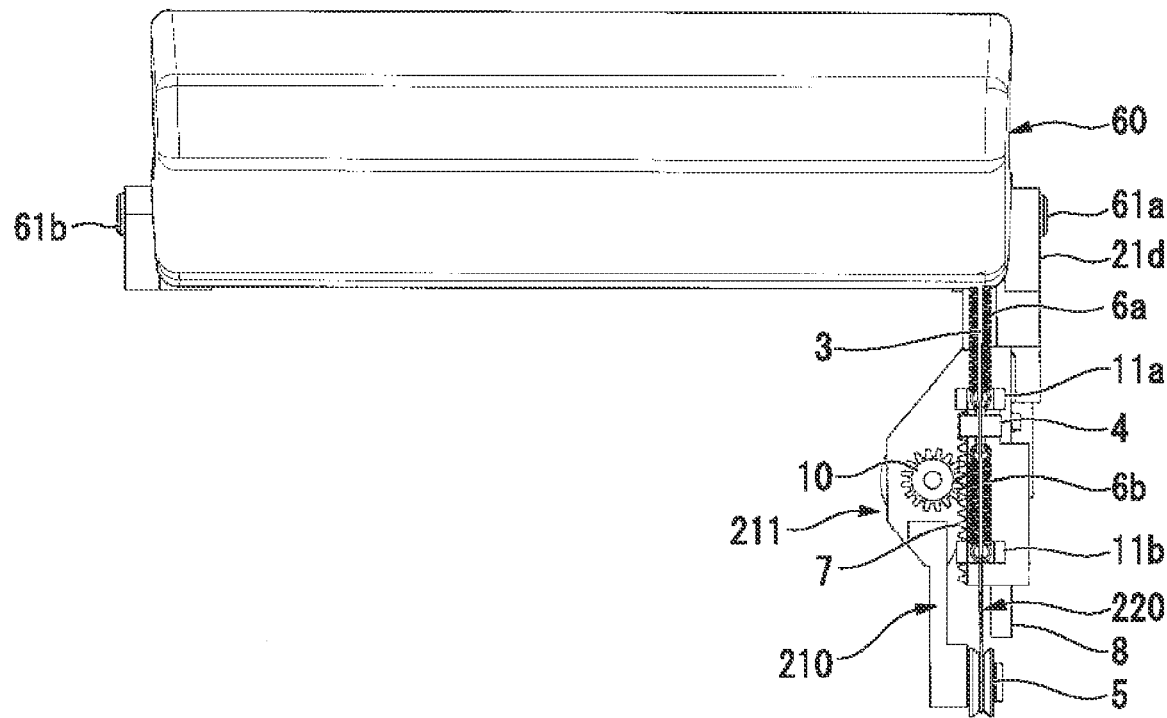
FIG. 36 is a front view showing a state when viewed from the front side of the fusion splicer when the windshield cover and its opening and closing mechanism of FIG. 28 are opened from the state shown in FIG. 28 using the driving force of the electric drive source.
Figure 37:
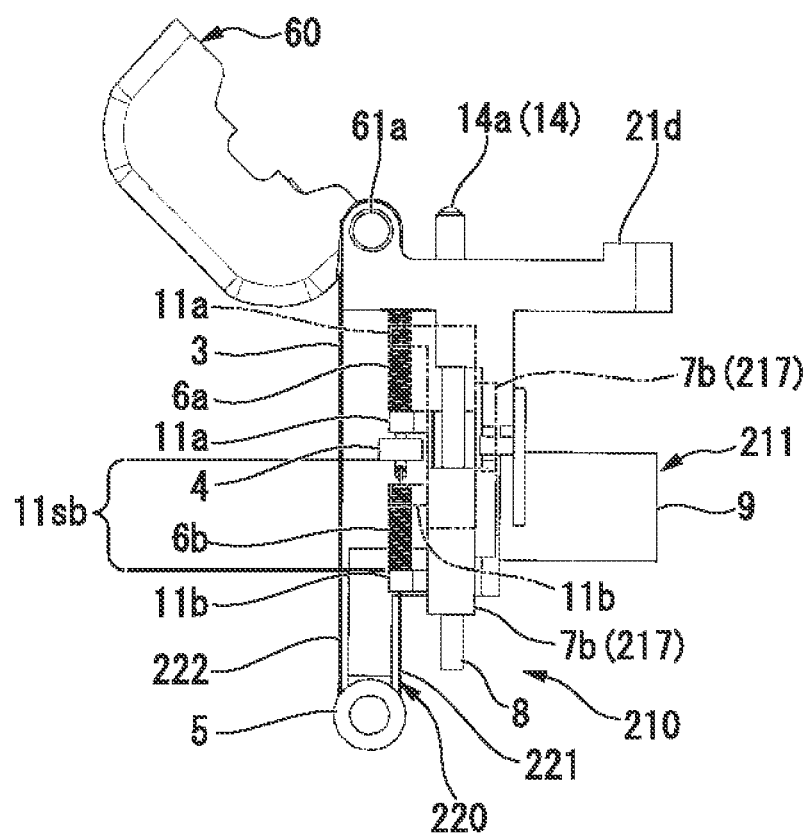
FIG. 37 is a view (right side view) showing a state when viewed from the right side of the fusion splicer when the windshield cover and its opening and closing mechanism of FIG. 28 are opened from the state shown in FIG. 28 using the driving force of the electric drive source.

Additionally, the state of the windshield cover 60 and the cover opening and closing mechanism 210 when the fusion splicer is in the fiber set standby state, that is, the state of the windshield cover 60 and the cover opening and closing mechanism 210 shown in FIGS. 33 and 37, is hereinafter also referred to as a cover closed standby state.

As shown in FIG. 28, FIG. 32, and the like, the closed-loop member 220 has a pair of inter-member tensioning portions 221 and 222 that extend in the up-and-down direction between the rotating shaft 61a of the windshield cover 60 and the pulley 5 below the rotating shaft.

The power receiving member 4 and the two tension coil springs 6a and 6b are arranged at one of the pair of inter-member tensioning portions 221 and 222.

Hereinafter, the inter-member tensioning portion 221 in which the power receiving member 4 and the tension coil springs 6a and 6b are arranged is also referred to as an engagement-side tensioning portion, and the other inter-member tensioning portion 222 is also referred to as a non-engagement-side tensioning portion.

In addition, even if the closed-loop member 220 is rotated by the driving force of the drive mechanism 211 of the cover opening and closing mechanism 210, or the manual opening and closing operation of the windshield cover 60, the power receiving member 4 and the tension coil springs 6a and 6b are not arranged at the non-engagement-side tensioning portion 222, but are always arranged at the engagement-side tensioning portion 221.

In FIGS. 28 and 32, the arrangement of the cable member 3 with respect to the rotating shaft 61a and pulley 5 of the windshield cover 60 is the same as that of FIG. 18A.

The point that the entire non-engagement-side tensioning portion 222 is constituted of the cable member 3, the point that only the cable member 3 of the closed-loop member 220 is wound around the rotating shaft 61a and pulley 5 of the windshield cover 60, and the point that both ends of the cable member 3 are located at the engagement-side tensioning portion 221 are the same as those of FIG. 18A.

Additionally, as already described, in the case of FIG. 18A, as shown in FIG. 49, the cable member fixed portion 60a of the cable member 3 constitutes the end portion of the engagement-side tensioning portion 2A of the portion of the cable member 3 wound around the outer periphery of the rotating shaft 61a of the windshield cover 60.

In the cover closed standby state (FIGS. 28 to 32), the closed-loop member 220 has a cable member fixed portion (not shown) provided by fixing the cable member 3 to the rotating shaft 61a, at the end portion of the engagement-side tensioning portion 221 of the portion of the cable member 3 wound around the outer periphery of the rotating shaft 61a of the windshield cover 60.

The relationship between the rotating shaft 61a and the portion of the cable member 3 wound around the rotating shaft 61a is the same as the relationship between the rotating shaft 61a and the portion of the cable member 3 wound around the rotating shaft 61a described with reference to FIG. 49.

Figure 29:
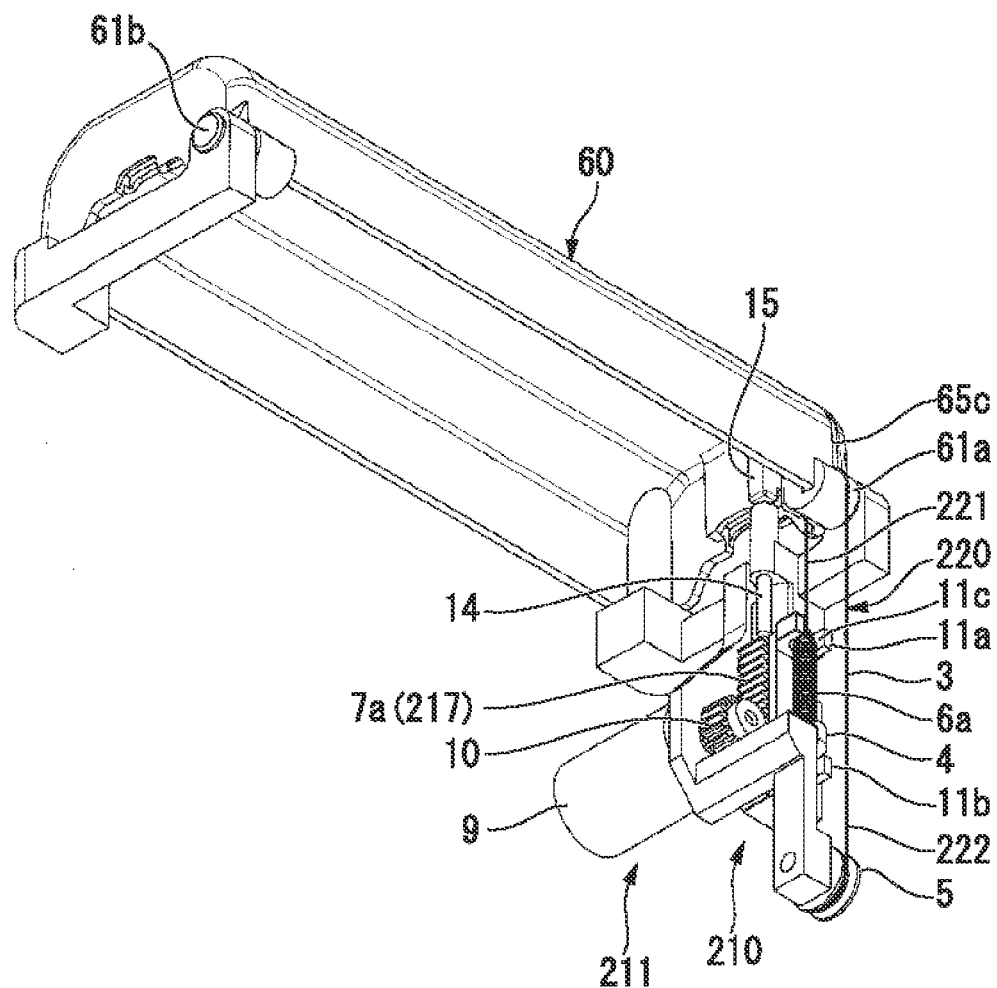
FIG. 29 is a view illustrating the windshield cover and its opening and closing mechanism of FIG. 28, and is a perspective view showing a state where the windshield cover is closed when viewed diagonally from the front lower left side of the fusion splicer.
Figure 30:
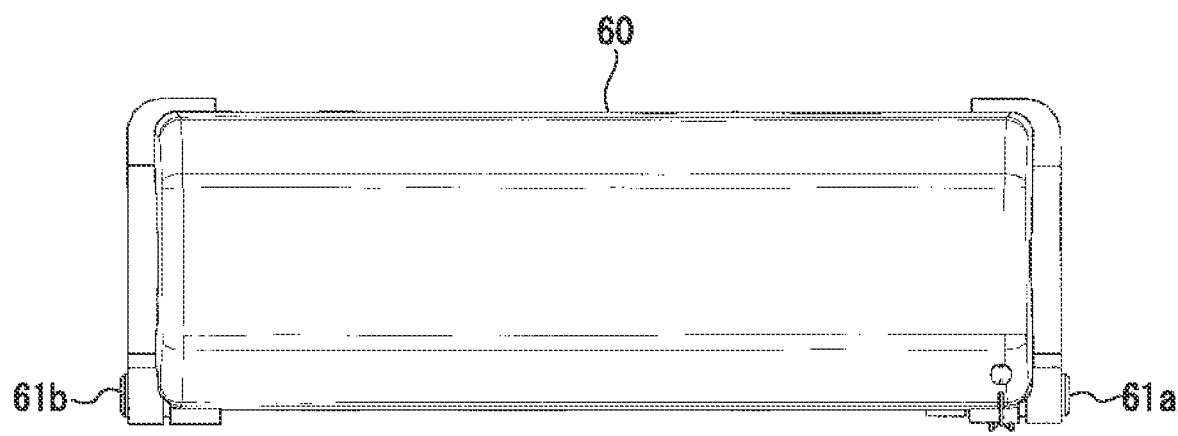
FIG. 30 is a view illustrating the windshield cover and its opening and closing mechanism of FIG. 28, and is a plan view showing a state where the windshield cover is closed.
Figure 31:
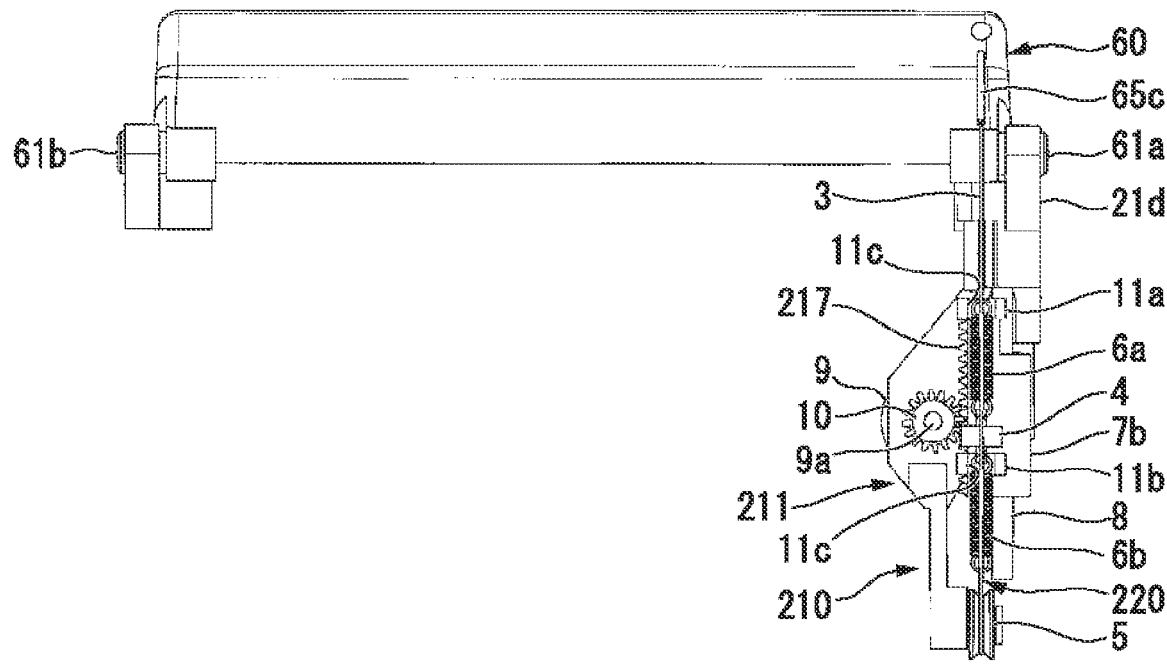
FIG. 31 is a view illustrating the windshield cover and its opening and closing mechanism of FIG. 28, and is a front view showing a state where the windshield cover is closed when viewed from the front side of the fusion splicer.

As shown in FIG. 28, FIG. 29, and the like, the two pushing protrusions 11a and 11b of the power transmission member 217 are formed in the same shape as the pushing protrusion 11 of the power transmission member 7 of the cover opening and closing mechanism 1 already described.

As shown in FIG. 28, FIG. 32, and the like, the two pushing protrusions 11a and 11b of the power transmission member 217 are provided in two upper and lower places of the rack gear 7b so as to correspond to the tension coil springs 6a and 6b arranged above and below the power receiving member 4 via the power receiving member.

As shown in FIG. 28, FIG. 32, and the like, in the cover closed standby state, the two pushing protrusions 11a and 11b of the power transmission member 217 accommodate portions of the tension coil springs 6a and 6b (elastic members) in the axis direction in the cutout recess 11c, and are respectively arranged above and below the power receiving member 4 of the closed-loop member 220.

A portion of the tension coil spring 6a (hereinafter also referred to as an upper tension coil spring) on the upper side of the power receiving member 4 of the closed-loop member 220 in the axis direction is accommodated inside the cutout recess 11c of the pushing protrusion 11a (hereinafter also referred to as an upper pushing protrusion) on the upper side of the power transmission member 217.

A portion of the tension coil spring 6b (hereinafter also referred to as a lower tension coil spring) on the lower side of the power receiving member 4 of the closed-loop member 220 in the axis direction is accommodated inside the cutout recess 11c of the pushing protrusion 11a (hereinafter also referred to as a lower pushing protrusion) on the lower side of the power transmission member 217.

The upper and lower pushing protrusions 11a and 11b of the power transmission member 217 move along the outer peripheries of the tension coil springs 6a and 6b inside the cutout recess 11c if the power transmission member 217 is moved relative to engagement-side tensioning portion 221 in an extending direction of the engagement-side tensioning portion 221.

As shown in FIG. 32 and the like, the cover opening and closing mechanism 210 in the cover closed standby state is brought into a state where the lower pushing protrusion 11b of the power transmission member 217 is arranged in proximity to the power receiving member 4 of the closed-loop member 220 via a slight gap on the lower side of the power receiving member, and the upper pushing protrusion 11b of the power transmission member 217 accommodates an upper end portion of the upper tension coil spring 6a.

At this time, the power receiving member 4 of the closed-loop member 220 is located between the upper and lower pushing protrusions 11a and 11b of the power transmission member 217.

The length of the power receiving member 4 in a direction (up-and-down direction) in which the upper and lower pushing protrusions 11a and 11b of the power transmission member 217 face each other is markedly small compared to the separation distance between the pushing protrusions 11a and 11b.

In the cover closed standby state shown in FIG. 32 and the like, the lower pushing protrusion 11b of the power transmission member 217 is arranged at a position where the separation distance of the closed-loop member 220 from the power receiving member 4 is markedly small compared to the upper pushing protrusion 11a.

The cover opening and closing mechanism 210 and the windshield cover 60 can perform the cover opening operation of opening the windshield cover 60 from the cover closed standby state shown in FIG. 32 and the like by the normal rotational driving of the electric motor 9.

In this cover opening operation, the windshield cover 60 is brought into a fully opened state shown in FIGS. 33 to 37 by the self-weight opening operation of the windshield cover 60 after a cover opening driving operation of rotating the windshield cover 60 in the closed state in the opening direction by the driving force of the electric drive source 9 is performed.

In the cover opening driving operation, the windshield cover 60 in the closed state is rotated to a position where the opening operation is allowed due to the self-weight of the windshield cover.

The cover opening driving operation is realized by lifting the power transmission member 217 by the normal rotational driving of the electric motor 9, pushing up the power receiving member 4 of the closed-loop member 220 by the lower pushing protrusion 11b of the power transmission member 217, and rotating the windshield cover 60 in the closed state in the opening direction together with the rotating shaft 61a.

If the lower pushing protrusion 11b of the power transmission member 217 pushes up the power receiving member 4 of the closed-loop member 220, correspondingly, a tensile force acts on the rotating shaft 61a of the windshield cover 60 via the lower tension coil spring 6b of the closed-loop member 220 from the power receiving member 4, and the rotating shaft 61a of the windshield cover 60 and the windshield cover 60 are rotated.

Additionally, the cover opening and closing mechanism 210 has the thrust-up shaft 14, similar to the cover opening and closing mechanism 1 already described.

Accordingly, the cover opening and closing mechanism 210 can thrust up the windshield cover 60 in the closed state by the thrust-up shaft 14 thrust up by the power transmission member 217 to rotate the windshield cover in the opening direction.

In the cover opening driving operation, when the rotation of the windshield cover 60 in the opening direction is hindered due to a certain obstacle, the lower tension coil spring 6b of the closed-loop member 220 is stretched with the ascent of the power transmission member 217.

The lower tension coil spring 6b is stretchable until the rotational amount of the electric motor 9 (here, the stepping motor) reaches the completion of the cover opening driving operation.

Accordingly, the cover opening and closing mechanism 210 can prevent a disadvantage such that the electric motor 9 is damaged due to an excessive load.

Additionally, when a certain obstacle is removed after the cover opening driving operation is hindered due to the obstacle as described above, the windshield cover 60 is rotated from the closed position to an angle equal to or more than that of the cover opening driving operation by the elastic force of the lower tension coil spring 6b, and the windshield cover 60 is eventually brought into the opened state (fully opened state).

The power transmission member 217 of the cover opening and closing mechanism 210 is arranged at a position shown by a virtual line of FIG. 37, when the cover opening operation is completed.

The power transmission member 217 at the arrangement position shown by the virtual line of FIG. 37 is brought into a state where the lower pushing protrusion 11b is arranged in proximity to the power receiving member 4 via a slight gap on the lower side of the power receiving member, and the upper pushing protrusion 11a is arranged apart at a separation distance such that the separation distance from the power receiving member 4 is markedly large compared to the separation distance between the lower pushing protrusion 11b and the power receiving member 4, from the power receiving member 4 to the upper side.

After the completion of the cover opening operation, the cover opening and closing mechanism 210 performs the protrusion shift operation after cover opening of reversely rotationally driving the electric motor 9 to lower the power transmission member 217 and arranging the power transmission member 217 at a position shown by a solid line in FIG. 37.

As a result, the windshield cover 60 and the cover opening and closing mechanism 210 are brought into the cover opened standby state shown by the solid line in FIG. 37.

The upper pushing protrusion 11a of the power transmission member 217 is arranged in proximity to the power receiving member 4 via a slight gap on the upper side of the power receiving member by the protrusion shift operation after opening of the cover.

Additionally, the lower pushing protrusion 11b is arranged apart from the power receiving member 4 at a separation distance from the power receiving member 4 that is markedly large compared to the separation distance between the upper pushing protrusion 11a and the power receiving member 4, from the power receiving member 4 to the lower side.

This secures a larger separation distance than the travel amount (ascent amount) of the power receiving member 4 that ascends when the windshield cover 60 in the opened state is manually closed, between the lower pushing protrusion 11b and the power receiving member 4.

Here, by including a space 11sb secured between the lower pushing protrusion 11b and the power receiving member 4, it is possible for the power receiving member 4 to ascend and descend without coming into contact with the lower pushing protrusion 11b when manual opening and closing of the windshield cover 60 are performed.

Accordingly, in the fusion splicer in which the cover opening and closing mechanism 210 is provided, the windshield cover 60 can be manually opened and closed without displacing the power transmission member 217 from the state shown in FIG. 37.

In addition, the size of the power receiving member 4 in a direction perpendicular to an extending direction of the engagement-side tensioning portion 221 is made larger than the external diameter of the tension coil springs 6a and 6b.

In the cover opening and closing mechanism 210, the lower pushing protrusion 11b can be engaged with the power receiving member 4 of the closed-loop member 220 from therebelow by lifting the power transmission member 217 by the normal rotational driving of the electric motor 9.

Then, in the cover opening and closing mechanism 210, the power receiving member 4 is pushed up with the ascent of the power transmission member 217 by the lower pushing protrusion 11b engaged with the power receiving member 4.

Additionally, in the cover opening and closing mechanism 210, the upper pushing protrusion 11a can be engaged with the power receiving member 4 of the closed-loop member 220 from thereabove by lowering the power transmission member 217 by the reverse rotational driving of the electric motor 9 from the cover opened standby state shown in FIGS. 33 to 37.

Then, in the cover opening and closing mechanism 210, the power receiving member 4 is pushed down with the descent of the power transmission member 217 by the upper pushing protrusion 11a engaged with the power receiving member 4.

The cover opening and closing mechanism 210 and the windshield cover 60 can perform the cover closing operation of closing the windshield cover 60 from the cover opened standby state shown in FIGS. 33 to 37 by the reverse rotational driving of the electric motor 9.

This cover closing operation is the operation in which the windshield cover 60 is brought into the closed state shown in FIGS. 28 to 32 by a closing operation caused by the self-weight of the windshield cover 60 after the cover closing driving operation of rotating the windshield cover 60 in the opened state in the closing direction by the driving force of the electric drive source 9 is performed.

In the cover closing driving operation, the windshield cover 60 in the opened state is rotated to a position where the self-weight closing operation is allowed.

The cover closing driving operation is realized by lowering the power transmission member 217 by the reverse rotational driving of the electric motor 9, pushing down the power receiving member 4 of the closed-loop member 220 by the upper pushing protrusion 11a of the power transmission member 217, and rotating the windshield cover 60 in the closed state in the closing direction together with the rotating shaft 61a.

If the upper pushing protrusion 11a of the power transmission member 217 pushes down the power receiving member 4 of the closed-loop member 220, correspondingly, a tensile force acts on the rotating shaft 61a of the windshield cover 60 via the upper tension coil spring 6a of the closed-loop member 220 from the power receiving member 4, and the rotating shaft 61a of the windshield cover 60 and the windshield cover 60 are rotated.

In the cover closing driving operation, when the rotation of the windshield cover 60 in the closing direction is hindered due to a certain obstacle, such as inclusion of foreign matter, the upper tension coil spring 6a of the closed-loop member 220 is stretched with the descent of the power transmission member 217.

The upper tension coil spring 6a is stretchable until the rotational amount of the electric motor 9 (here, the stepping motor) reaches the completion of the cover closing driving operation.

Accordingly, the cover opening and closing mechanism 210 can prevent a disadvantage such that the electric motor 9 is damaged due to an excessive load.

Additionally, when a certain obstacle is removed after the cover closing driving operation is hindered due to the obstacle as described above, the windshield cover 60 is rotated from the fully opened position to an angle equal to or more than that of the cover closing driving operation by the elastic force of the upper tension coil spring 6a, and the windshield cover 60 is eventually brought into the closed state.

Additionally, the fusion splicer in which the cover opening and closing mechanism 210 is provided automatically executes the cover closing repetition operation already described when the windshield cover 60 is not brought into the closed state (the cover-closing detector 33 of FIG. 6 is not switched from the non-detection state to the detection state), due to a certain obstacle, such as inclusion of foreign matter.

The power transmission member 217 is arranged at a position shown by a virtual line of FIG. 32, when the cover closing operation is completed.

The upper pushing protrusion 11a of the power transmission member 217 at the arrangement position shown by the virtual line in FIG. 32 is arranged in proximity to the power receiving member 4 via a slight gap on the upper side of the power receiving member.

Additionally, the lower pushing protrusion 11b is arranged apart at a separation distance from the power receiving member 4 that is markedly large compared to the separation distance between the upper pushing protrusion 11a and the power receiving member 4, from the power receiving member 4 to the lower side.

After the completion of the cover closing operation, the cover opening and closing mechanism 210 performs the protrusion shift operation after closing of the cover of normally rotationally driving the electric motor 9 to lift the power transmission member 217 and arranging the power transmission member 217 at a position shown by a solid line in FIG. 32.

As a result, the windshield cover 60 and the cover opening and closing mechanism 210 are brought into the cover closed standby state shown by the solid line in FIG. 32.

The lower pushing protrusion 11b of the power transmission member 217 is arranged in proximity to the power receiving member 4 via a slight gap on the lower side of the power receiving member by the protrusion shift operation after closing or the cover.

Additionally, the upper pushing protrusion 11a is arranged apart from the power receiving member 4 at a separation distance from the power receiving member 4 that is markedly large compared to the separation distance between the lower pushing protrusion 11b and the power receiving member 4, from the power receiving member 4 to the upper side.

This secures a larger separation distance than the travel amount (ascent amount) of the power receiving member 4 that ascends when the windshield cover 60 in the closed state is manually opened, between the upper pushing protrusion 11a and the power receiving member 4.

Here, by including a space 11sa secured between the upper pushing protrusion 11a and the power receiving member 4, it is possible for the power receiving member 4 to ascend and descend without coming into contact with the upper pushing protrusion 11a when manual opening and closing of the windshield cover 60 are performed.

Accordingly, in the fusion splicer in which the cover opening and closing mechanism 210 is provided, the windshield cover 60 can be manually opened and closed without displacing the power transmission member 217 from the state shown in FIG. 32.

(Second Modification Example of Cover Opening and Closing Mechanism)

Next, a second modification example (a third example) of the cover opening and closing mechanism of the fusion splicer related to the invention will be described with reference to FIG. 38A, FIG. 38B, and the like.

Figure 38A:
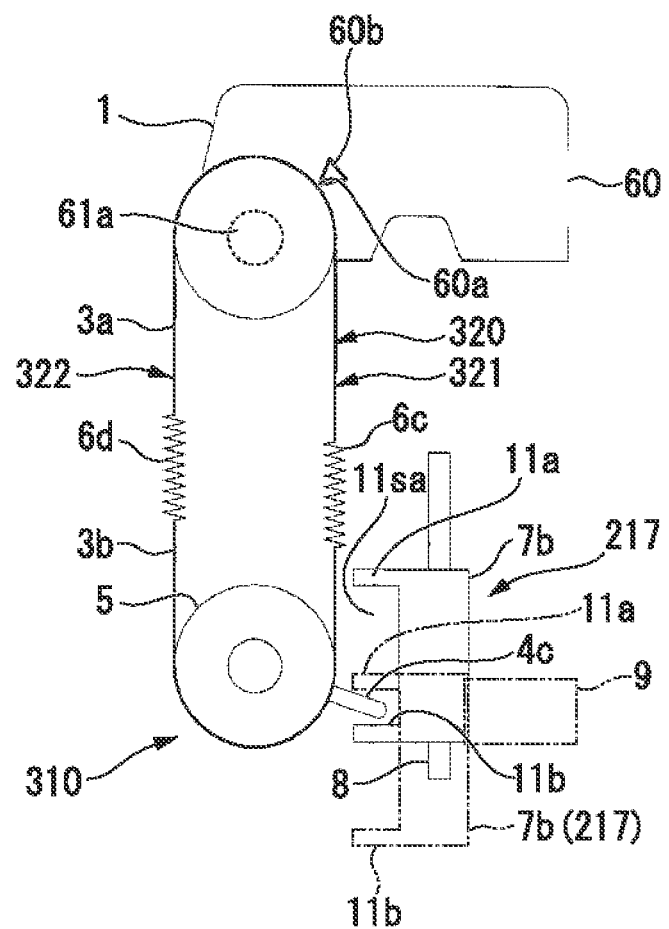
FIG. 38A is a view illustrating a second modification example (a third example of the cover opening and closing mechanism) of the cover opening and closing mechanism of the optical fiber fusion splicer related to the embodiment of the invention, and showing a state where the windshield cover is opened.
Figure 38B:
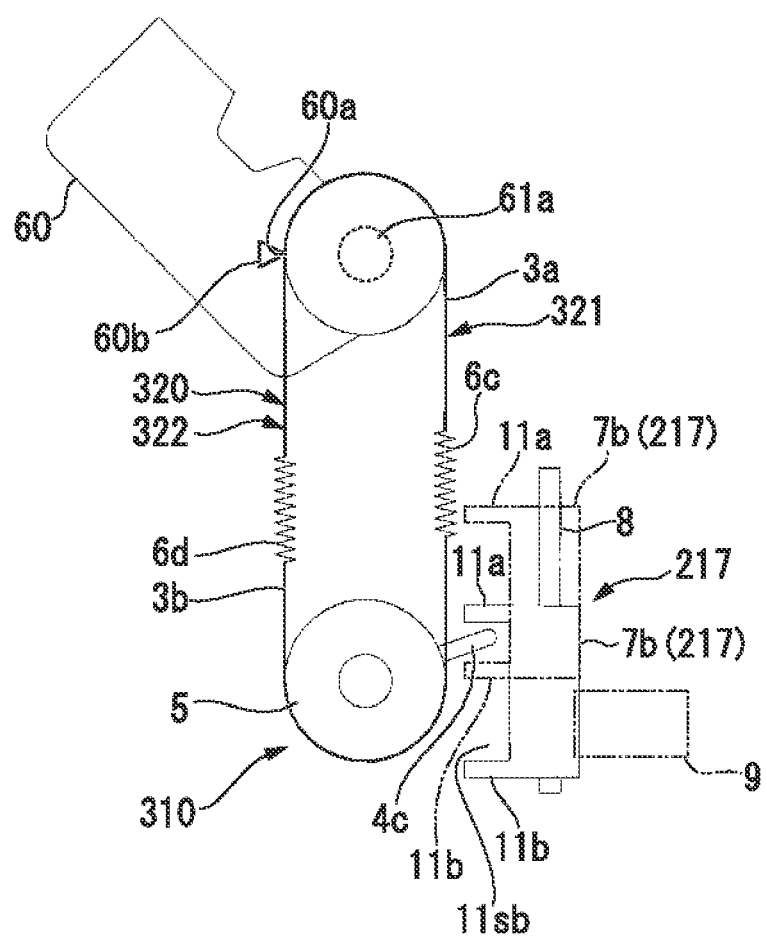
FIG. 38B is a view illustrating the second modification example (the third example of the cover opening and closing mechanism) of the cover opening and closing mechanism of the optical fiber fusion splicer related to the embodiment of the invention, and a view showing a state where the windshield cover is opened.

In addition, the same components in FIGS. 38A to 38B as those of FIGS. 1 to 37 will be designated by common reference numerals, and a description thereof will be omitted or simplified here.

As shown in FIGS. 38A to 38B, in the second modification example, a cover opening and closing mechanism 310 is provided instead of the cover opening and closing mechanism 1 provided in the fusion splicer 20 described with reference to FIGS. 1 to 27B.

In the cover opening and closing mechanism 310, a closed-loop member 320 formed in the shape of a closed loop by coupling two cable members 3a and 3b (wound bodies) via tension coil springs 6c and 6d is used instead of the closed-loop member 2 of the cover opening and closing mechanism 1 already described.

Additionally, the cover opening and closing mechanism 310 uses the drive mechanism 211 of the cover opening and closing mechanism 210 of the first modification example as its drive mechanism.

In addition, in FIGS. 38A and 38B, illustration of the thrust-up shaft 14 that is a portion of the cover opening and closing mechanism 310 is omitted.

Since the configuration of the thrust-up shaft 14 in the cover opening and closing mechanism 310 and the operation performed by the driving of the drive mechanism 211 of the cover opening and closing mechanism 310 are the same as the configuration of the thrust-up shaft 14 in the cover opening and closing mechanism 210 of the first modification example and the operation performed by the driving of the drive mechanism 211, a description thereof is omitted herein.

Additionally, a configuration in which the thrust-up shaft 14 is omitted may be used for the cover opening and closing mechanism 310.

As shown in FIGS. 38A and 38B, in the closed-loop member 320, both ends of the first cable member 3a wound around the rotating shaft 61a of the windshield cover 60 and both ends of the second cable member 3b wound around the pulley 5 are coupled together via the tension coil springs 6c and 6d so as to constitute the shape of a closed loop.

A portion of the first cable member 3a in the longitudinal direction is wound around the rotating shaft 61a of the windshield cover 60.

Additionally, the portion of the first cable member 3a wound around the rotating shaft 61a of the windshield cover 60 is partially fixed to the rotating shaft 61a by a cable member fixed portion 60a.

A portion of the second cable member 3b in the longitudinal direction is wound around the pulley 5.

The closed-loop member 320 has a pair of inter-member tensioning portions 321 and 322 that extend in the up-and-down direction between the rotating shaft 61a of the windshield cover 60 and the pulley 5 provided below the rotating shaft.

The two tension coil springs 6c and 6d of the closed-loop member 320 are provided in the pair of inter-member tensioning portions 321 and 322, respectively.

FIG. 38A shows a state where the windshield cover 60 is closed with respect to the apparatus body 21, and FIG. 38B shows a state (fully opened state) where the windshield cover 60 is opened with respect to the apparatus body 21.

The windshield cover 60 in the closed state shown in FIG. 38A can be opened with respect to the apparatus body 21 by rotating the closed-loop member 320 in the counterclockwise direction in FIG. 38A by the driving force of the electric drive source 9.

At this time, the closed-loop member 320 is rotated so as to lift one (inter-member tensioning portion designated by reference numeral 321) of the pair of inter-member tensioning portion 321 and 322 and lower the other (inter-member tensioning portion designated by reference numeral 322).

Hereinafter, in the pair of inter-member tensioning portions 321 and 322 of the closed-loop member 320, the inter-member tensioning portion 321 on the ascending side when the windshield cover 60 in the closed state shown in FIG. 38A is rotated in the opening direction is also referred to as a first tensioning portion, and the inter-member tensioning portion 322 on the descending side is also referred to as a second tensioning portion.

In addition, when the windshield cover 60 in the closed state is brought into the opened state, the relationship in which one of the pair of inter-member tensioning portions of the closed-loop member ascends and the other descends is the same as that of the closed-loop members 2 and 220 of the cover opening and closing mechanisms 1 and 210 already described.

In this respect, the engagement-side tensioning portions 2A and 221 in the closed-loop members 2 and 220 of the cover opening and closing mechanisms 1 and 210 already described are equivalent to the first tensioning portion, and the non-engagement-side tensioning portions 2B, and 222 are equivalent to the second tensioning portion.

As shown in FIGS. 38A and 38B, as for the pair of tension coil springs 6c and 6d of the closed-loop member 320, the tension coil spring 6c arranged at the first tensioning portion 321 is hereinafter also referred to as a first tension coil spring, and the tension coil spring 6d arranged at the second tensioning portion 322 is hereinafter also referred to as second tension coil spring.

Each of the two tension coil springs 6c and 6d of the closed-loop member 320 has one end in the axis direction coupled to the end portion of the first cable member 3a and has the other end portion in the axis direction coupled to the end portion of the second cable member 3b.

Sufficient length is secured in the first and second cable members 3a and 3b so that the first tension coil spring 6c is always located at the first tensioning portion 321 and the second tension coil spring 6d is always located at the second tensioning portion 322 in view of the rotational amount of the closed-loop member 320 accompanying the opening and closing of the windshield cover 60.

Accordingly, situations in which, due to the rotation of the closed-loop member 320 accompanying the opening and closing of the windshield cover 60, the first tension coil spring 6c rides on the outer periphery of the rotating shaft 61a (the first tension coil spring 6c and the outer periphery of the rotating shaft 61a overlap each other) and the second tension coil spring 6d rides on the outer periphery of the pulley 5 (the second tension coil spring 6d and the outer periphery of pulley 5 overlap each other) do not occur.

The fusion splicer in which the cover opening and closing mechanism 310, as shown in FIG. 38A, is provided is brought into the operation standby initial state where the windshield cover 60 is closed and the pair of movable stages 22 (FIG. 1 and the like) are respectively arranged at the positions at the time of fiber mounting, when the power switch (not shown) is turned off from ON.

As the turned-off power switch is turned on, as shown in FIG. 38B, the fusion splicer in the operation standby initial state is brought into a state (fiber set standby state) where the windshield cover 60 is opened as shown in FIG. 38B and the respective movable stages 22 are arranged at the positions at the time of fiber mounting.

The state of the windshield cover 60 and the cover opening and closing mechanism 310 when the fusion splicer is in the operation standby initial state, that is, the state shown in FIG. 38A is hereinafter also referred to as a cover closed standby state.

Additionally, the state of the windshield cover 60 and the cover opening and closing mechanism 310 when the fusion splicer is in the fiber set standby state, that is, the state shown in FIG. 38B, is hereinafter also referred to as a cover closed standby state.

As shown in FIGS. 38A and 38B, the cover opening and closing mechanism 310 includes a power receiving protrusion 4c (power receiving member) that protrudes from the pulley 5.

The power receiving protrusion 4c is integrated with the pulley 5 and rotates integrally with the pulley 5.

The pulley 5 provided so that the power receiving protrusion 4c protrudes is hereinafter also referred to as a pulley 5A with a protrusion.

In addition, the power receiving protrusion 4c protrudes in the axis direction of the pulley 5 from a place excluding a region where the second cable member 3b is wound, in order to avoid interference with the closed-loop member 320.

In the cover opening and closing mechanism 310, the power receiving protrusion 4c of the pulley 5A with a protrusion is arranged between the upper and lower pushing protrusions 11a and 11b of the power transmission member 217.

As shown in FIG. 38A, the cover opening and closing mechanism 310 is brought into a state where the lower pushing protrusion 11b of the power transmission member 217 is arranged in proximity to the power receiving protrusion 4c via a slight gap on the lower side of the power receiving protrusion, when being in the cover closed standby state.

The upper pushing protrusion 11a of the power transmission member 217 is arranged at a position apart upward from the power receiving protrusion 4c so as to have a distance that is markedly large compared to the distance between the lower pushing protrusion 11b and the power receiving protrusion 4c.

The dimension of the power receiving protrusion 4c (the portion arranged between the upper and lower pushing protrusions 11a and 11b) in the direction (up-and-down direction) in which the upper and lower pushing protrusions 11a and 11b of the power transmission member 217 face each other is markedly small compared to the separation distance between the upper and lower pushing protrusions 11a and 11b.

The cover opening and closing mechanism 310 and the windshield cover 60 can perform the cover opening operation of opening the windshield cover 60 from the cover closed standby state shown in FIG. 38A and the like by the normal rotational driving of the electric motor 9.

In this cover opening operation, the windshield cover 60 is brought into the fully opened state shown in FIG. 38B by the opening operation caused by the self-weight of the windshield cover 60 after a cover opening driving operation of rotating the windshield cover 60 in the closed state in the opening direction by the driving force of the electric drive source 9 is performed.

In the cover opening driving operation, the windshield cover 60 in the closed state is rotated to a position where the self-weight opening operation is allowed.

The cover opening driving operation is realized by lifting the power transmission member 217 by the normal rotational driving of the electric motor 9, pushing up the power receiving protrusion 4c of the pulley 5A with a protrusion by the lower pushing protrusion 11b of the power transmission member 217, and rotating the windshield cover 60 in the closed state in the opening direction together with the rotating shaft 61a.

If the lower pushing protrusion 11b of the power transmission member 217 pushes up the power receiving protrusion 4c of the pulley 5A with a protrusion, correspondingly, a tensile force applied to the rotating shaft 61a of the windshield cover 60 via the second tension coil spring 6d of the closed-loop member 320 from the power receiving protrusion 4c acts as the rotative force of the rotating shaft 61a.

As a result, if the lower pushing protrusion 11b of the power transmission member 217 pushes up the power receiving protrusion 4c of the pulley 5A with a protrusion, correspondingly, the rotating shaft 61a can be rotated together with the windshield cover 60.

In the cover opening driving operation, when the rotation of the windshield cover 60 in the opening direction is hindered due to a certain obstacle, the second tension coil spring 6d of the closed-loop member 320 is stretched with the ascent of the power transmission member 217.

The second tension coil spring 6d is stretchable until the rotational amount of the electric motor 9 (here, the stepping motor) reaches the completion of the cover opening driving operation.

Accordingly, the cover opening and closing mechanism 310 can prevent a disadvantage such that the electric motor 9 is damaged due to an excessive load.

Additionally, when a certain obstacle is removed after the cover opening driving operation is hindered due to the obstacle as described above, the windshield cover 60 is rotated from the closed position to an angle equal to or more than that of the cover opening driving operation by the elastic force of the second tension coil spring 6d, and the windshield cover 60 is eventually brought into the opened state (fully opened state).

The power transmission member 217 of the cover opening and closing mechanism 310 is arranged at a position shown by a virtual line of FIG. 38B, when the cover opening operation is completed.

The lower pushing protrusion 11b of the power transmission member 217 at the arrangement position shown by the virtual line in FIG. 38B is arranged in proximity to the power receiving protrusion 4c via a slight gap on the lower side of the power receiving protrusion.

The upper pushing protrusion 11a is arranged at a position apart upward from the power receiving protrusion 4c so as to have a distance that is markedly large compared to the distance between the lower pushing protrusion 11b and the power receiving protrusion 4c.

After the completion of the cover opening operation, the cover opening and closing mechanism 310 performs the protrusion shift operation after opening of the cover of reversely rotationally driving the electric motor 9 to lower the power transmission member 217 and arranging the power transmission member 217 at a position shown by a solid line in FIG. 38B.

As a result, the windshield cover 60 and the cover opening and closing mechanism 310 are brought into the cover opened standby state shown by the solid line in FIG. 38B.

The upper pushing protrusion 11a of the power transmission member 217 is arranged in proximity to the power receiving protrusion 4c via a slight gap on the upper side of the power receiving member by the protrusion shift operation after opening of the cover.

Additionally, the lower pushing protrusion 11b is arranged apart from the power receiving protrusion 4c at a separation distance from the power receiving protrusion 4c that is markedly large compared to the separation distance between the upper pushing protrusion 11a and the power receiving protrusion 4c, from the power receiving protrusion 4c to the lower side.

This secures a larger separation distance than the travel amount (ascent amount) of the power receiving protrusion 4c that ascends when the windshield cover 60 in the opened state is manually opened, between the lower pushing protrusion 11b and the power receiving protrusion 4c.

Here, by including the space 11sb secured between the lower pushing protrusion 11b and the power receiving protrusion 4c, it is possible for the power receiving protrusion 4c to ascend and descend without coming into contact with the lower pushing protrusion 11b when manual opening and closing of the windshield cover 60 are performed.

Accordingly, in the fusion splicer in which the cover opening and closing mechanism 310 is provided, the windshield cover 60 can be manually opened and closed without displacing the power transmission member 217 from the state shown in FIG. 38B.

In addition, the size of the power receiving protrusion 4c in the direction perpendicular to the extending direction of the engagement-side tensioning portion 221 is made larger than the external diameter of the tension coil springs 6c and 6d.

In the cover opening and closing mechanism 310, the lower pushing protrusion 11b can be engaged with the power receiving protrusion 4c of the pulley 5A with a protrusion from therebelow by lifting the power transmission member 217 by the normal rotational driving of the electric motor 9.

Then, in the cover opening and closing mechanism 310, the power receiving protrusion 4c can be pushed up with the ascent of the power transmission member 217 by the lower pushing protrusion 11b engaged with the power receiving protrusion 4c.

Additionally, in the cover opening and closing mechanism 310, the upper pushing protrusion 11a can be engaged with the power receiving protrusion 4c of the pulley 5A with a protrusion from thereabove by lowering the power transmission member 217 by the reverse rotational driving of the electric motor 9 from the cover opened standby state shown in FIG. 38B.

Then, in the cover opening and closing mechanism 310, the power receiving protrusion 4c can be pushed down with the descent of the power transmission member 217 by the upper pushing protrusion 11a engaged with the power receiving protrusion 4c.

The cover opening and closing mechanism 310 and the windshield cover 60 can perform the cover closing operation of closing the windshield cover 60 from the cover opened standby state shown in FIG. 38B by the reverse rotational driving of the electric motor 9.

This cover closing operation is the operation in which the windshield cover 60 is brought into the closed state shown in FIG. 38A by the self-weight closing operation of the windshield cover 60 after the cover closing driving operation of rotating the windshield cover 60 in the opened state in the closing direction by the driving force of the electric drive source 9 is performed.

In the cover closing driving operation, the windshield cover 60 in the opened state is rotated to a position where the closing operation is allowed due to the self-weight of the windshield cover.

The cover closing driving operation is realized by lowering the power transmission member 217 by the reverse rotational driving of the electric motor 9, pushing down the power receiving member 4c of the pulley 5A with a protrusion by the upper pushing protrusion 11a of the power transmission member 217, and rotating the windshield cover 60 in the closed state in the closing direction together with the rotating shaft 61a of the windshield cover 60.

If the upper pushing protrusion 11a of the power transmission member 217 pushes down the power receiving member 4c of the pulley 5A with a protrusion, correspondingly, the rotating shaft 61a of the windshield cover 60 exerts a tensile force via the first tension coil spring 6c of the closed-loop member 320 from the power receiving protrusion 4c, and the rotating shaft 61a of the windshield cover 60 and the windshield cover 60 are rotated.

In the cover closing driving operation, when the rotation of the windshield cover 60 in the closing direction is hindered due to a certain obstacle, such as inclusion of foreign matter, the first tension coil spring 6c of the closed-loop member 320 is stretched with the descent of the power transmission member 217.

The first tension coil spring 6c is stretchable until the rotational amount of the electric motor 9 (here, the stepping motor) reaches the completion of the cover closing driving operation.

Accordingly, the cover opening and closing mechanism 310 can prevent a disadvantage such that the electric motor 9 is damaged due to an excessive load.

Additionally, when a certain obstacle is removed after the cover closing driving operation is hindered due to the obstacle as described above, the windshield cover 60 is rotated from the fully opened position to an angle equal to or more than that of the cover closing driving operation by the elastic force of the first tension coil spring 6c, and the windshield cover 60 is eventually brought into the closed state.

Additionally, the fusion splicer in which the cover opening and closing mechanism 310 is provided automatically executes the cover closing repetition operation already described when the windshield cover 60 is not brought into the closed state (the cover-closing detector 33 of FIG. 6 is not switched from the non-detection state to the detection state), due to a certain obstacle, such as inclusion of foreign matter.

The power transmission member 217 is arranged at the position shown by the virtual line of FIG. 38A, when the cover closing operation is completed.

The upper pushing protrusion 11a of the power transmission member 217 at the arrangement position shown by the virtual line in FIG. 38A is arranged in proximity to the power receiving protrusion 4c via a slight gap on the upper side of the power receiving member.

The lower pushing protrusion 11b is arranged at a position apart downward from the power receiving protrusion 4c at a distance that is markedly large compared to the distance between the upper pushing protrusion 11a and the power receiving protrusion 4c.

After the completion of the cover closing operation, the cover opening and closing mechanism 310 performs the protrusion shift operation after opening of the cover of normally rotationally driving the electric motor 9 to lift the power transmission member 217 and arranging the power transmission member 217 at the position shown by the solid line in FIG. 38A.

As a result, the windshield cover 60 and the cover opening and closing mechanism 310 are brought into the cover closed standby state shown by the solid line in FIG. 38A.

The lower pushing protrusion 11b of the power transmission member 217 is arranged in proximity to the power receiving protrusion 4c via a slight gap on the lower side of the power receiving member by the protrusion shift operation after closing of the cover.

Additionally, the upper pushing protrusion 11a is arranged apart from the power receiving protrusion 4c at a separation distance from the power receiving protrusion 4c that is markedly large compared to the separation distance between the lower pushing protrusion 11b and the power receiving protrusion 4c, from the power receiving member 4c to the upper side.

This secures a larger separation distance than the travel amount (ascent amount) of the power receiving protrusion 4c that ascends when the windshield cover 60 in the closed state is manually opened, between the upper pushing protrusion 11a and the power receiving protrusion 4c.

Here, by including the space 11sa secured between the upper pushing protrusion 11a and the power receiving protrusion 4c, it is possible for the power receiving protrusion 4c to ascend and descend without coming into contact with the upper pushing protrusion 11a when manual opening and closing of the windshield cover 60 are performed.

Accordingly, in the fusion splicer in which the cover opening and closing mechanism 310 is provided, the windshield cover 60 can be manually opened and closed without displacing the power transmission member 217 from the state shown in FIG. 38A.

Incidentally, the closed-loop member 320 of the cover opening and closing mechanism 310 is tensioned between the rotating shaft 61a of the windshield cover 60 and the pulley 5 in a state where a certain degree of tension is exerted.

The second cable member 3b of the closed-loop member 320 is pressed against the pulley 5 by the tension that acts on the second cable member 3b, for example, when the driving force of the electric drive source 9 opens the windshield cover 60 in the closed state.

For this reason, the pulley 5 is rotated without slipping with respect to the second cable member 3b according to the movement of the second cable member 3b accompanying the ascent of the lower pushing protrusion 11b of the power transmission member 217 by the driving force of the electric drive source 9.

However, if the tension that acts on the second cable member 3b decreases, a possibility that the pulley 5 slips with respect to the second cable member 3b increases.

Figure 50:
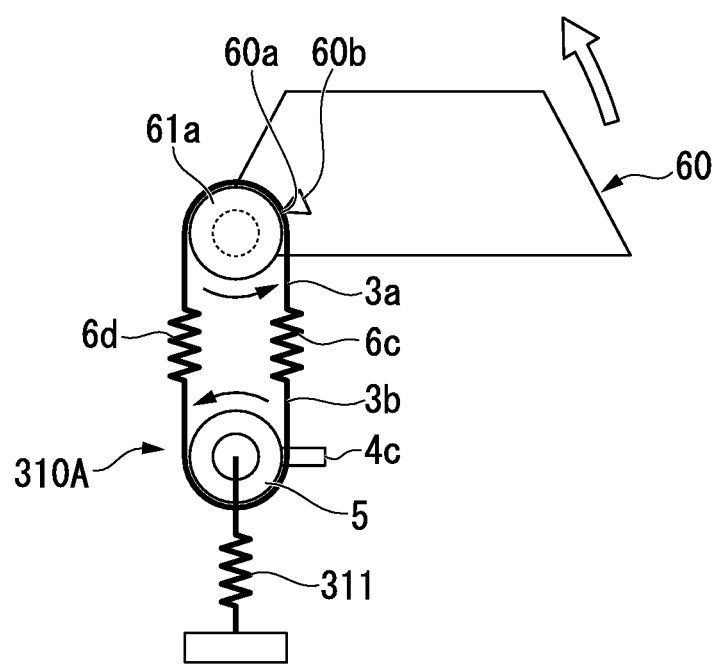
FIG. 50 is a view schematically showing the relationship between a closed-loop member, and a windshield cover rotating shaft and a pulley therebelow, in a modification example (a fourth example of the cover opening and closing mechanism) of the cover opening and closing mechanism shown in FIGS. 38A and 38B.
Figure 51:
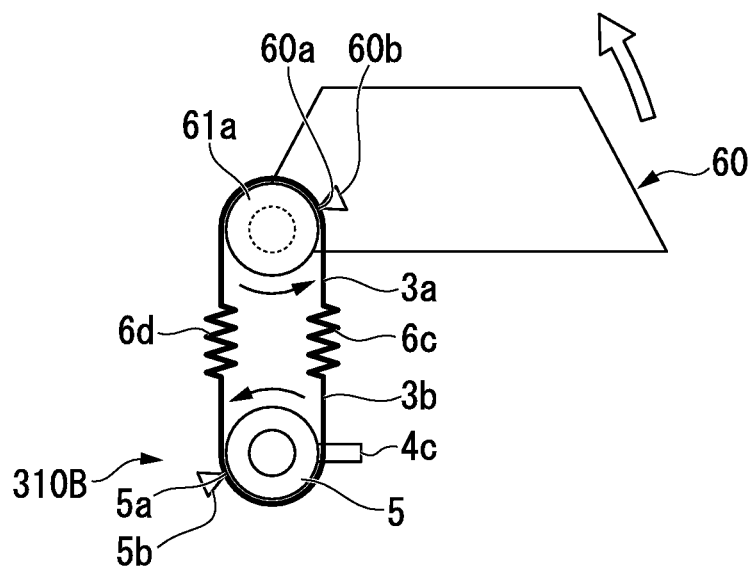
FIG. 51 is a view schematically showing the relationship between a closed-loop member, and a windshield cover rotating shaft and a pulley therebelow, in a modification example (a fifth example of the cover opening and closing mechanism) of the cover opening and closing mechanism shown in FIGS. 38A and 38B.
Figure 52:
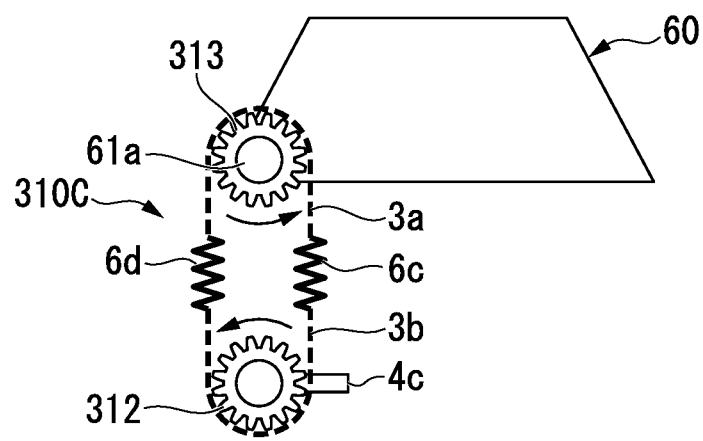
FIG. 52 is a view schematically showing the relationship between a closed-loop member, and a gear attached to the windshield cover rotating shaft and a gear provided therebelow, in the sixth example of the cover opening and closing mechanism.

A measure for preventing the slip with respect to the second cable member 3b of the pulley 5 may include, for example, a configuration shown in FIGS. 50 to 52.

FIGS. 50 to 53 all show modification examples of the cover opening and closing mechanism 310.

In addition, illustration of the drive mechanism 211 is omitted in FIGS. 50 and 51.

Additionally, also in FIGS. 52 and 53 to be described below, illustration of the drive mechanism 211 is omitted.

In the cover opening and closing mechanism 310A (a fourth example of the cover opening and closing mechanism) illustrated in FIG. 50, with respect to the cover opening and closing mechanism 310, the pulley 5 is displaceable in the up-and-down direction with respect to the housing 29 of the apparatus body 21 (refer to FIG. 3), and a pulley biasing portion 311 (coil spring in the illustrated example) that elastically biases the pulley 5 downward is added.

In this configuration, the pulley biasing portion 311 elastically biases the pulley 5 downward (an elastic restoring force acts on the pulley 5 downward) to thereby stably maintain the tension of the entire closed-loop member 320 including the second cable member 3b.

In addition, the pulley 5 is not limited to being displaced in the up-and-down direction with respect to the housing 29 of the apparatus body 21, and may be freely movable in other directions.

The cover opening and closing mechanism 310B (a fifth example of the cover opening and closing mechanism) illustrated in FIG. 51 has a cable member fixed portion 5a provided by partially fixing the portion of the second cable member 3b wound around the pulley 5 to the pulley 5 by a cable member fixing member 5b, compared to the cover opening and closing mechanism 310.

The cable member fixed portion 5a is provided by fixing the portion of the second cable member 3b wound around the pulley 5 to the pulley 5 in some locations in the longitudinal direction of the second cable member 3b.

Most portions of the second cable member 3b wound around the pulley 5 are not fixed to the pulley 5.

Additionally, the pulley 5 functions as a rotatable cable member winding unit.

For example, a cover opening and closing mechanism 310C (a sixth example of the cover opening and closing mechanism) shown in FIG. 52 is a modification example of the cover opening and closing mechanism 310, adopts a gear 312 instead of the pulley 5 as a cable member winding member (wound body winding member), and integrates a gear 313 coaxially with the rotating shaft 61a of the windshield cover 60.

In the cover opening and closing mechanism 310C, the cable members 3a and 3b of the closed-loop member 320 may be, for example, members capable of meshing with the gears 312 and 313, such as chains or toothed belts, and are wound around the gears 312 and 313.

In this configuration, as the gears 312 and 313 and the cable members 3a and 3b mesh with each other, the rotation of gears 312 and 313 and the movement (rotation) of the cable member 3a and 3b reliably interlock with each other.

Figure 53:
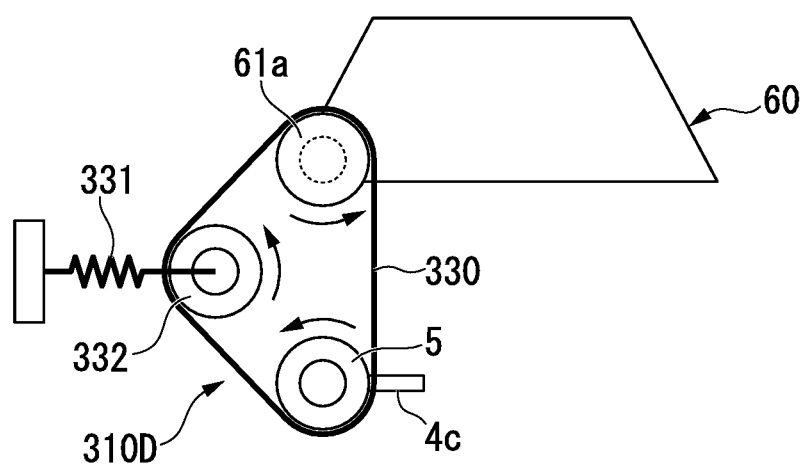
FIG. 53 is a view schematically showing the relationship among a closed-loop member, a windshield cover rotating shaft and a pulley therebelow, and a tension roller, in a seventh example of the cover opening and closing mechanism.

A cover opening and closing mechanism 310D (a seventh example of the cover opening and closing mechanism) shown in FIG. 53 adopts a closed-loop member 330 constituted of an endless cable member 3, compared to the cover opening and closing mechanism 310.

Additionally, the cover opening and closing mechanism 310D is provided with, instead of the tension coil springs 6a and 6b, a tension roller 332 (second cable member winding unit) that pulls one of the pair of inter-member tensioning portions of the closed-loop member 330 in a direction away from the other inter-member tensioning portion by the elastic biasing force (elastic restoring force) of a spring 331 (biasing member), and gives tension to the closed-loop member 330.

The spring 331 functions as a biasing member that gives tension to the closed-loop member 330.

In the cover opening and closing mechanism 310D, the distance between the pulley 5 and the rotating shaft 61a does not change.

In addition, in FIG. 53, although the tension roller 332 is provided so as to be movable in a direction perpendicular to the extending direction of the cable member, the tension roller may be provided so as to be movable in another direction as long as the cable member can be elastically biased.

As the cover opening and closing mechanism, compared to the cover opening and closing mechanisms 310A to 310D illustrated in FIGS. 50 to 53, a configuration may be adopted in which the power receiving protrusion 4c provided in the pulley 5 is omitted, one of the pair of inter-member tensioning portions of the closed-loop member is used as the engagement-side tensioning portion by providing the power receiving protrusions 4a and 4b in places apart from each other in the extending direction of the inter-member tensioning portions so as to protrude, the other of the inter-member tensioning portions is used as the non-engagement-side tensioning portion, and the drive mechanism 1*a* illustrated in FIG. 18A, FIG. 18B, and the like is applied.

In this case, the pushing protrusion 11 of the drive mechanism 1*a* is arranged between the power receiving protrusions 4*a* and 4*b* of the engagement-side tensioning portion.

Additionally, as the cover opening and closing mechanism, the power receiving protrusion 4*c* provided in the pulley 5 may be omitted compared to the cover opening and closing mechanisms 310A to 310D illustrated in FIGS. 50 to 53.

Additionally, a configuration may be adopted in which one of the pair of the inter-member tensioning portions of the closed-loop member is used as the engagement-side tensioning portion by providing the power receiving protrusion 4 in one place in the extending direction of the inter-member tensioning portions so as to protrude, the other of the inter-member tensioning portions is used as the non-engagement-side tensioning portion, and the drive mechanism 211 illustrated in FIG. 28 and the like is applied.

In this case, the power receiving protrusion 4 of the engagement-side tensioning portion is arranged between the pushing protrusions 11*a* and 11*b* of the drive mechanism 211 that are provided apart from each other.

Figure 54A:
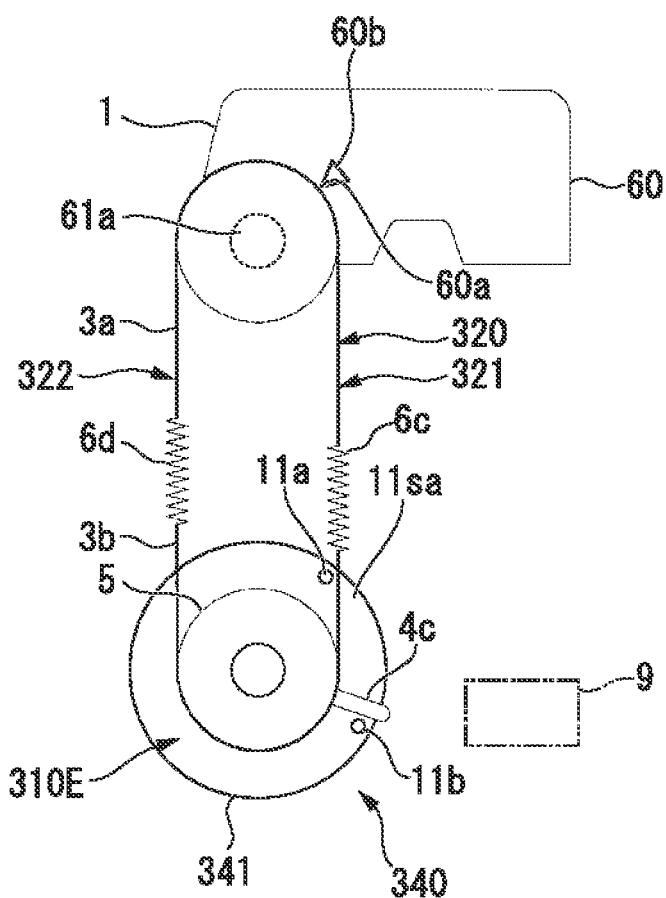
FIG. 54A is a view schematically showing the cover opening and closing mechanism, and a state where the windshield cover is closed.
Figure 54B:
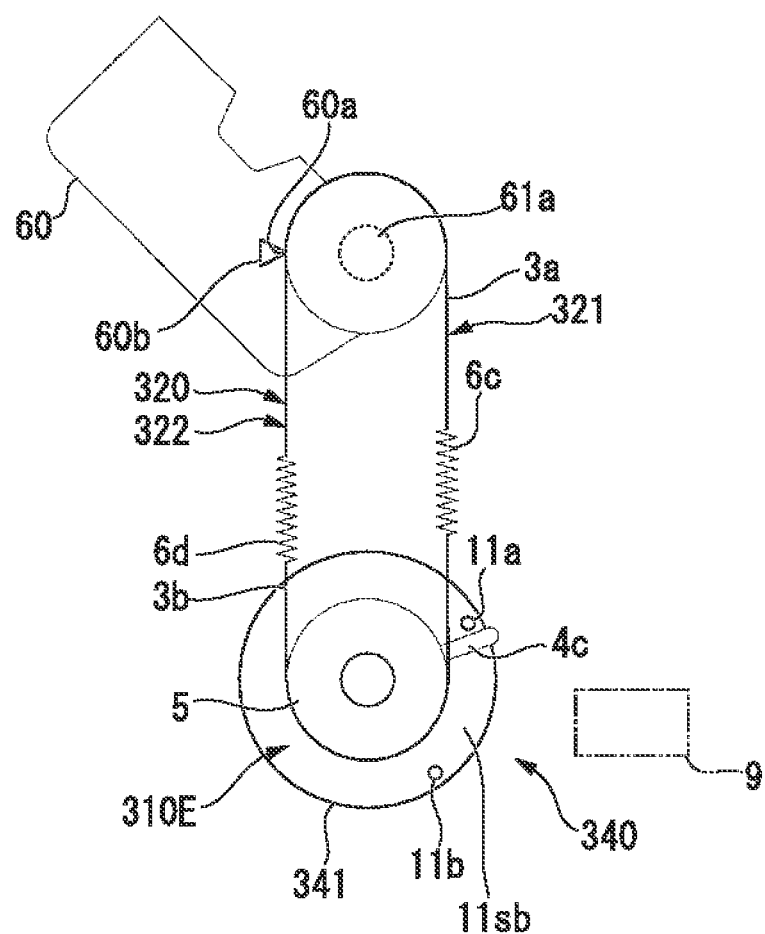
FIG. 54B is a view schematically showing the cover opening and closing mechanism, and a state where the windshield cover is opened.

As the cover opening and closing mechanism, a cover opening and closing mechanism 310E (an eighth example of the cover opening and closing mechanism) with a configuration in which a drive mechanism 340 shown in FIGS. 54A and 54B is adopted instead of the drive mechanism 211 using the power transmission member 217 may be used, compared to the cover opening and closing mechanism 310 of the third example of FIGS. 38A and 38B.

The drive mechanism 340 of the cover opening and closing mechanism 310E shown in FIGS. 54A and 54B has a power transmission member 341 (hereinafter also referred to as a rotating member).

The power transmission member 341 has a rotating shaft, and the pulley 5 and the power transmission member 341 are rotationally driven on the same rotation axis by the driving force of the electric drive source 9 (electric motor in the illustrated example).

In two places of the rotating member 341 that are apart from each other, the pushing protrusions 11*a* and 11*b* are provided to protrude in the rotational circumferential direction of the rotating member 341.

In more detail, the pushing protrusions 11*a* and 11*b* are arranged in the rotational circumferential direction of the rotating member 341 on the side surface of the rotating member 341 where the pulley is provided, and protrude in the direction of the rotation axis of the rotating member 341.

The power receiving protrusion 4*c* is provided so as to protrude from the pulley 5, and is arranged between the above two pushing protrusions 11*a* and 11*b*.

The power receiving protrusion 4*c* is arranged to secure a space that enables the two pushing protrusions 11*a* and 11*b* to move in the direction in which the pushing protrusions face each other, between the above two pushing protrusions 11*a* and 11*b*.

The rotating member 341 of the illustrated example is formed in the shape of a disc.

However, the shape of the rotating member 341 is not particularly limited.

Additionally, the pushing protrusions 11*a* and 11*b* of the cover opening and closing mechanism 310E may be formed in the shape of a pin (illustrated example) in the example shown in FIGS. 54A and 54B.

However, the shape of the pushing protrusions 11*a* and 11*b* is not particularly limited.

In addition, in FIGS. 54A and 54B, a configuration in which the power transmission member 217 and the thrust-up shaft 14 that are lifted and lowered by the driving force of the electric drive source 9 are omitted is illustrated as the cover opening and closing mechanism 310E.

However, as the cover opening and closing mechanism 310E, a configuration may be adopted, including the power transmission member 217 that is lifted and lowered by the driving force of the electric drive source 9 and the thrust-up shaft 14 that is lifted by the ascent of the power transmission member 217, similar to the cover opening and closing mechanism 310 of the third example.

Additionally, as the cover opening and closing mechanism, the rotating member 341 may be provided not only coaxially with the pulley 5, but also may be provided so that the rotation center of the rotating member 341 deviates from the rotation center of the pulley 5, compared to the cover opening and closing mechanism 310E shown in FIGS. 54A and 54B.

As the cover opening and closing mechanism, for example, a configuration may be adopted in which the rotating member with the pushing protrusions 11*a* and 11*b* illustrated in FIGS. 54A and 54B is used as the power transmission member, compared to the cover opening and closing mechanisms 310A to 310D of the fourth to seventh examples.

In the cover opening and closing mechanisms 310 and 310E of the third and eighth examples, the power receiving protrusion 4*c* that is provided to protrude from the pulley 5 is arranged between the two pushing protrusions 11*a* and 11*b* apart from each other.

The cover opening and closing mechanism is not limited to this. With respect to the cover opening and closing mechanism 310 or 310E, the pushing protrusion 11 provided to protrude from one place of the power transmission member 217 or 341 may be arranged to secure a space that enables the power receiving protrusions provided to protrude from two places to move in a mutually facing direction, between power receiving protrusions provided in two places that are apart from each other in the circumferential direction of the pulley 5.

A configuration in which the pushing protrusion provided to protrude from one place of the power transmission member is arranged to secure a space that enables the movement between the power receiving protrusions provided to protrude from two places, between the power receiving protrusions provided in two places that are apart from each other in the circumferential direction of the pulley 5 around which the cable member of the closed-loop member is wound can also be applied to the cover opening and closing mechanisms 310A to 310D of the fourth to seventh examples.

In the cover opening and closing mechanisms 1 and 210 of the first and second examples, a cable member winding unit (wound body winding portion) that functions as a cable member guide member (wound body guide member) that guides feed movement of a cable member of a closed-loop member, such as a non-rotary pulley, instead of the rotatable pulley 5, may be used as the cable member winding unit.

(Aspect in which Dual-Split Windshield Cover is Adopted)

FIGS. 39 to 48 show an example using a windshield cover 60A (split type windshield cover) constituted of a front windshield cover 68 journaled on the apparatus body 21 and a rear windshield cover 69 journaled on the apparatus body 21 and provided on the rear side of the front windshield cover 68.

Figure 39:
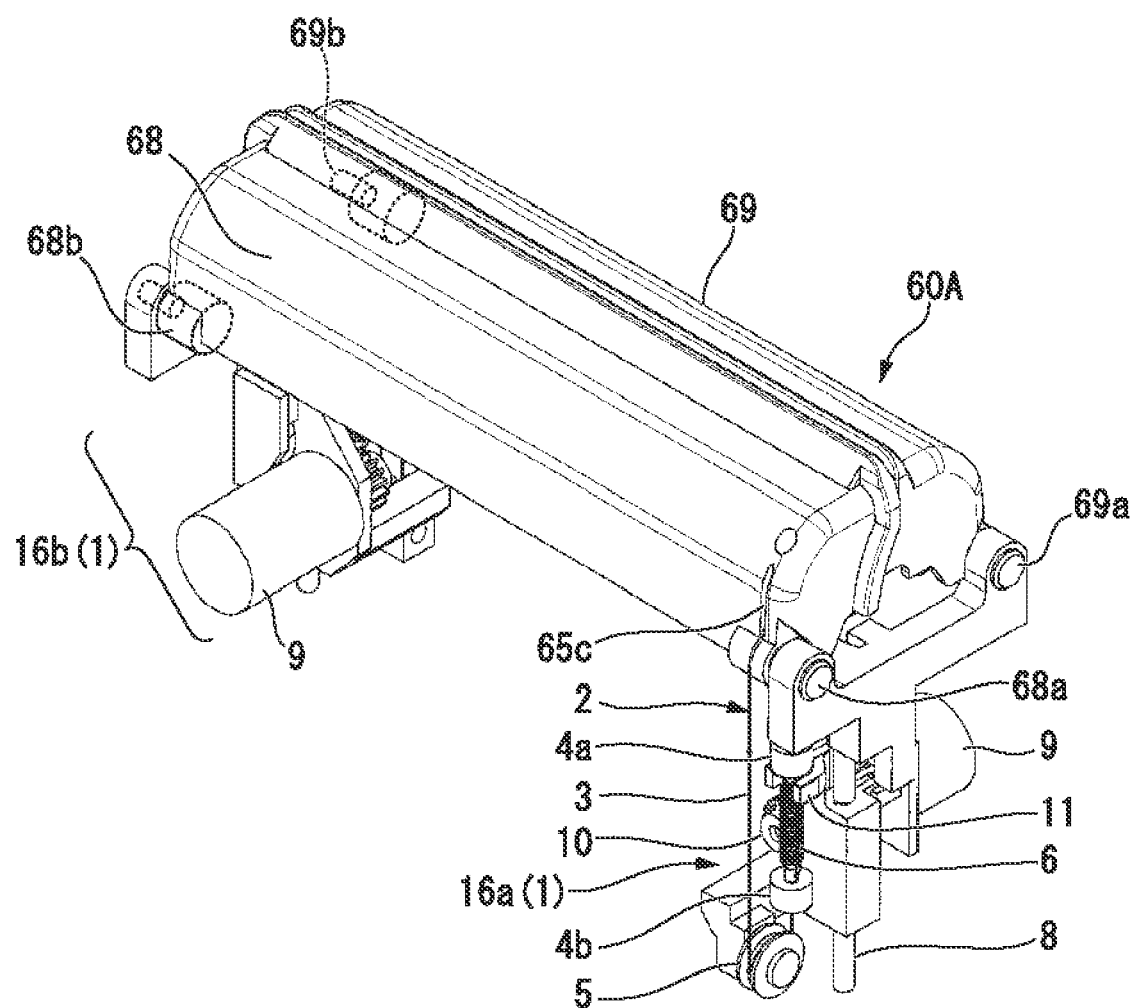
FIG. 39 is a view illustrating a dual-split windshield cover of the optical fiber fusion splicer related to the embodiment of the invention, and opening and closing mechanisms that are respectively provided in a front windshield cover and a rear windshield cover that constitute the dual-split windshield cover, and is a perspective view showing a state where the dual-split windshield cover is closed when viewed diagonally from the front upper right side of the fusion splicer.
Figure 40:
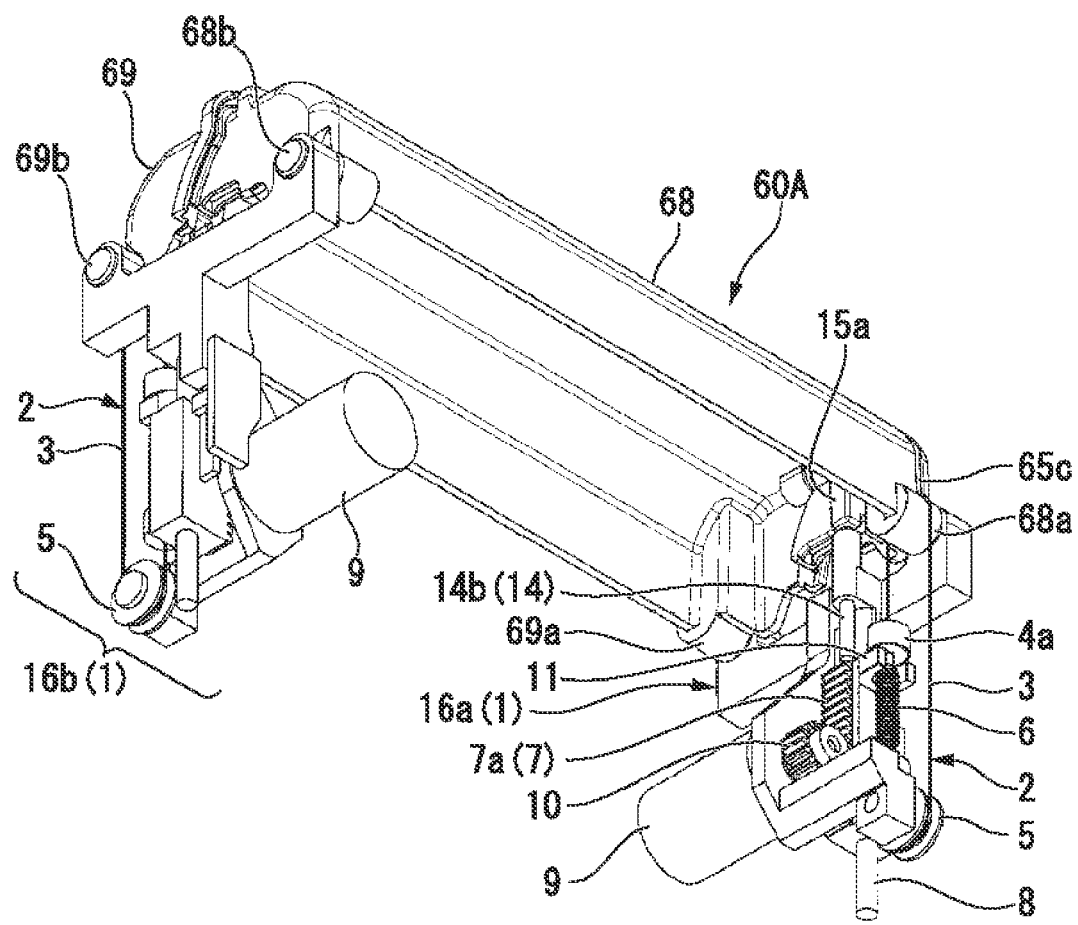
FIG. 40 is a view illustrating the dual-split windshield cover and its opening and closing mechanism of FIG. 39, and is a perspective view showing a state when viewed diagonally from the front lower left side of the fusion splicer.
Figure 41:
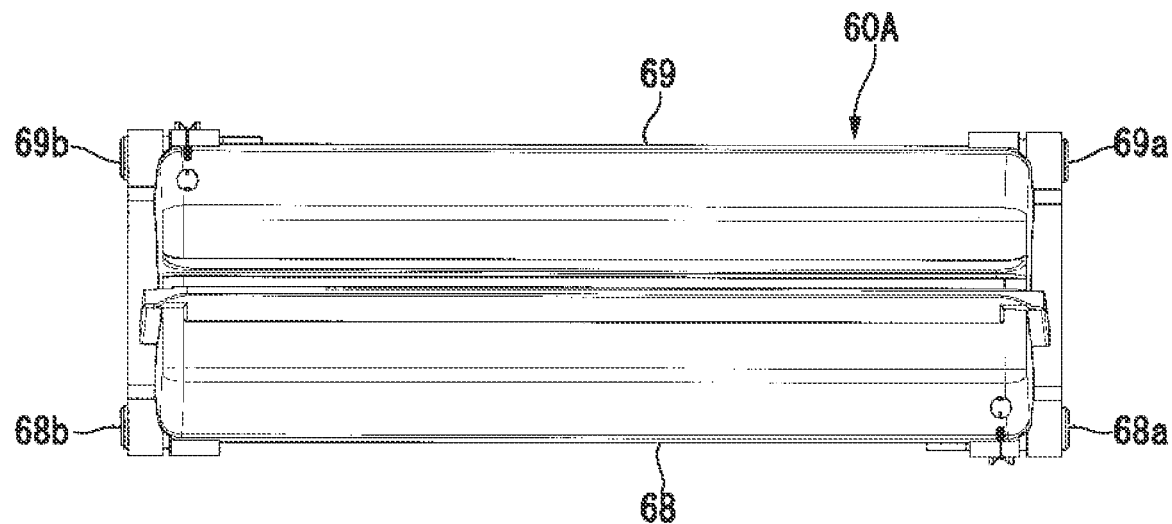
FIG. 41 is a plan view illustrating the dual-split windshield cover and its opening and closing mechanisms of FIG. 39.
Figure 42:
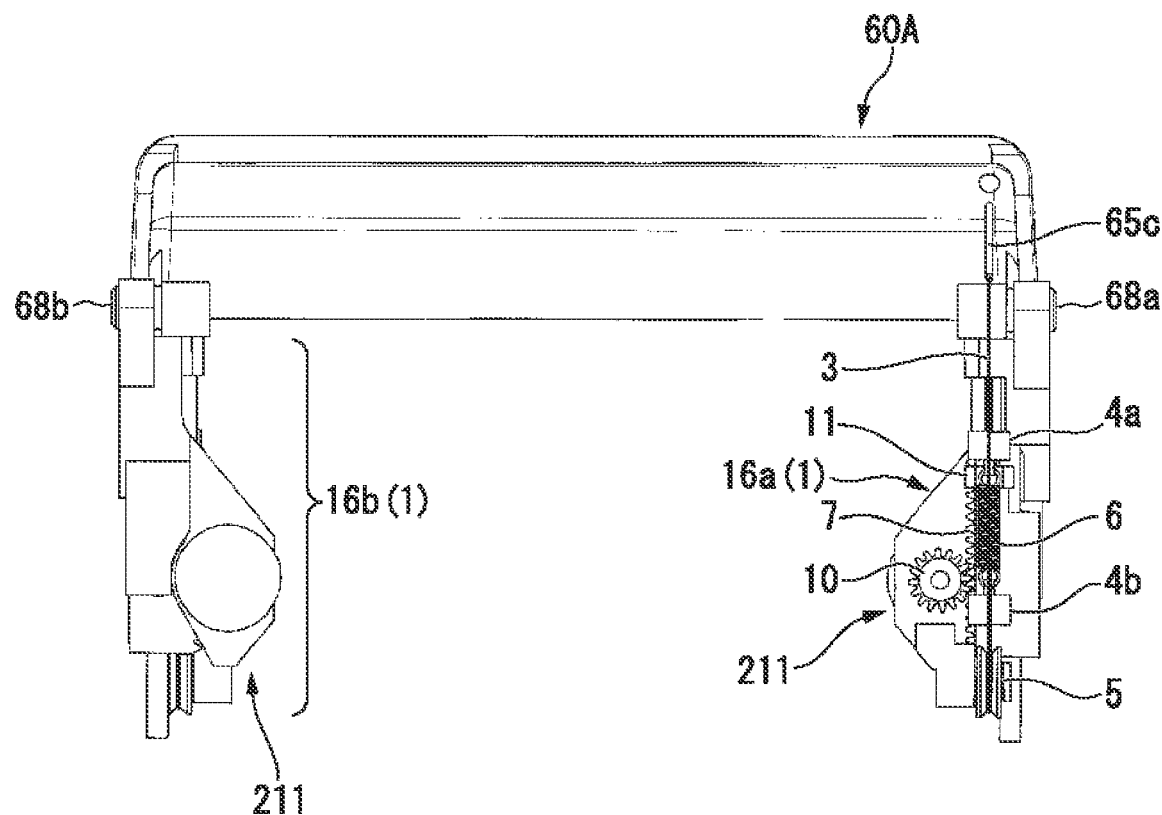
FIG. 42 is a view illustrating the dual-split windshield cover and its opening and closing mechanism of FIG. 39, and is a front view showing a state when viewed from the front side of the fusion splicer.
Figure 43:
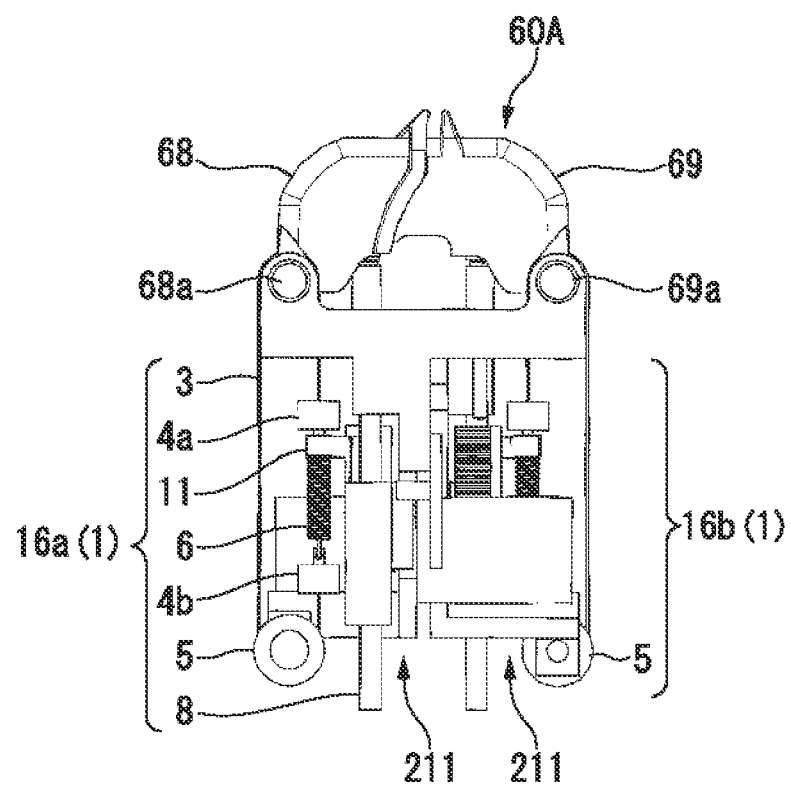
FIG. 43 is a view illustrating the dual-split windshield cover and its opening and closing mechanisms of FIG. 39, and is a view (right side view) showing a state when viewed from the right side of the fusion splicer.

As shown in FIGS. 39 to 41, the front windshield cover 68 is rotatably journaled to the apparatus body 21 with the rotation axis of the fusion splicer in the left-and-right direction as a starting point by the rotating shafts 68*a* and 68*b*, and is openably and closably provided with respect to the upper surface of the apparatus body 21.

The rear windshield cover 69 is rotatably journaled to the apparatus body 21 with the rotation axis of the fusion splicer in the left-and-right direction as a starting point by the rotating shafts 69a and 69b provided at positions deviated from the rotating shafts 68a and 68b of the front windshield cover 68 to the rear side in the front-and-rear direction of the fusion splicer, and is openably and closably provided to the upper surface of the apparatus body 21.

The windshield covers 68 and 69 are closed with respect to the apparatus body 21, respectively, and thereby mutually closed together, and constitute the windshield cover 60A that accommodates the pair of electrode rods 24 (refer to FIG. 6) located on the apparatus body 21, the covering clamps 50 on the respective movable stages 22, and the pair of grooved substrates 23.

Additionally, the windshield cover 60A can rotate the front and rear windshield covers 68 and 69 in directions apart from each other, to open the windshield covers.

The windshield cover 60A can be opened and closed by the opening and closing of the front and rear windshield covers 68 and 69 with respect to the apparatus body 21.

The front windshield cover 68 and the rear windshield cover 69 function as cover members that constitute the windshield cover 60A.

In this respect, as for the windshield cover 60 described with reference to FIG. 8 and the like, the windshield cover 60 itself is equivalent to a cover member.

In addition, in the present specification, each of the front windshield cover 68 and the rear windshield cover 69 are separately also equivalent to the windshield cover of the fusion splicer of the embodiment related to the invention.

As shown in FIG. 39, FIG. 40, and the like, a configuration in which two cover opening and closing mechanisms 16a and 16b are provided so as to correspond to the pair of front and rear windshield covers 68 and 69, respectively, is illustrated in the present example.

The two cover opening and closing mechanisms 16a and 16b are provided for the pair of windshield covers 68 and 69, respectively.

Hereinafter, the cover opening and closing mechanism 16a that opens and closes the front windshield cover 68 is also referred to as a front cover opening and closing mechanism, and the cover opening and closing mechanism 16b that opens and closes the rear windshield cover 68 is also referred to as a rear cover opening and closing mechanism.

The cover opening and closing mechanisms 16a and 16b of the illustrated example adopt the cover opening and closing mechanism 1 described with reference to FIGS. 18A to 27B, and the like.

Accordingly, a description of the specific configuration, operation, and the like of the cover opening and closing mechanisms 16a and 16b will be omitted herein.

Figure 44:
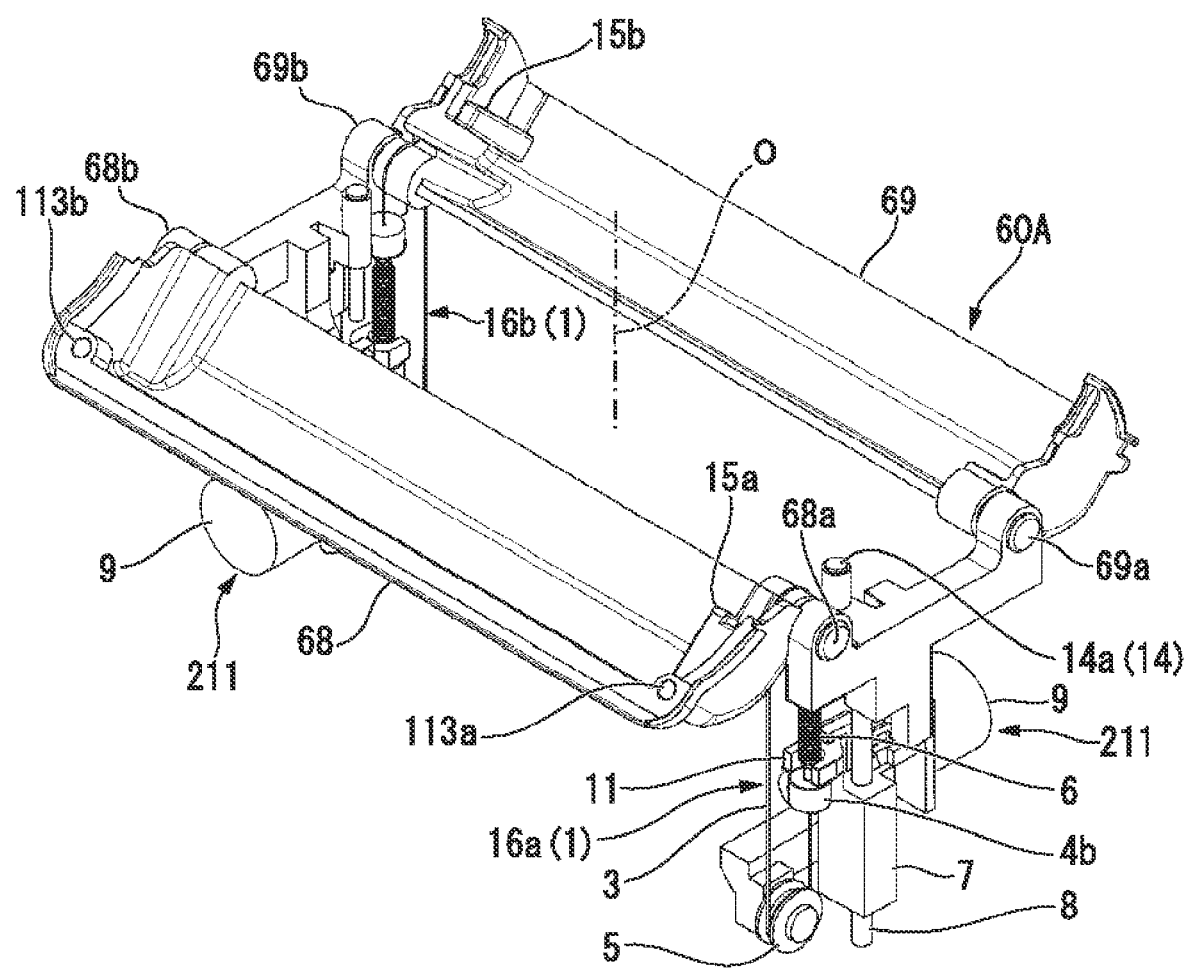
FIG. 44 is a perspective view of a state where the dual-split windshield cover is opened from the state of FIG. 39 by a cover opening operation performed by driving the electric drive source when viewed diagonally from the front upper right side of the fusion splicer, regarding the dual-split windshield cover and its opening and closing mechanism of FIG. 39.
Figure 45:
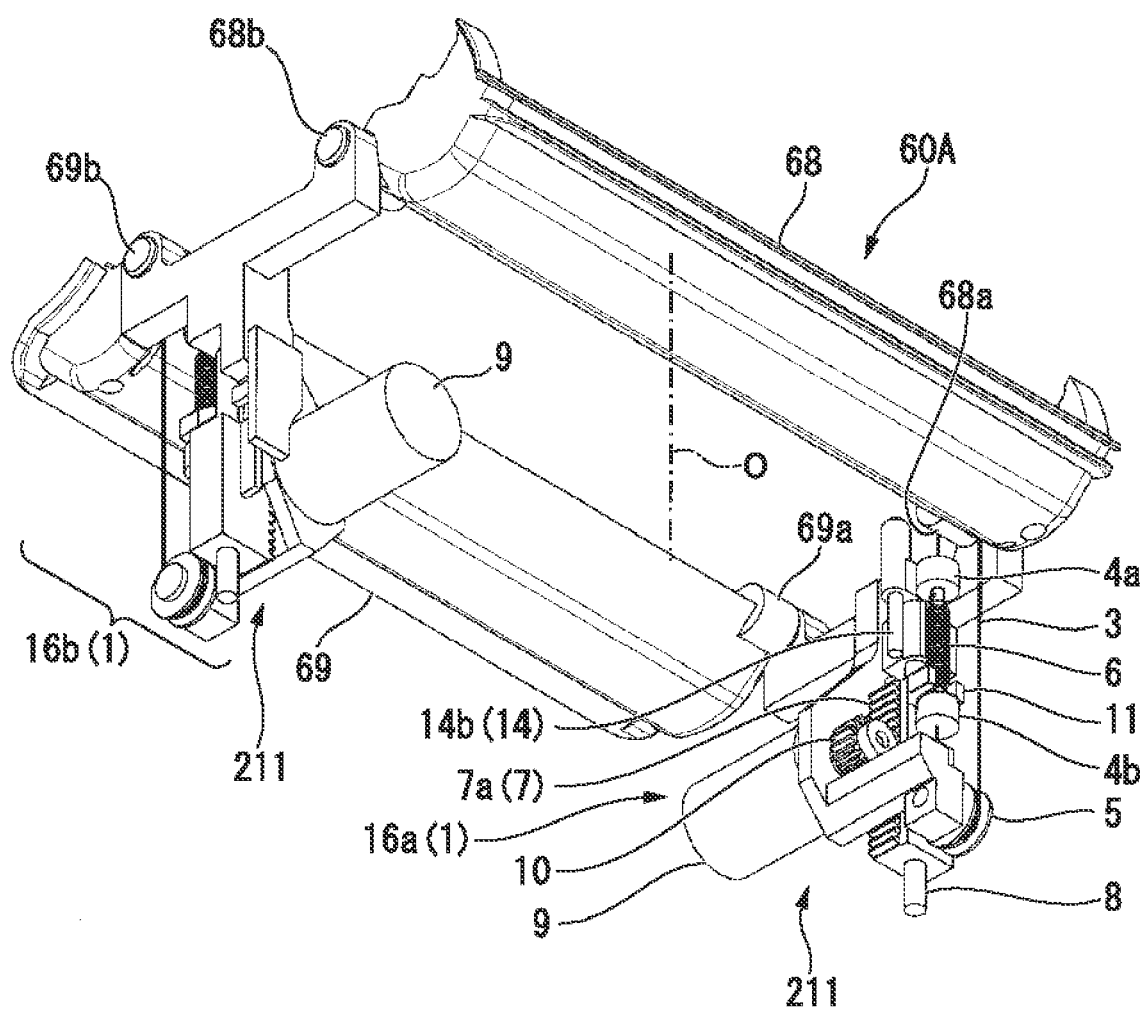
FIG. 45 is a perspective view showing a state where the dual-split windshield cover and its opening and closing mechanism of FIG. 44 are viewed diagonally from the front lower left side of the fusion splicer.

In addition, the front cover opening and closing mechanism 16a and the rear cover opening and closing mechanism 16b of the illustrated example have the same configurations as each other, and as shown in FIG. 44 and FIG. 45, are provided axisymmetrically around a virtual central axis O located in the center, in plan view, of a region between the windshield covers 68 and 69 brought into the opened state (fully opened state).

The cover opening and closing mechanisms 16a and 16b only need to have a structure that can be adopted as the cover opening and closing mechanism of the fusion splicer of the embodiment related to the invention, and are not limited to the cover opening and closing mechanism 1 already described.

As the cover opening and closing mechanisms 16a and 16b, for example, the cover opening and closing mechanisms of the modification examples of FIGS. 18A to 27B may be used.

As shown in FIGS. 39 and 40, the cable member 3 of the closed-loop member 2 of the front cover opening and closing mechanism 16a is wound around the rotating shaft 68a of the front windshield cover 68.

The portion of the cable member 3 wound around the rotating shaft 68a is partially fixed to the rotating shaft 68a.

As shown in FIG. 44, the cable member 3 of the closed-loop member 2 of the rear cover opening and closing mechanism 16b is wound around the rotating shaft 69b of the rear windshield cover 69.

The portion of the cable member 3 wound around the rotating shaft 69b is partially fixed to the rotating shaft 69b.

The rotating shaft 68a of the front windshield cover 68 and the rotating shaft 69b of the rear windshield cover 69 function as cable member winding units (wound body wrapping portions).

Each of the windshield covers 68 and 69 is formed with the cable member insertion hole 65c.

The cable member 3 of the cover opening and closing mechanism 16a that opens and closes the front windshield cover 68 passes through the cable member insertion hole 65c of the front windshield cover 68.

The cable member 3 of the cover opening and closing mechanism 16b that opens and closes the rear windshield cover 69 passes through the cable member insertion hole 65c of the rear windshield cover 69.

Figure 46:
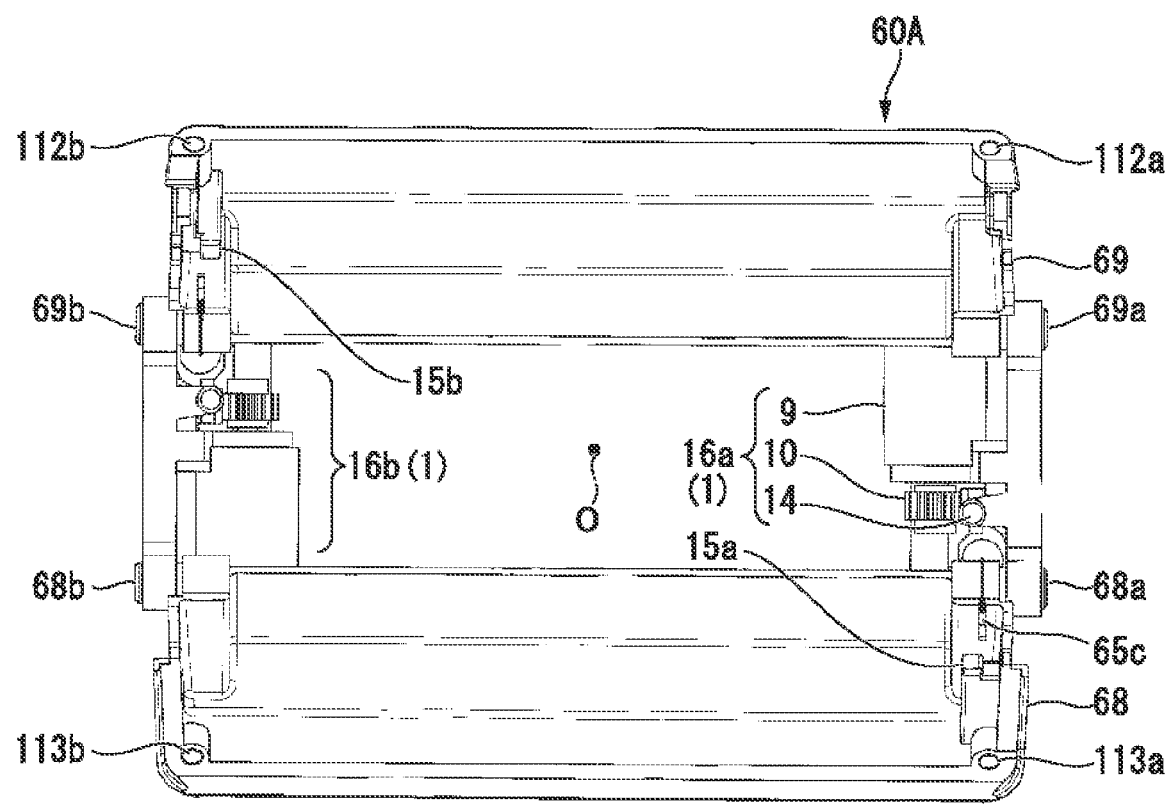
FIG. 46 is a plan view showing a state where the dual-split windshield cover and its opening and closing mechanism of FIG. 44 are viewed from the upper side of the fusion splicer.
Figure 47:
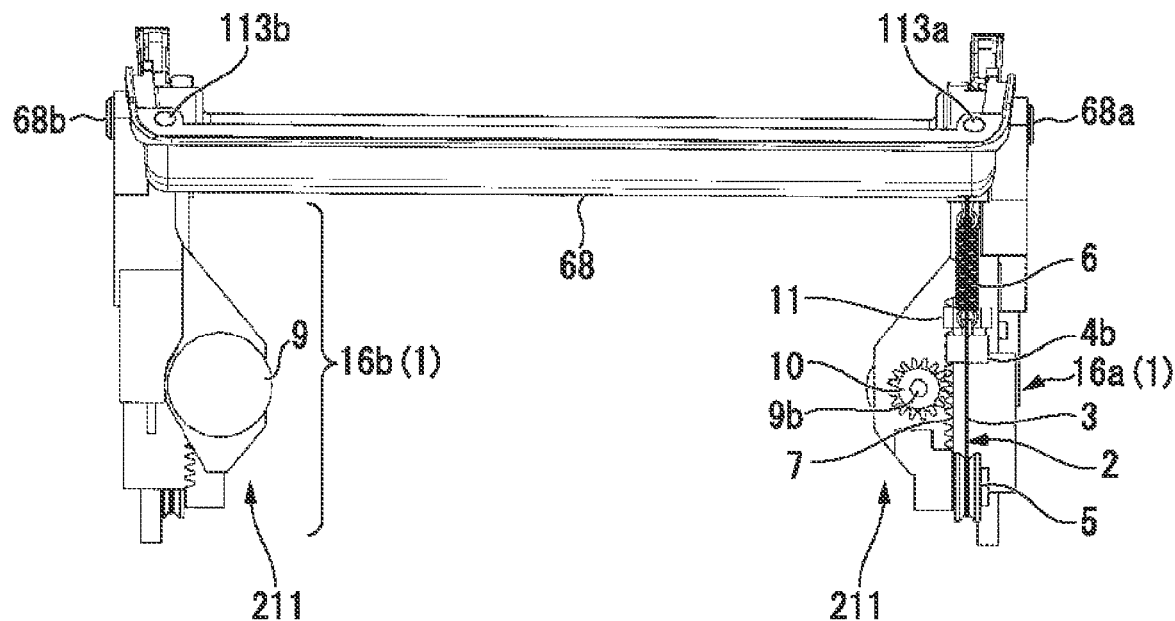
FIG. 47 is a front view showing a state where the dual-split windshield cover and its opening and closing mechanism of FIG. 44 are viewed from the front side of the fusion splicer.
Figure 48:
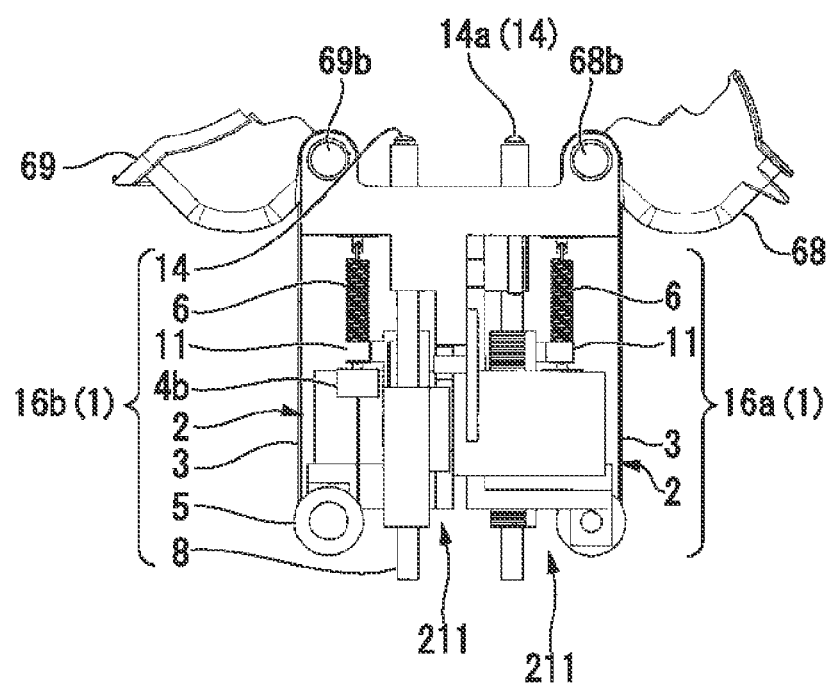
FIG. 48 is a view (right side view) showing a state where the dual-split windshield cover and its opening and closing mechanism of FIG. 44 are viewed from the right side of the fusion splicer.

Additionally, as shown in FIG. 44 and FIG. 46, the front windshield cover 68 has therein a shaft butting portion 15a with which the upper end (head portion 14a) of the thrust-up shaft 14 of the front cover opening and closing mechanism 16a comes into contact in a butting state.

Additionally, the rear windshield cover 69 has therein a shaft butting portion 15b with which the upper end (head portion 14a) of the thrust-up shaft 14 of the rear cover opening and closing mechanism 16b comes into contact in a butting state.

As shown in FIGS. 44 and 46, when the front and rear windshield covers 68 and 69 are mutually closed together, the state of being closed together is not easily released by virtue of an attractive force with which magnets 112a and 112b provided in one of the windshield covers 68 and 69 magnetically attract magnet catches 113a and 113b provided in the other of the windshield covers 68 and 69.

In the windshield cover 60A of the illustrated example, the magnets 112a and 112b are provided in the rear windshield cover 69, and the magnet catches 113a and 113b are provided in the front windshield cover 68.

Additionally, the magnets 112a and 112b and the magnet catches 113a and 113b are provided at positions near the surfaces (mating surfaces) of the front and rear windshield covers 68 and 69 that are joined to each other when being closed together.

The force with which the cover opening and closing mechanisms 16a and 16b thrust up the windshield covers 68 and 69 by the thrust-up shaft 14 acts on the front and rear windshield covers 68 and 69 as a force that rotates the windshield covers 68 and 69 in directions apart from each other.

For this reason, the operation of opening the windshield covers 68 and 69 in the state of being closed together can be smoothly performed by the driving of the cover opening and closing mechanisms 16a and 16b.

Although the invention has been described above on the basis of the best mode, the invention is not limited to the above-described best mode, and various improvements can be made without departing from the scope of the invention.

For example, the execution of the cover closing operation from the fiber set standby state in the fusion splicer is not limited to the ON operation of the cover closing switch 31*d* (refer to FIG. 3).

As the fusion splicer, for example, a configuration may be adopted in which the cover closing operation is automatically executed after the completion when the completion of gripping and fixing of the optical fibers 91 and 92 to the covering clamps 50 on both left and right sides, or the completion of installation of the fiber holders 40 onto the movable stages 22 on both left and right sides is detected by a sensor, and the fusion splicing operation is automatically started.

Additionally, as the covering clamp system fusion splicer 20A, a configuration may be adopted in which the cover closing operation is automatically executed using, as a trigger, an event that a sensor has detected the installation of the optical fibers 91 and 92 onto the lower clamp member 51 of the covering clamps 50 on both left and right sides or an event that sensors installed near the covering clamps 50 on both left and right sides have detected an operator's fingers simultaneously on the right and left sides, and the fusion splicing operation is automatically executed after the completion.

In addition, the fusion splicer has a configuration in which the fusion splicing operation is not started when occurrence of a closing operation abnormality is detected irrespective of what a trigger signal that functions as an operation start command for the start of a cover closing operation is.

As the closed-loop member, a configuration may be adopted in which a part or the whole, in the extending direction, of the cable member that constitutes the closed-loop member is a stretchable elastic material.

That is, at least a portion of the cable member may have elasticity.

As the closed-loop member adopting the cable member having this elastic member, a configuration may be adopted in which no elastic member is interposed besides a configuration in which an elastic member, such as a tension coil spring, is interposed in a portion of the closed loop member.

As the protrusion shift operation after cover opening, the above-described embodiment illustrates a configuration in which the pushing protrusion is moved by the driving force of the electric drive source after the completion of the cover opening operation so as to separate one of the power receiving protrusions and the pushing protrusion from one out of the other protrusions in two places abutting against the one protrusion in the cover opening operation and arrange the one protrusion in proximity to the other of the other protrusions in two places via a slight gap.

However, in the protrusion shift operation after cover opening, one of the power receiving protrusion and the pushing protrusion may be arranged at a position apart from the other protrusions in two places between the other protrusions in two places by the movement of the pushing protrusion after the completion of the cover opening operation.

The protrusion shift operation after opening of the cover is not necessarily limited to arranging one of the power receiving protrusion and the pushing protrusion in the vicinity of the other of the two protrusions in two places that do not come into contact with the one protrusion in the cover opening operation.

Additionally, as the protrusion shift operation after cover closing, the above-described embodiment illustrates a configuration in which, when the pushing protrusion is moved by the driving force of the electric drive source after the completion of the cover closing operation, and when a member provided in one place out of the power receiving member (power receiving protrusion) and the pushing protrusion is defined as a first member and members provided in two places apart from each other are defined as second members, the first member and one of the second members coming into contact with each other in a butting state are separated from each other, and the first member and the other of the second members are arranged in proximity to each other via a slight gap.

That is, in the above-described embodiment, in the cover opening and closing mechanism, the first member that is one of the power receiving member and the pushing protrusion is provided in one place, the second members that are the other are provided in two places apart from each other, the first member is arranged between the two second members, and the two second members are arranged so that the first member is movable between the two second members.

However, in the protrusion shift operation after cover closing, the first member may be arranged at a position apart from the second members in two places, respectively, by the movement of the pushing protrusion after the completion of the cover closing operation.

Accordingly, the protrusion shift operation after cover closing is not necessarily limited to arranging the first member at a position near the second member.

For example, in the cover opening and closing mechanism 1 shown in FIG. 18A, FIG. 18B, and the like, in the protrusion shift operation after cover opening, an upper power receiving member 4*a* out of the power receiving members 4 in two places apart from each other functions as one member (first power receiving protrusion), and the lower power receiving member 4*b* functions as the other member (second power receiving protrusion).

Additionally, in the cover opening and closing mechanism 1, in the protrusion shift operation after closing of the cover, the lower power receiving member 4*b* (second power receiving protrusion) functions as one member and the upper power receiving member 4*a* (first power receiving protrusion) functions as the other member.

As the cover opening and closing mechanism, a configuration may be adopted in which the pushing protrusion provided to protrude from one place of the power transmission member is arranged to secure a space that enables the movement between the power receiving protrusions provided to protrude from two places apart from each other in the extending direction of the closed-loop member or two places that are apart from each other in the rotational circumferential direction of the pulley 5 around which the cable member of the closed-loop member is wound.

In the cover opening and closing mechanism, the power receiving protrusion pushed by the pushing protrusion in the cover opening operation out of the power receiving protrusions in two places functions as a first member (first power receiving protrusion), and the power receiving protrusion that is not pushed by the pushing protrusion functions as the other member (second power receiving protrusion).

In the protrusion shift operation after cover opening, the power transmission member is moved by the driving force of the electric drive source so as to arrange the pushing protrusion at a position apart from the respective power receiving protrusions (for example, arrange the pushing protrusion in proximity to the second power receiving protrusion via a slight gap at a position near the second power receiving protrusion) between the power receiving protrusions in two places.

Additionally, in the cover opening and closing mechanism of this configuration, the second power receiving protrusion pushed by the pushing protrusion in the cover closing operation out of the power receiving protrusions in two places functions as one member, and the first power receiving protrusion that is not pushed by the pushing protrusion functions as the other member.

In the protrusion shift operation after cover closing, the power transmission member is moved by the driving force of the electric drive source so as to arrange the pushing protrusion at a position apart from the respective power receiving protrusions (for example, arrange the pushing protrusion in proximity to the first power receiving protrusion via a slight gap at a position near the first power receiving protrusion) between the power receiving protrusions in two places.

In the cover opening and closing mechanism 210 shown in FIG. 28 and the like and the cover opening and closing mechanism 310 shown in FIGS. 38A and 38B, in the protrusion shift operation after opening of the cover, the lower pushing protrusion 11b out of the pushing protrusions 11a and 11b in two places apart from each other functions as one member (first pushing protrusion), and the upper pushing protrusion 11a functions as the other member (second pushing protrusion).

Additionally, in the cover opening and closing mechanisms 210 and 310, in the protrusion shift operation after cover closing, the upper pushing protrusion 11a (the second pushing protrusion) out of the pushing protrusions 11a and 11b in two places apart from each other functions as one member, and the lower pushing protrusion 11b (first pushing protrusion) function as the other member.

As the cover opening and closing mechanism, the power receiving protrusion provided to protrude from the closed-loop member or from the pulley 5 around which the cable member of the closed-loop member is wound may be arranged to secure a space that enables the movement between the pushing protrusions provided in the two places of the power transmission member apart from each other.

The cover opening and closing mechanism of the configuration in which the power receiving protrusion provided to protrude from the pulley 5 around which the cable member of the closed-loop member is wound is arranged to secure a space that enables the movement between the pushing protrusions provided to protrude from the two places of the power transmission member apart from each other may include, for example, the cover opening and closing mechanism 310E (FIGS. 54A and 54B) of the eighth example already described, or the like.

In the cover opening and closing mechanism, the pushing protrusion that pushes the power receiving protrusion in the cover opening operation out of the two pushing protrusions functions as one member (first pushing protrusion), and the pushing protrusion that does not push the power receiving protrusion functions as the other member (second pushing protrusion).

In the protrusion shift operation after cover opening, the power transmission member is moved by the driving force of the electric drive source so as to arrange the pushing protrusions in two places at positions apart from the power receiving protrusion located between the pushing protrusions in two places (for example, arrange the second pushing protrusion in proximity to the power receiving protrusion via a slight gap in the vicinity of the power receiving protrusion).

Additionally, in the cover opening and closing mechanism of this configuration, the second pushing protrusion that pushes the power receiving protrusion in the cover closing operation out of the pushing protrusions in two places functions as one member, and the first pushing protrusion that does not push the power receiving protrusion functions as the other member.

In the protrusion shift operation after cover closing, the power transmission member is moved by the driving force of the electric drive source so as to arrange the pushing protrusions in two places at positions apart from the power receiving protrusion (for example, arrange the first pushing protrusion in proximity to the power receiving protrusion via a slight gap in the vicinity of the power receiving protrusion).

As the cover opening operation of the optical fiber fusion splicer, a configuration may be adopted in which the self-weight opening operation is not included, and the overall cover opening operation is performed by the driving force of the electric drive source.

Additionally, as the cover closing operation, a configuration may be adopted in which the self-weight closing operation is not included, and the overall cover closing operation is performed by the driving force of the electric drive source.

In the optical fiber fusion splicer in which the overall cover opening operation is performed by the driving force of the electric drive source, a configuration may be suitably adopted in which the power transmission member is moved or rotated by the driving force of the electric drive source after the cover opening operation so as to arrange one of the power receiving protrusion and the pushing protrusion at a position apart from the other protrusions in two places between the other protrusions in two places.

In the optical fiber fusion splicer in which the overall cover closing operation is performed by the driving force of the electric drive source, a configuration may be suitably adopted in which the power transmission member is moved or rotated by the driving force of the electric drive source after the cover closing operation so as to arrange one of the power receiving protrusion and the pushing protrusion at a position apart from the other protrusions in two places between the other protrusions in two places.

What is claimed is:

1. An optical fiber fusion splicer comprising:
   a windshield cover having a rotating shaft and rotating around the rotating shaft so as to be openable and closable;
   a cable member wrapping unit coupled and fixed to the windshield cover on the same axis as the rotating shaft of the windshield cover or formed as a portion of the windshield cover, the cable member wrapping unit being rotatable in a normal direction or in a reverse direction around the rotating shaft;
   a first cable member winding unit that is a rotary pulley, a non-rotary pulley, or a rotary gear;
   a closed-loop member comprising a deformable cable member wound around the cable member wrapping unit and the first cable member winding unit, the closed-loop member constituting a closed loop; and
   a detector which detects that the windshield cover is closed and which is configured so that, when the detector fails to detect that the windshield cover is closed even if an operation of closing the windshield cover has been performed, a warning display is performed without shifting to the subsequent fusion splicing operation,
   wherein when a tensile force is applied to the cable member so that the cable member wrapping unit is rotated in the normal direction by a driving force of a drive mechanism, the windshield cover is opened, and when the tensile force is applied to the cable member so that the cable member wrapping unit is rotated in the reverse direction, the windshield cover is closed, and
   at least one of the following (i) to (iv) is satisfied,
   (i) The closed-loop member has an elastic member that couples both ends of the cable member, (ii) At least a portion of the cable member has elasticity, (iii) The first cable member winding unit is movably provided, and is movably provided so that the cable member is capable of being elastically biased, and (iv) The fusion splicer further comprises a second cable member winding unit around which the cable member is wound, and which is movably provided so that the cable member is capable of being elastically biased.

2. The optical fiber fusion splicer according to claim 1, wherein when the detector fails to detect that the windshield cover is closed even if the operation of closing the windshield cover has been performed, one or more cycles of cover closing auxiliary operations comprising an operation of opening the windshield cover and the operation of closing the windshield cover performed after the opening operation are executed, when the detector detects that the windshield cover is closed when or before a preset number of times of the cover closing auxiliary operations are completed, a state where the fusion splicing operation is allowed without performing the operation of closing the cover after the detection is brought about, and when the detector fails to detect that the windshield cover is closed even after the execution of the preset number of times of the cover closing auxiliary operations is completed, a warning display is performed without shifting to the subsequent fusion splicing operation.

3. The optical fiber fusion splicer according to claim 2, further comprising a thrust-up shaft that presses a position of the windshield cover apart from the cable member wrapping unit to push up the windshield cover.

4. The optical fiber fusion splicer according to claim 3, wherein the drive mechanism pushes up the thrust-up shaft while applying a tensile force to the cable member by the driving force.

5. The optical fiber fusion splicer according to claim 3, further comprising:

a power transmission member moved or rotated by the driving force of the drive mechanism;

a power receiving protrusion provided on the cable member or the rotatable first cable member winding unit; and a pushing protrusion provided so as to protrude from the power transmission member and pushing the power receiving protrusion to feed and move the cable member, wherein one first member that is one of the power receiving protrusion and the pushing protrusion is provided, two second members that are the other of the power receiving protrusion and the pushing protrusion are provided apart from each other, the first member is arranged between the two second members, and the two second members are arranged so that the first member is capable of moving between the two second members.

6. The optical fiber fusion splicer according to claim 5, wherein the power transmission member is moved or rotated by the driving force of the drive mechanism after the operation of opening the windshield cover or the operation of closing the windshield cover so as to arrange the first member at a position apart from both of the two second members, and enable the windshield cover to be manually opened and closed without moving the power transmission member.

7. The optical fiber fusion splicer according to claim 4, further comprising:

a power transmission member moved or rotated by the driving force of the drive mechanism;

a power receiving protrusion provided on the cable member or the rotatable first cable member winding unit; and a pushing protrusion provided so as to protrude from the power transmission member and pushing the power receiving protrusion to feed and move the cable member, wherein one first member that is one of the power receiving protrusion and the pushing protrusion is provided, two second members that are the other of the power receiving protrusion and the pushing protrusion are provided apart from each other, the first member is arranged between the two second members, and the two second members are arranged so that the first member is capable of moving between the two second members.

8. The optical fiber fusion splicer according to claim 7, wherein the power transmission member is moved or rotated by the driving force of the drive mechanism after the operation of opening the windshield cover or the operation of closing the windshield cover so as to arrange the first member at a position apart from both of the two second members, and enable the windshield cover to be manually opened and closed without moving the power transmission member.

9. The optical fiber fusion splicer according to claim 2, further comprising:

a power transmission member moved or rotated by the driving force of the drive mechanism;

a power receiving protrusion provided on the cable member or the rotatable first cable member winding unit; and a pushing protrusion provided so as to protrude from the power transmission member and pushing the power receiving protrusion to feed and move the cable member, wherein one first member that is one of the power receiving protrusion and the pushing protrusion is provided, two second members that are the other of the power receiving protrusion and the pushing protrusion are provided apart from each other, the first member is arranged between the two second members, and the two second members are arranged so that the first member is capable of moving between the two second members.

10. The optical fiber fusion splicer according to claim 9, wherein the power transmission member is moved or rotated by the driving force of the drive mechanism after the operation of opening the windshield cover or the operation of closing the windshield cover so as to arrange the first member at a position apart from both of the two second members, and enable the windshield cover to be manually opened and closed without moving the power transmission member.

11. The optical fiber fusion splicer according to claim 1, further comprising a thrust-up shaft that presses a position of the windshield cover apart from the cable member wrapping unit to push up the windshield cover.

12. The optical fiber fusion splicer according to claim 11, wherein the drive mechanism pushes up the thrust-up shaft while applying a tensile force to the cable member by the driving force.

13. The optical fiber fusion splicer according to claim 12, further comprising:

a power transmission member moved or rotated by the driving force of the drive mechanism;

a power receiving protrusion provided on the cable member or the rotatable first cable member winding unit; and a pushing protrusion provided so as to protrude from the power transmission member and pushing the power receiving protrusion to feed and move the cable member, wherein one first member that is one of the power receiving protrusion and the pushing protrusion is provided, two second members that are the other of the power receiving protrusion and the pushing protrusion are provided apart from each other, the first member is arranged between the two second members, and the two second members are arranged so that the first member is capable of moving between the two second members.

14. The optical fiber fusion splicer according to claim 13, wherein the power transmission member is moved or rotated by the driving force of the drive mechanism after the operation of opening the windshield cover or the operation of closing the windshield cover so as to arrange the first member at a position apart from both of the two second members, and enable the windshield cover to be manually opened and closed without moving the power transmission member.

15. The optical fiber fusion splicer according to claim 11, further comprising:

a power transmission member moved or rotated by the driving force of the drive mechanism;

a power receiving protrusion provided on the cable member or the rotatable first cable member winding unit; and a pushing protrusion provided so as to protrude from the power transmission member and pushing the power receiving protrusion to feed and move the cable member, wherein one first member that is one of the power receiving protrusion and the pushing protrusion is provided, two second members that are the other of the power receiving protrusion and the pushing protrusion are provided apart from each other, the first member is arranged between the two second members, and the two second members are arranged so that the first member is capable of moving between the two second members.

16. The optical fiber fusion splicer according to claim 15, wherein the power transmission member is moved or rotated by the driving force of the drive mechanism after the operation of opening the windshield cover or the operation of closing the windshield cover so as to arrange the first member at a position apart from both of the two second members, and enable the windshield cover to be manually opened and closed without moving the power transmission member.

17. The optical fiber fusion splicer according to claim 1, further comprising:

a power transmission member moved or rotated by the driving force of the drive mechanism;

a power receiving protrusion provided on the cable member or the rotatable first cable member winding unit; and a pushing protrusion provided so as to protrude from the power transmission member and pushing the power receiving protrusion to feed and move the cable member, wherein one first member that is one of the power receiving protrusion and the pushing protrusion is provided, two second members that are the other of the power receiving protrusion and the pushing protrusion are provided apart from each other, the first member is arranged between the two second members, and the two second members are arranged so that the first member is capable of moving between the two second members.

18. The optical fiber fusion splicer according to claim 17, wherein the power transmission member is moved or rotated by the driving force of the drive mechanism after the operation of opening the windshield cover or the operation of closing the windshield cover so as to arrange the first member at a position apart from both of the two second members, and enable the windshield cover to be manually opened and closed without moving the power transmission member.

* * * * *